US 6,657,690 B2

(12) United States Patent
Hashimoto

(10) Patent No.: US 6,657,690 B2
(45) Date of Patent: Dec. 2, 2003

(54) OPTICAL COMPENSATORY SHEET COMPRISING OPTICALLY UNIAXIAL OR BIAXIAL TRANSPARENT STRETCHED FILM

(75) Inventor: Kiyokazu Hashimoto, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/025,815

(22) Filed: Dec. 26, 2001

(65) Prior Publication Data

US 2002/0149725 A1 Oct. 17, 2002

(30) Foreign Application Priority Data

Dec. 25, 2000 (JP) .......................... 2000-392378
Dec. 25, 2000 (JP) .......................... 2000-392574

(51) Int. Cl.$^7$ ............................................ G02F 1/1335
(52) U.S. Cl. ..................... 349/117; 349/105; 349/194
(58) Field of Search ............................... 349/105, 117, 349/194

(56) References Cited

U.S. PATENT DOCUMENTS 5,244,713 A * 9/1993 Nakamura et al. .......... 428/156

FOREIGN PATENT DOCUMENTS

JP 404032806a * 2/1992
JP 404084106 A * 9/1997

* cited by examiner

Primary Examiner—Tarifur Choudhury
Assistant Examiner—Hoan Nguyen
(74) Attorney, Agent, or Firm—Burns, Doane, Swecker & Mathis, LLP

(57) ABSTRACT

An optical compensatory sheet comprises an optically uniaxial or optically biaxial transparent stretched film. A Re retardation value in plane of the transparent stretched film measured at 550 nm fluctuates, in any direction parallel to the transparent stretched film surface, within the range of ±5 nm based on the average Re value in each direction. A Rth retardation value along a thickness direction of the transparent stretched film fluctuates, in any direction parallel to the transparent stretched film surface, within the range of ±10 nm based on the average Rth value in each direction.

10 Claims, 1 Drawing Sheet

OPTICAL COMPENSATORY SHEET COMPRISING OPTICALLY UNIAXIAL OR BIAXIAL TRANSPARENT STRETCHED FILM

FIELD OF THE INVENTION

The present invention relates to an optical compensatory sheet comprising an optically uniaxial or optically biaxial transparent stretched film. The invention also relates to an optical compensatory sheet comprising the transparent stretched film and an optically anisotropic layer formed from liquid crystal molecules. The invention further relates to an ellipsoidal polarizing plate and a liquid crystal display equipped with the optical compensatory sheet.

BACKGROUND OF THE INVENTION

A liquid crystal display generally has a liquid crystal cell, polarizing plates and an optical compensatory sheet (phase retarder). In a display of transmission type, two polarizing plates are placed on both sides of the liquid crystal cell, and one or two optical compensatory sheets are placed between the liquid crystal cell and the polarizing plate. On the other hand, a display of reflection type comprises a reflection plate, a liquid crystal cell, one optical compensatory sheet and one polarizing plate piled up in this order.

The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecules. According to alignment of the rod-like liquid crystal molecules in the cell, various display modes are proposed. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and ECB (electrically controlled birefringence) mode. Examples of the modes for reflection type include TN mode, HAN (hybrid aligned nematic) mode and GH (guest-host) mode.

The optical compensatory sheet is widely used in various liquid crystal displays because it prevents the displayed image from undesirable coloring and enlarges a viewing angle of a liquid crystal cell. As the optical compensatory sheet, a stretched birefringent polymer film has been conventionally used.

In place of the stretched birefringent polymer film, an optical compensatory sheet having an optically anisotropic layer formed from liquid crystal molecules (such as discotic liquid crystal molecules, rod-like liquid crystal molecules) has been proposed. The optically anisotropic layer is provided on a transparent film. Since the liquid crystal molecules have various alignment forms, an optical compensatory sheet obtained from the liquid crystal molecules has a specific optical characteristic that cannot be obtained from the conventional stretched birefringent polymer film.

The optical characteristic of the optical compensatory sheet is designed according to that of the liquid crystal cells namely, according to display mode of the liquid crystal cell. If the optical compensatory sheet is made with liquid crystal molecules, various optical characteristics can be realized according to the display mode of the liquid crystal cell.

For liquid crystal cells of various display modes, optical compensatory sheets using liquid crystal molecules have been proposed. For example, an optical compensatory sheet for liquid crystal cell of TN mode is described in Japanese Patent Provisional Publication No. 6(1994)-214116, U.S. Pat. Nos. 5,583,679, 5,646,703 and German Patent Publication No. 3,911,620A1. An optical compensatory sheet for liquid crystal cell of IPS or FLC mode is described in Japanese Patent Provisional Publication No. 10(1998)-54982. An optical compensatory sheet for OCB or HAN mode is described in U.S. Pat. No. 5,805,253 and International Patent Application No. WO96/37804. An optical compensatory sheet for STN mode is described in Japanese Patent Provisional Publication No. 9(1997)-26572. An optical compensatory sheet for VA mode is described in Japanese Patent No. 2,866,372.

If liquid crystal molecules are used in place of a conventional stretched birefringent polymer film, a liquid crystal cell can be optically compensated more correctly than before. For example, a liquid crystal cell comprising many essentially vertically aligned rod-like liquid crystal molecules (e.g. liquid crystal cell of VA, OCB or HAN mode) can be effectively compensated by an optical compensatory sheet in which the discotic liquid crystal molecules are aligned under the condition that an average inclined angle between the discotic plane of the molecule and the surface of the transparent film is less than 5°.

However, it is still very difficult to completely compensate a liquid crystal cell by the liquid crystal molecules alone, and hence it has been wanted to further improve the viewing angle character of liquid crystal display.

International Patent Application No. WO00/49430 discloses a liquid crystal display having a liquid crystal cell strictly compensated for improving the viewing angle character. In this display, the cell is compensated by an optical compensatory sheet comprising an optically anisotropic transparent film and a thereon-provided optically anisotropic layer formed from discotic liquid crystal molecules.

SUMMERY OF THE INVENTION

An optical compensatory sheet comprising a transparent stretched birefringent film can improve quality of an image on a liquid crystal display at a certain degree. An optical compensatory sheet comprising a transparent stretched polymer film and an optically anisotropic layer formed from liquid crystal molecules can also improve quality of an image. However, the viewing angle still changes according to the viewing position on the displaying screen of the liquid crystal display. Further, troubles of light leaks are sometimes observed in the image. The image may leak light along the frame of the image where the image should be black. The image may also leak light as a light spot within a black area.

An object of the present invention is to provide an optical compensatory sheet that uniformly compensates a liquid crystal cell in a liquid crystal display.

Another object of the invention is to provide a liquid crystal display in which the displaying screen is uniformly compensated by an optical compensatory sheet to improve the displaying quality such as viewing angle.

A further object of the invention is to provide an optical compensatory sheet that uniformly compensates a liquid crystal cell without causing troubles of light leaks.

A furthermore object of the invention is to provide a liquid crystal display in which troubles of light leaks are reduced.

The applicant has found that an optical compensatory sheet having an even optical character in the plane can be obtained by stretching a transparent film under specific conditions. The applicant has also found that the troubles of light leaks can be reduced by stretching the transparent film under specific conditions.

The first embodiment of the present invention provides an optical compensatory sheet comprising an optically uniaxial or optically biaxial transparent stretched film, wherein a Re retardation value in plane of the transparent stretched film measured at 550 nm fluctuates, in any direction parallel to the transparent stretched film surface, within the range of ±5 nm based on the average Re value in each direction, and a Rth retardation value along the thickness direction of the transparent stretched film fluctuates, in any direction parallel to the transparent stretched film surface, within the range of ±10 nm based on the average Rth value in each direction.

The first embodiment of the invention also provides an optical compensatory sheet comprising an optically uniaxial or optically biaxial transparent stretched film and an optically anisotropic layer formed from discotic liquid crystal molecules, wherein a Re retardation value in plane of the transparent stretched film measured at 550 nm fluctuates, in any direction parallel to the transparent stretched film surface, within the range of ±5 nm based on the average Re value in each direction, a Rth retardation value along the thickness direction of the transparent stretched film fluctuates, in any direction parallel to the transparent stretched film surface, within the range of tic nm based on the average Rth value in each direction, and the discotic liquid crystal molecules are so aligned that an average inclined angle between the discotic plane of the molecule and the surface of the transparent stretched film is less than 5°.

The second embodiment of the present invention provides an optical compensatory sheet comprising an optically uniaxial or optically biaxial transparent stretched film, wherein the transparent stretched film has a breaking extension along a stretching direction within the range of 10% to 30%.

The second embodiment of the invention also provides an optical compensatory sheet comprising an optically uniaxial or optically biaxial transparent stretched film and an optically anisotropic layer formed from rod-like liquid crystal molecules, wherein the transparent stretched film has a breaking extension along a stretching direction within the range of 10% to 30%, and the rod-like liquid crystal molecules are so aligned that an average inclined angle between the long axis of the molecule and the surface of the transparent stretched film is less than 5°.

The invention further provides an ellipsoidal polarizing plate comprising two transparent protective films and a polarizing membrane provided between the transparent protective films, wherein one of the transparent protective films is one of the above-mentioned optical compensatory sheets.

The invention furthermore provides a liquid crystal display comprising two polarizing plates and a liquid crystal cell of VA mode provided between the plates, said polarizing plate comprising two transparent protective films and a polarizing membrane provided between the transparent protective films, wherein at least one of the transparent protective films placed between the liquid crystal cell and the polarizing plates is one of the above-mentioned optical compensatory sheets.

In the present specification, the term "slow axis" means the direction giving the maximum refractive index in the plane of the film.

The term "stretching direction" means the direction in which the transparent film is stretched. In the case where the film is multi-axially stretched, the term means the direction in which the film is stretched by the largest times. The angle between the slow axis and the stretching axis is so determined that it may be an acute angle, and whether the angle is positive or negative is determined based on the stretching axis.

The Re retardation value in plane and the Rth retardation value along the thickness direction of the transparent film are defined by the following formulas (I) and (II), respectively:

$$Re=(nx-ny) \times d \quad (I)$$

$$Rth=[\{(nx+ny)/2\}-nz] \times d \quad (II)$$

in which each of nx and ny is a refractive index in the plane of the film; nz is a refractive index along the thickness direction; and d is the thickness of the film.

The Re retardation value in plane of the optical compensatory sheet is defined by the following formula (I):

$$Re=(nx-ny) \times d \quad (I)$$

in which each of nx and ny is a refractive index in the plane of the sheet; and d is the thickness of the sheet.

The retardation value along the thickness direction of the optical compensatory sheet is defined by the following formulas (II):

$$Rth=[\{(nx+ny)/2\}-nz] \times d \quad (II)$$

in which each of nx and ny is a refractive index in the plane of the sheet; nz is a refractive index along the thickness direction of the sheet; and d is the thickness of the sheet.

The optical compensatory sheet or the ellipsoidal polarizing plate may be cut (or punched out) according to the size of a liquid crystal cell to be used with the cell.

In the present specification, the terms "essentially parallel", "essentially perpendicular" or the like means that the difference from the exact angle is within the range of ±5°. The difference is preferably within the range of ±4°, more preferably within the range of ±3°, further preferably within the range of ±2°, and most preferably within the range of ±1°.

The transparent film used in the optical compensatory sheet of the first embodiment (comprising a stretched birefringent transparent polymer film, or comprising a transparent film and an optically anisotropic layer formed from discotic liquid crystal molecules) is stretched under the conditions controlled to make the optical characters (retardations in plane Re and along the thickness direction Rth) even in the plane of the sheet. The applicant has succeeded in correcting the uneven optical compensatory character (viewing angle changing according to the viewing position on the displaying screen) of a liquid crystal display. This correction can be realized with a large viewing angle maintained.

Further, an optical compensatory sheet comprising the above transparent film and a thereon-provided optically anisotropic layer in which discotic liquid crystal molecules are aligned under the condition that an average inclined angle between the discotic plane of the molecule and the surface of the transparent film is less than 5' is prepared. The applicant has also succeeded in optically compensating correctly the whole plane of the liquid crystal cell comprising essentially vertically aligned rod-like liquid crystal molecules.

An optical compensatory sheet is generally cut (or punched out) to use according to the displaying size of the liquid crystal display. Since a conventional compensatory sheet has laterally uneven optical compensatory characters, liquid crystal displays equipped with pieces of the cut (or punched) compensatory sheet have different displaying quality. In contrast, liquid crystal displays equipped with pieces of the compensatory sheet according to the invention have constant displaying quality.

Further, a polarizing plate as well as a liquid crystal cell generally has a viewing angle character. The applicant note that the viewing angle character of polarizing plate can be optically compensated very effectively by an optical uniaxial or biaxial (preferably, biaxial) transparent film having laterally even optical characters.

The applicant further has succeeded in reducing troubles of light leaks by adjusting the breaking extension along a stretching direction of the transparent stretched film within the range of 10% to 30% (the second embodiment of the invention). A liquid crystal cell comprising essentially vertically aligned rod-like liquid crystal molecules can be optically compensated by using a optical compensatory sheet comprising the transparent stretched film (and an optical anisotropic layer comprising rod-like liquid crystal molecules so aligned that an average inclined angle between the long axis of the molecule and the surface of the transparent stretched film is less than 5°) without causing troubles of light leaks.

The optical compensatory sheet according to the present invention is advantageously used for a liquid crystal display having a liquid crystal cell comprising essentially vertically aligned rod-like liquid crystal molecules (e.g., liquid crystal cell of VA, OCB or HAN mode).

DETAILED DESCRIPTION OF THE INVENTION

[Liquid Crystal Display]

A liquid crystal display comprising the optical compensatory sheet according to the invention is described below.

Figure 1:
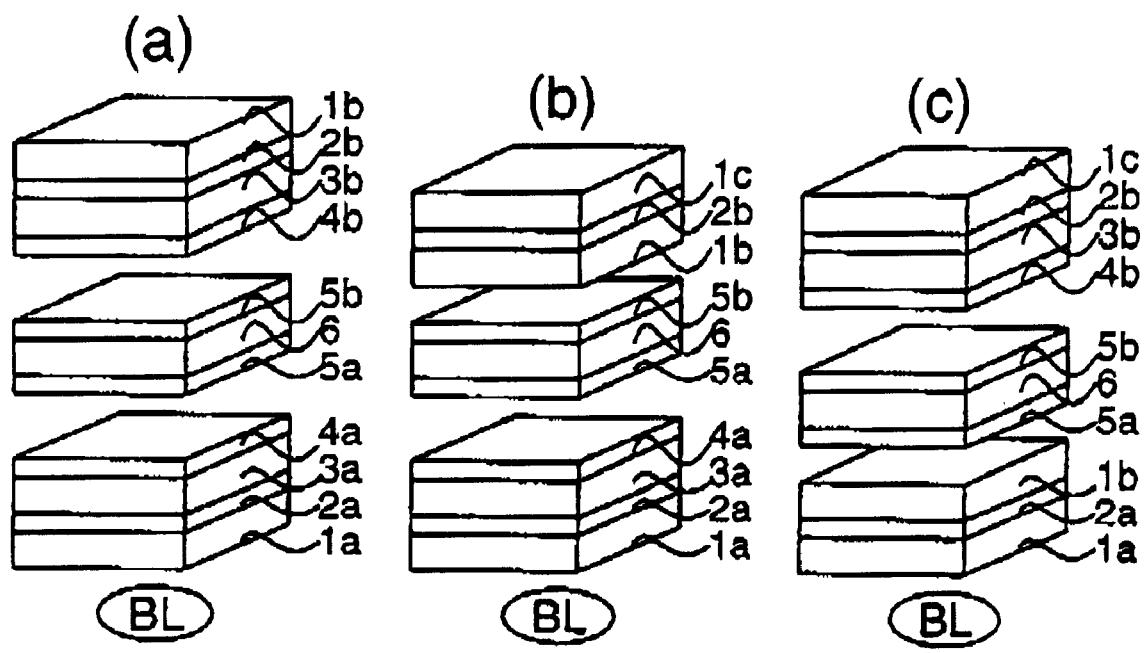
FIG. 1 is a sketch schematically illustrating fundamental constitution of liquid crystal displays of transmission type.

FIG. 1 is a sketch schematically illustrating fundamental constitution of liquid crystal displays of transmission type.

The display shown in FIG. 1(a) comprises a transparent protective film (1a), a polarizing membrane (2a), a transparent film (3a), an optically anisotropic layer (4a), a lower substrate of liquid crystal cell (5a), rod-like liquid crystal molecules (6), an upper substrate of liquid crystal cell (5b), an optically anisotropic layer (4b), a transparent film (3b), a polarizing membrane (2b) and a transparent protective film (1b), piled up in this order from the side of a back light (BL).

Each combination of the transparent film and the optically anisotropic layer (3a-4a and 4b-3b) constitutes an optical compensatory sheet. Each combination of the transparent protective film, the polarizing membrane, the transparent film and the optically anisotropic layer (1a-4a and 4b-1b) constitutes an ellipsoidal polarizing plate.

The display shown in FIG. 1(b) comprises a transparent protective film (1a), a polarizing membrane (2a), a transparent film (3a), an optically anisotropic layer (4a), a lower substrate of liquid crystal cell (5a), rod-like liquid crystal molecules (6), an upper substrate of liquid crystal cell (5b), a transparent protective film (1b), a polarizing membrane (2b) and a transparent protective film (1c), piled up in this order from the side of a back light (BL).

A combination of the transparent film and the optically anisotropic layer (3a-4a) constitutes an optical compensatory sheet. A combination of the transparent protective film, the polarizing membrane, the transparent film and the optically anisotropic layer (1a-4a) constitutes an ellipsoidal polarizing plate.

The display shown in FIG. 1(c) comprises a transparent protective film (1a), a polarizing membrane (2a), a transparent protective film (1b), a lower substrate of liquid crystal cell (5a), rod-like liquid crystal molecules (6), an upper substrate of liquid crystal cell (5b), an optically anisotropic layer (4b), a transparent film (3b), a polarizing membrane (2b) and a transparent protective film (1c), piled up in this order from the side of a back light (BL).

A combination of the transparent film and the optically anisotropic layer (4b-3b) constitutes an optical compensatory sheet. A combination of the transparent protective film, the polarizing membrane, the transparent film and the optically anisotropic layer (4b-1c) constitutes an ellipsoidal polarizing plate.

Figure 2:
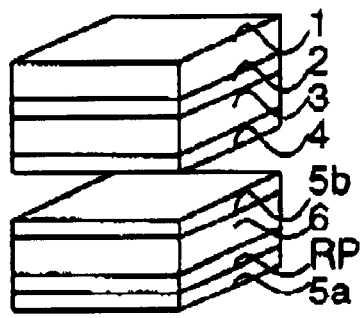
FIG. 2 is a sketch schematically illustrating fundamental constitution of a liquid crystal display of reflection type.

FIG. 2 is a sketch schematically illustrating fundamental constitution of a liquid crystal display of reflection type.

The display shown in FIG. 2 comprises a lower substrate of liquid crystal cell (5a), a reflection plate (RP), rod-like liquid crystal molecules (6), an upper substrate of liquid crystal cell (5b), an optically anisotropic layer (4), a transparent film (3), a polarizing membrane (2) and a transparent protective film (1), piled up in this order.

A combination of the transparent film and the optically anisotropic layer (4-3) constitutes an optical compensatory sheet. A combination of the transparent protective film, the polarizing membrane, the transparent film and the optically anisotropic layer (4-1) constitutes an ellipsoidal polarizing plate.

In each display shown in FIG. 1 and FIG. 2, the order of the optically anisotropic layer (4) and the transparent film (3) can be changed.

A second optically anisotropic layer can be added to the optical compensatory sheet or the ellipsoidal polarizing plate shown in FIG. 1 and FIG. 2 according to the second embodiment of the present invention. There is no specific limitation with respect to arrangement of the second optical anisotropic layer. Accordingly, the second optical anisotropic layer can be provided at a position of A, B or C in the order of (polarizing membrane)→A→(transparent film)→B→(optically anisotropic layer)→C→(liquid crystal cell).

The optically anisotropic layer and the second optically anisotropic layer are not essential in the present invention, where the transparent film is used as an optical compensatory sheet. However, an optically anisotropic layer is preferably formed on the transparent film to obtain a large viewing angle.

[Transparent Film (First Embodiment)]

In the transparent film of the first embodiment, a retardation value in plane (Re) measured at 550 nm fluctuates, in any direction parallel to the film surface, within the range of ±5 nm based on the average Re value in each direction. Further, a retardation value along the thickness direction (Rth) fluctuates, in any direction parallel to the film surface, within the range of ±10 nm based on the average Rth value in each direction.

The term "transparent" means that light transmittance is not less than 80%r more preferably not less than 90%.

The retardation value in plane (Re) measured at 550 nm fluctuates, in any direction parallel to the film surface, within the range of ±5 nm (preferably, ±4 nm) based on the average Re value in each direction.

The retardation value along the thickness direction (Rth) measured at 550 nm fluctuates, in any direction parallel to the film surface, within the range of ±10 nm (preferably, ±8 nm) based on the average Rth value in each direction.

The retardation values in plane (Re) and along the thickness direction (Rth) of the transparent film are defined by the following formulas (I) and (II), respectively:

$$Re=(nx-ny)\times d \quad (I)$$

$$Rth=[\{(nx+ny)/2\}-nz]\times d \quad (II)$$

in which each of nx and ny is a refractive index in the plane of the film; nz is a refractive index along the thickness direction of the film; and d is the thickness of the film.

The refractive index nx is that along the slow axis (in the direction giving the maximum refractive index) in plane. The refractive index ny is that along the fast axis (in the direction giving the minimum refractive index) in plane.

For optically compensating an image displayed by a liquid crystal display evenly, optical characters (Re and Rth) of the transparent film must fluctuate in a small degree in any direction parallel to the film surface. In the following description, the fluctuation in the direction parallel to a machine used in forming the film (hereinafter, referred to as "longitudinal directions) and the fluctuation in the direction perpendicular to the machine (hereinafter, referred to as "lateral direction") are explained as representative fluctuations.

Generally, the longitudinal fluctuation of optical characters of the transparent film is relatively small if the film is formed without changing the condition concerning time for film-forming. In the longitudinal direction of the film, the optical characters Re and Rth fluctuate usually in the ranges of ±5 nm and ±10 nm, respectively, based on the average values.

For this reason, in order to optically compensate a displayed image evenly, it is important that the transparent film shows small lateral fluctuation. In the following description, the lateral fluctuation in the transparent film is explained.

If the transparent film is optically uniaxial, the film may be either optically positive (the refractive index parallel to the optical axis is larger than that perpendicular to the optical axis) or optically negative (the refractive index perpendicular to the optical axis is larger than that parallel to the optical axis). In the case that the film is optically biaxial, the values of nx, ny and nz in the above formula are different from each other.

In the uniaxial or biaxial transport film, a retardation value in plane (Re) is preferably in the range of 10 to 1,000 nm, more perferably in the range of 20 to 200 nm, and most preferably in the range of 20 to 200 nm. A retardation value along the thickness direction (Rth) is preferably in the range of 10 to 1,000 nm, more preferably in the range of 70 to 500 nm, further preferably in the range of 100 to 300 nm.

In the case where the transparent film is a stretched film, the angle between the slow axis and the stretching axis in plane (axial difference) is preferably not larger than 5°, more preferably not larger than 4°, further preferably not larger than 3°.

The axial difference is preferably in the above range at any lateral position of the film.

The term 'stretching axis" means the direction in which the transparent film is stretched. In the case where the film is multi-axially stretched, the term means the direction in which the film is stretched by the largest times. The angle between the slow axis and the stretching axis is determined so that it may be an acute angle, and whether the angle is positive or negative is determined based on the stretching axis.

As the transparent film, a polymer film is generally used. Examples of the polymer for the film include synthetic polymers and cellulose derivatives.

Examples of the synthetic polymers include polycarbonate, polysulfone, polyethersulfone, polyacrylate, polymethacrylate and norbornene resin.

As the cellulose derivative, cellulose esters are preferred. Cellulose acylate is more preferred, and cellulose acetate is further preferred.

The acetic substitution degree of cellulose acetate is preferably in the range of 2.4 to 3.0, more preferably in the range of 2.5 to 2.9.

According to European Patent No. 3,911,656 A2, a optically anisotropic cellulose ester film (giving high retardation) can be prepared (1) with a retardation increasing agent, (2) from a cellulose ester having a low acetic Substitution degree or (3) according to the cooling dissolution method.

A polymer film of cellulose derivative is preferably used as the transparent film.

A polymer film used as the transparent film is formed preferably according to the solvent film-forming method (preferably, the solvent casting method).

In the solvent casting method, a polymer solution (dope) in which polymer is dissolved in an organic solvent is used.

The polymer solution may be singly cast on a smooth support (drum or band) to form a single layered film, or otherwise two or more solutions may be used to form a multi-layered film.

In the case where two or more polymer solutions are used, the solutions may be cast from nozzles provided at intervals in the transferring direction of the support to form a layered film. This method is described in, for example, Japanese Patent Provisional Publication NOS. 61(1986)-158414, 1(1989)-122419 and 11(1999)-198285.

The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933.

The method described in Japanese Patent Provisional Publication No. 56(1981)-162617 can be also adopted. In that method, a highly viscous polymer solution is enclosed with a low viscous one, and then the thus-combined solutions are simultaneously extruded and cast.

Further, the method described in, for example, Japanese Patent Publication No. 44(1969)-20235 may be adopted. In the method, a film is beforehand formed from a solution extruded out of one of two nozzles. After the formed film is peeled and reversaly placed on the support, another solution is extruded from the other nozzle to cast onto the film (on the surface having faced to the support) to form a layered film.

The polymer solutions may be the same or different from each other. For making two or more functional polymer layers, each polymer solution according to the aimed function is extruded from each nozzle.

In order to obtain desired optical characters and mechanical characters, the transparent film preferably has a layered structure. The layered structure consists of preferably 2 to 10 layers, more preferably 2 to 6 layers, further preferably 2 to 4 layers.

The polymer solution can be cast simultaneously with dopes for other functional layers (e.g., adhesive layer, dye layer, antistatic layer, anti-halation layer, ultraviolet layer, polarizing layer).

A matting layer containing a matting agent and a polymer may be provided on one or each of the surfaces of the transparent film, so as to improve treatability in the production process. AS the matting agent and the polymers, materials described in Japanese Patent Provisional Publication No. 10(1998)-44327 can be preferably used.

The uniaxial or biaxial optical characteristic is preferably given to the transparent film by stretching.

The optically uniaxial film can be obtained by a normal uniaxial or biaxial stretching.

The optically biaxial film is preferably produced by unbalance biaxial stretching. The procedure of unbalance biaxial stretching comprises the steps of: stretching a film along one direction to expand by a certain extent, and then stretching the film vertically to the direction of the first stretching to expand by a more extent than that in the first stretching. In the procedure, the film may be stretched along the two vertical directions at the same time.

The retardation values (Re and Rth) of the transparent film and the fluctuation thereof are preferably controlled by the below-described stretching process. The retardation values can be also controlled by adding known retardation increasing agents into the film.

Concrete examples of the retardation increasing agent are described in Japanese Patent Provisional Publication Nos. 2000-111914, 2000-275434 and International Patent Application No. WO00/65385.

(1) Stretching the transparent film containing a solvent;

After a polymer film used as the transparent film is formed by the solvent film-forming method, the film is preferably stretched with the solvent remaining (insufficiently dried). The amount of the remaining solvent is preferably in the range of 5 to 50 wt. %, more preferably in the range of 10 to 46 wt. %, further preferably in the range of 15 to 40 wt. % based on the weight of the transparent film.

(2) Stretching in a low expanding ratio and in a low speed:

The expanding ratio of stretching is preferably in the range of 1.05 to 1.60, more preferably in the range of 1.10 to 1.50, further preferably in the range of 1.10 to 1.40.

This expanding ratio is very low in comparison with a conventional synthetic polymer film used as an optical compensatory sheet of liquid crystal display. The conventional film is generally stretched by 3 times or more.

The stretching speed is preferably in the range of 5 to 100%/minute, more preferably in the range of 10 to 80%/minute, further preferably in the range of 15 to 70%/minute.

This stretching speed is very slow in comparison with the conventional synthetic polymer film, which is generally stretched in 500%/minute or more.

(3) Stretching the transparent film having controlled thermal distribution on the plane:

In stretching the transparent film, the temperature at each side edge of the film is controlled to be lower than that at the central part by 1 to 10° C., preferably by 1 to 86C. That thermal distribution can be realized by cooling the side edges or by heating the central part in the known manner. For example, the side edges can be cooled by blowing cold air or cold inert gas or by contacting with a cooled roll. Further, the central part can be heated by blowing hot air or hot inert gas, by an infrared heater or a ceramic heater or by contacting with a hot roll. Before stretching, the transparent film may be contacted with a roll, a drum or a band heated by a heater having lateral thermal distribution, so that the lateral thermal distribution of the film may be simultaneously controlled. It is more preferred that the heating or cooling be controlled according to the thermal distribution measured in stretching the film.

After stretching, the transparent film is dried until the amount of the remaining solvent reaches 3 wt. % or less, preferably 2 wt. % or less.

The thus-obtained transparent film has a thickness preferably in the range of 80 to 160 $\mu$m, more preferably in the range of 90 to 150 $\mu$m, further preferably in the range of 100 to 140 $\mu$m.

The transparent film can be subjected to a surface treatment (e.g., glow discharge treatment, corona discharge treatment, ultraviolet (UV) treatment, flame treatment) to improve adhesion to a layer formed on the film (e.g., adhesive layer, orientation layer, optically anisotropic layer). The film may contain UV absorber.

An adhesive layer (undercoating layer) can be provided on the transparent film. Japanese Patent Provisional Publication No. 7(1995)-333433 describes the adhesive layer. The adhesive layer has a thickness preferably in the range of 0.1 to 2 Mm, more preferably 0.2 to 1 $\mu$m.

The thus-formed transparent film can be directly used as an optical compensatory sheet for optically compensating the liquid crystal cell. Otherwise, after an optically anisotropic layer (formed from liquid crystal molecules) is provided on one surface of the film, the film can be used as the optical compensatory.

The thus-obtained transparent film has even optical characters in plane. Accordingly, if the film is cut into pieces, each piece has the same optical characters. When the pieces are installed in liquid crystal displays, the displays show the same displaying performance (e.g., viewing angle).

With respect to the fluctuation of lateral optical characters (Re and Rth) based on the average values, the transparent film can be evaluated in the following manner.

First, the retardation values in plane (Re) of the film are measured laterally at intervals of 30 mm, and then the average Re value is calculated from the measured values. The difference between each measured Re value and the average Re value is calculated to obtain the fluctuation of Re, which is in the range of ±5 nm in the transparent film according to the invention.

Next, the retardation values along the thickness direction (Rth) of the film are measured laterally at intervals of 30 mm, and then the average Rth value is calculated from the measured values. The difference between each measured Rth value and the average Rth value is calculated to obtain the fluctuation of Rth, which is in the range of ±10 nm in the transparent film according to the invention.

The above intervals among the measured positions may be changed. In the transparent film according to the invention, the fluctuation of Re in any direction parallel to the transparent film surface is within the range of ±5 nm based on the average Re value in each direction. Also in the film according to the invention, the fluctuation of Rth in any direction parallel to the transparent film surface is within the range of ±10 nm based on the average Rth value in each direction.

It is possible to evenly compensate the whole plane of liquid crystal display by means of at least one transparent film having the above controlled optical characters (Re and Rth). On the transparent film, another optically anisotropic (optically uniaxial or biaxial) film can be laminated to use. In that case, it is also preferred that, in the laminated anisotropic film, the fluctuation of Re in any direction parallel to the film surface be within the range of ±5 nm based on the average Re value in each direction, and that the fluctuation of Rth in any direction parallel to the film surface be within the range of ±10 nm based on the average Rth value in each direction.

The optically uniaxial or biaxial transparent film and an optically isotropic film (e.g., cellulose acetate film) may be laminated. Further in that case, it is also preferred that, in the optically isotropic film, the fluctuation of Re measured at 550 nm in any direction parallel to the film surface be within the range of ±5 nm based on the average Re value in each direction, and that the fluctuation of Rth in any direction parallel to the film surface be within the range of ±10 nm based on the average Rth value in each direction.

The transparent film of the first embodiment has a thickness preferably in the range of 10 to 500 μm, and more preferably in the range of 50 to 200 μm.

[Transparent Film (Second Embodiment)]

The transparent film of the second embodiment is an optically uniaxial or optically biaxial transparent stretched film having a breaking extension along a stretching direction within the range of 10% to 30%. The breaking extension can be adjusted by controlling the stretching conditions (described below).

The transparent film preferably is a polymer film. Where the breaking extension is adjusted within the range of 10% to 30%, alignment of the polymer in plane of the film is oriented to reduce a thermal coefficient of expansion. The thermal coefficient can be reduced not only along the stretching direction but also along any other directions.

In the case that the optical compensatory sheet is used in a liquid crystal display, the optical compensatory sheet is fixed on a liquid crystal cell, a polarizing plate or a polarizing membrane (as a protective film of the membrane) with an adhesive. A transparent film of the optical compensatory sheet may expand or shrink according to the conditions (temperature, humidity) in use of the liquid crystal display. The expansion or shrinkage is controlled to form internal stress because the optical compensatory sheet is fixed in the display. The internal stress is large at the end of the image. The film would move to ease the stress. The moving distance of the film at the end of the image should be larger than the distance at the center of image.

The internal stress shows a photoelastic effect, which changes optical characteristics along the end of the image like frame, which further causes a trouble of light leak like frame. The troubles can be reduced by controlling expansion or shrinkage of the film. The expansion or shrinkage can be controlled by adjusting a breaking extension along a stretching direction within the range of 10% to 30% according to the second embodiment of the present invention.

The applicant has found that dusts or other contaminants attached to the optically compensatory sheet cause the light leaks like spots. The applicant has further found that most of the dusts are broken pieces of the transparent film of the optically compensatory sheet, which are formed while cutting the film. The optical compensatory sheet is cut (or punched out) according to the displaying size of the liquid crystal display. The broken pieces can be reduced by aligning the polymer in plane of the film to reduce the light leaks like spots. The polymer can be aligned by adjusting the breaking extension within the range of 10% to 30% according to the second embodiment of the present invention.

The transparent stretched film preferably has a heat shrinkage starting temperature in the range of 130° C. to 190° C.

The film is optically uniaxial or optically biaxial.

If the transparent film is optically uniaxial, the film may be either optically positive (the refractive index parallel to the optical axis is larger than that perpendicular to the optical axis) or optically negative (the refractive index perpendicular to the optical axis is larger than that parallel to the optical axis). In the case that the film is optically biaxial, the values of nx, ny and nz in the above formula are different from each other (nx≠ny≠nz).

The optically anisotropic transparent film has a Re retardation value in plane preferably in the range of 10 to 1,000 nm, more preferably in the range of 15 to 300 nm, and most preferably in the range of 20 to 200 nm. The optically anisotropic transparent film has a Rth retardation value along the thickness direction preferably in the range of 10 to 1,000 nm, more preferably in the range of 15 to 300 nm, further preferably in the range of 20 to 200 nm.

The Re retardation value in plane and the Rth retardation value along the thickness direction are defined by the following formulas (I) and (II), respectively:

$$Re = (nx - ny) \times d \quad (I)$$

$$Rth = [\{(nx+ny)/2\} - nz] \times d \quad (II)$$

in which each of nx and ny is a refractive index in the plane of the film; nz is a refractive index along the thickness direction of the film; and d is the thickness of the film.

The angle between the slow axis and the stretching direction is preferably not larger than 5°, more preferably not larger than 4°, and most preferably not larger than 3°. The axial difference is preferably in the above range at any lateral position of the film.

The term "stretching direction" means the direction in which the transparent film is stretched. In the case where the film is multi-axially stretched, the term means the direction in which the film is stretched by the largest times.

The transparent film preferably is a thermoplastic polymer film. The term "transparent" means that light transmittance is not less than 80%, and more preferably not less than 90%.

Examples of the polymers include cellulose derivatives and synthetic polymers. The cellulose derivatives are preferred to the synthetic polymers. The cellulose derivative preferably is a cellulose acylate, most preferably is cellulose acetate. The substitution degree of cellulose acetate preferably is in the range of 2.4 to 3.0, and more preferably is in the range of 2.5 to 2.9. Examples of the synthetic polymers include polyacrylate, polymethacrylate and norbornene resin. An optically anisotropic polymer film has usually made of the synthetic polymer film. However, the optically anisotropic polymer film can also be made of a cellulose ester film by (1) using a retardation increasing agent described in European Patent No. 0911656A2, (2) decreasing the acetic acid content of cellulose acetate or (3) preparation of film according to a cooling dissolution method.

A polymer film used as the transparent film is formed preferably according to a solvent casting method. In the solvent casting method, a polymer solution (dope) in which polymer is dissolved in an organic solvent is used. The polymer solution may be singly cast on a smooth support (drum or band) to form a single layered film, or otherwise two or more solutions may be used to form a multi-layered film.

In the case where two or more polymer solutions are used, the solutions may be cast from nozzles provided at intervals in the transferring direction of the support to form a layered film. This method is described in, for example, Japanese Patent Provisional Publication Nos. 61(1986)-158414, 1(1989)-122419 and 11(1999)-198285.

The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933. The method described in Japanese Patent Provisional Publication No. 56(1981)-162617 can be also adopted. In that method, a highly viscous polymer solution is enclosed with a low viscous one, and then the thus-combined solutions are simultaneously extruded and cast.

Further, the method described in, for example, Japanese Patent Publication No. 44(1969)-20235 may be adopted. In the method, a film is beforehand formed from a solution extruded out of one of two nozzles. After the formed film is peeled and reversaly placed on the support, another solution is extruded from the other nozzle to cast onto the film (on the surface having faced to the support) to form a layered film. The polymer solutions may be the same or different from each other. For making two or more functional polymer layers, each polymer solution according to the aimed function is extruded from each nozzle.

In order to obtain desired optical characters and mechanical characters, the transparent film preferably has a layered structure. The layered structure consists of preferably 2 to 10 layers, more preferably 2 to 6 layers, further preferably 2 to 4 layers.

The polymer solution can be cast simultaneously with dopes for other functional layers (e.g., adhesive layer, dye layer, antistatic layer, anti-halation layer, ultraviolet layer, polarizing layer).

A matting layer containing a matting agent and a polymer may be provided on one or each of the surfaces of the transparent film to improve handling of the firm in the production process. The matting agent and the polymers are described in Japanese Patent Provisional Publication No. 10(1998)-44327.

The uniaxial or biaxial optical characteristic is preferably given to the transparent film by a stretching process.

The optically uniaxial film can be obtained by a normal uniaxial or biaxial stretching process.

The optically biaxial film is preferably produced by an unbalance biaxial stretching process. The procedure of unbalance biaxial stretching comprises the steps of: stretching a film along one direction to expand by a certain extent, and then stretching the film vertically to the direction of the first stretching to expand by a more extent than that in the first stretching. In the procedure, the film may be stretched along the two vertical directions at the same time.

The transparent film is preferably stretched under the following conditions.

(1) Stretching the transparent film containing a large amount of a solvent:

After a polymer film used as the transparent film is formed by the solvent film-forming method, the film is preferably stretched with the solvent remaining (insufficiently dried). The amount of the remaining solvent is preferably in the range of 5 to 50 wt. %, more preferably in the range of 10 to 46 wt. %, further preferably in the range of 15 to 40 wt. % based on the weight of the transparent film.

(2) Preheat before stretching;

Before the stretching process, the film is preferably heated. The heating temperature is preferably in the range of 60 to 160° C., more preferably in the range of 70 to 150° C., and most preferably in the range of 80 to 140° C. The heating time is preferably in the range of 10 seconds to 8 minutes, and more preferably in the range of 15 seconds to 5 minutes. The film is preferably heated while fixing the both ends of the film. After the heating process, the stretching process (described below) is preferably conducted on a processing line continuously.

(3) Stretching in a low expanding ratio and in a low speed:

The expanding ratio of stretching is preferably in the range of 1.10 to 1.60, more preferably in the range of 1.10 to 1.50, and most preferably in the range of 1.10 to 1.40.

This expanding ratio is very low in comparison with a conventional synthetic polymer film used as an optical compensatory sheet of liquid crystal display. The conventional film is generally stretched by 3 times or more.

The stretching speed is preferably in the range of S to 100%/minute, more preferably in the range of 10 to 80%/minute, and most preferably in the range of 15 to 70%/minute.

This stretching speed is very slow in comparison with the conventional synthetic polymer film, which is generally stretched in 500%/minute or more.

A stretched polymer film has usually been thermally fixed at a temperature of higher than 200° C. according to a conventional stretching process. However, the film is preferably not thermally fixed according to the second embodiment of the present invention.

After stretching, the transparent film is dried until the amount of the remaining solvent reaches 3 wt. % or less, preferably 2 wt. % or less.

The transparent film has a thickness preferably in the range of 80 to 160 $\mu$m, more preferably in the range of 90 to 150 $\mu$m, and most preferably in the range of 100 to 140 $\mu$m.

The transparent film itself can be used as an optical compensatory sheet. Further, an optically anisotropic layer (of the second embodiment described below) can be formed on the transparent film to be used as the optical compensatory sheet.

The optically uniaxial or optically biaxial transparent film can be laminated with an optically isotropic transparent film (such as a cellulose acetate film). The optically isotropic film has a thickness preferably in the range of 10 to 500 $\mu$m, and more preferably in the range of 50 to 200 $\mu$m.

The transparent film can be subjected to a surface treatment (e.g., glow discharge treatment, corona discharge treatment, ultraviolet (UV) treatment, flame treatment) to improve adhesion to a layer formed on the film (e.g., adhesive layer, orientation layer, optically anisotropic layer). The film may contain UV absorber.

An adhesive layer (undercoating layer) can be provided on the transparent film. Japanese Patent Provisional Publication No. 7(1995)-333433 describes the adhesive layer. The adhesive layer has a thickness preferably in the range of 0.1 to 2 $\mu$m, and more preferably in the range of 0.2 to 1 $\mu$m.

[Orientation Layer]

An orientation layer can be provided between the transparent film and the optically anisotropic layer.

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a polymer layer with paper or cloth several times along a certain direction.

For aligning the liquid crystal molecules in an average inclined angle of not more than 5°, a polymer which does not lower the surface energy of the orientation layer (namely, a polymer usually used for the orientation layer) is preferred.

The orientation layer preferably has a thickness of 0.01 to 5 $\mu$m, and more preferably 0.05 to 1 $\mu$m.

After the liquid crystal molecules are aligned by the orientation layer to form an optically anisotropic layer, the optically anisotropic layer can be transferred to the transparent support. The aligned and fixed liquid crystal molecules can keep the alignment without the orientation layer.

In some cases, alignment in an average inclined angle of less than 5° can be obtained without rubbing treatment nor the orientation layer. However, even in that case, an orientation layer which chemically combines with the liquid crystal molecules on the interface can be provided so as to improve adhesion between the molecules and the support (Japanese Patent Provisional Publication No. 9(1997)-152509). Such orientation layer does not need the rubbing treatment.

In the case that two or more optically anisotropic layers are formed on the same side of the transparent film, an optically anisotropic layer first formed on a transparent support can function as an orientation layer of a second formed optically anisotropic layer.

[Optically Anisotropic Layer (First Embodiment)]

The optically anisotropic layer of the first embodiment is formed from discotic liquid crystal molecules. The discotic liquid crystal molecules are aligned under the condition that an average inclined angle between the discotic plane of the molecule and the surface of the transparent film is less than 5°.

The above-described optically uniaxial or biaxial transparent film and the discotic liquid crystal molecules aligned in an average inclined angle of less than 5° cooperatively control the total retardation of the optical compensatory sheet.

With respect to the total retardation of the optical compensatory sheet, a retardation value in plane (Re) is preferably in the range of 20 to 200 nm, more preferably in the range of 20 to 100 nm, and most preferably in the range of 20 to 70 nm. A retardation value along the thickness direction (Rth) of the optical compensatory sheet is preferably in the range of 70 to 500 nm, more preferably in the range of 70 to 300 nm, and most preferably in the range of 70 to 200 nm.

The Re and Rth retardation values of the optical compensatory sheet are defined by the following formulas:

$$Re = (nx - ny) \times d$$

$$Rth = [\{(nx+ny)/2\} - nz] \times d$$

in which each of nx and ny is a refractive index in the plane of the optical compensatory sheet; nz is a refractive index along the thickness direction of the optical compensatory sheet; and d is the thickness of the optical compensatory sheet.

The discotic liquid crystal molecules are preferably fixed with their alignment maintained. The alignment can be fixed by a binder polymer, but is preferably fixed by polymerization.

The discotic liquid crystal molecules are described in various documents (C. Destrade et al, Mol. Crysr. Liq. Cryst., vol. 71, page 111 (1981); Japan Chemical Society, Quarterly chemical Review (written in Japanese), chapter 5 and chapter 10, section 2 (1994); B. Kohne et al., Angew. Chem. Soc. Chem. Comm., page 1794 (1985); and J. Zhang at al., J. Am. Chem. Soc., vol. 116, page 2655 (1994)). The polymerization reaction of the discotic liquid crystal molecules is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula (I):

$$D(-L-Q)_n \qquad (I)$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

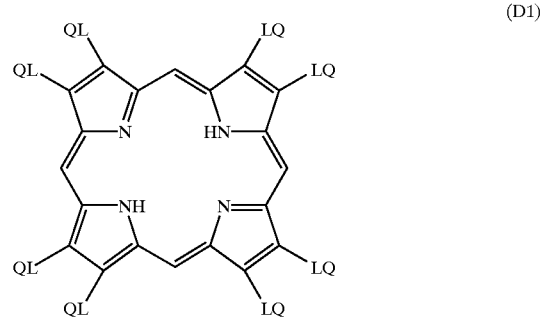

(D1)

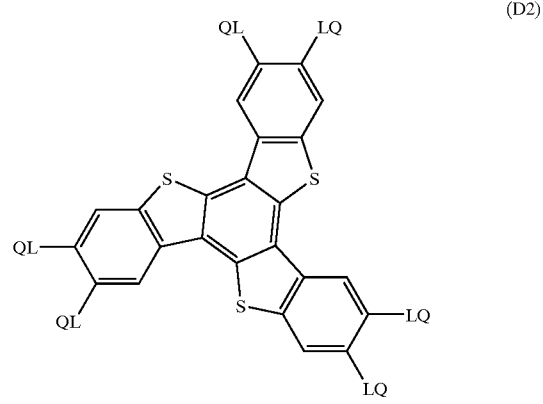

(D2)

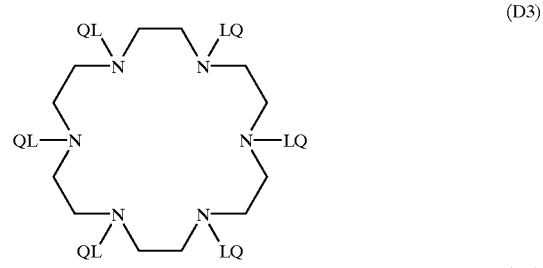

(D3)

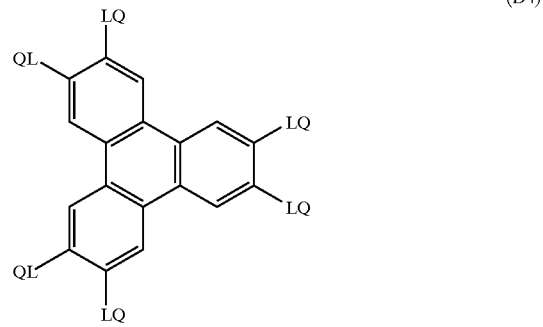

(D4)

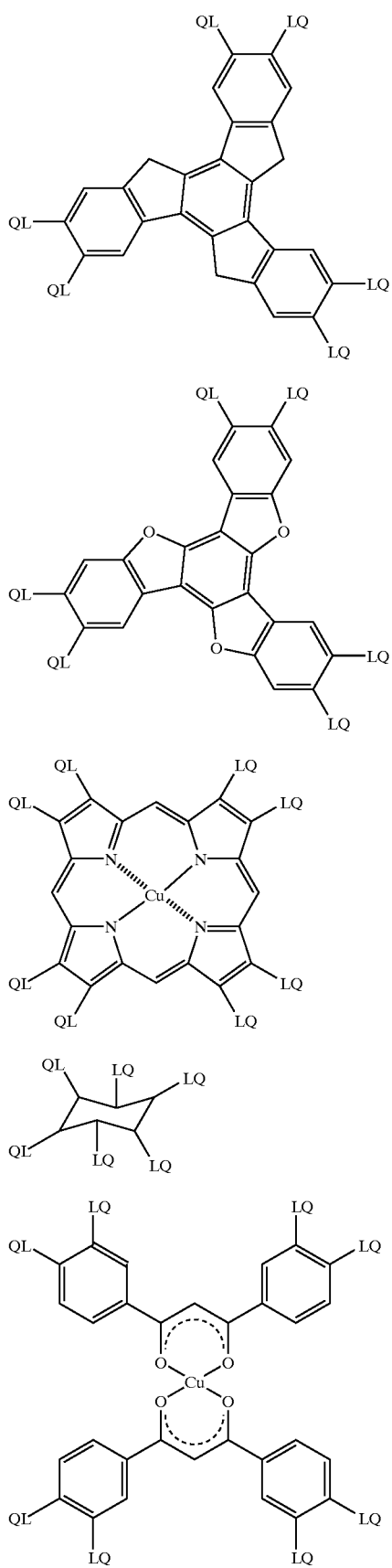
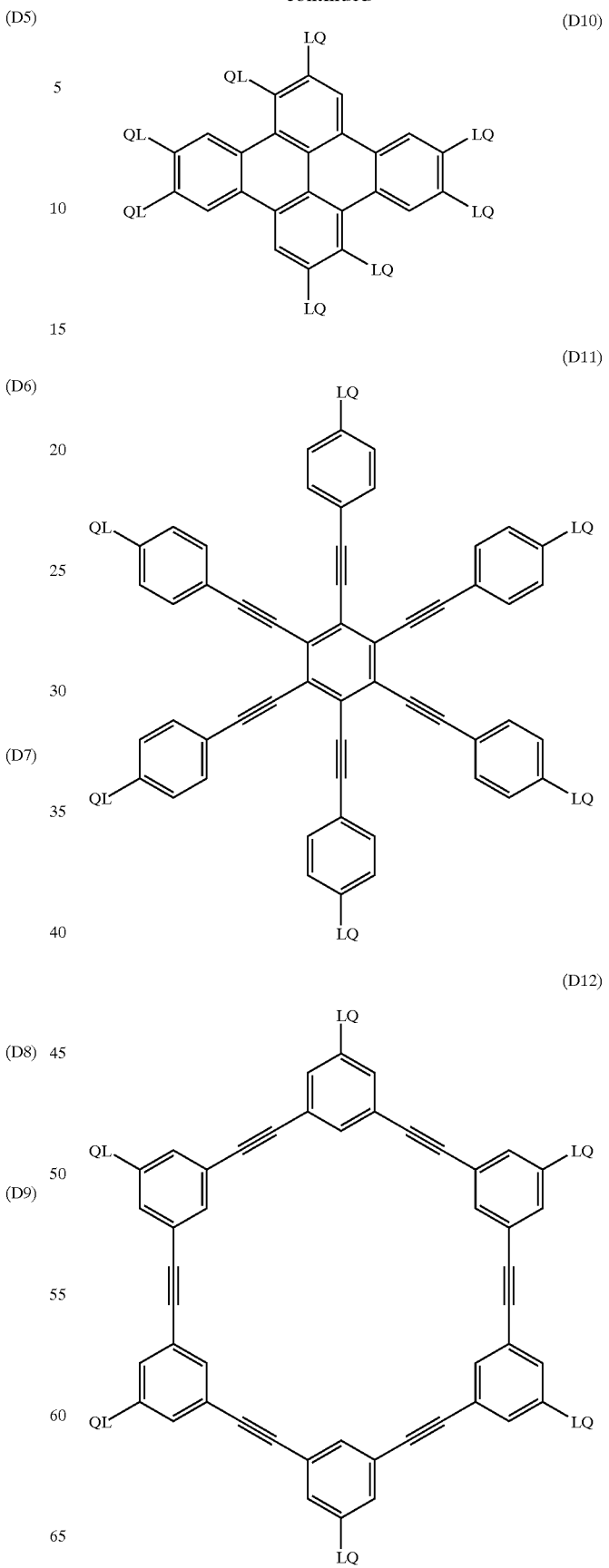

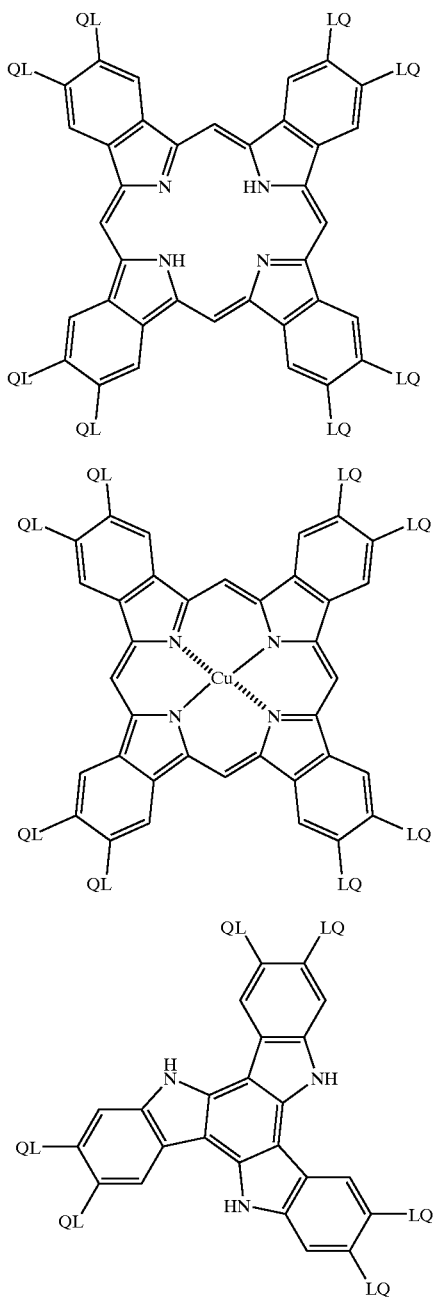

In the formula, the divalent linking group (L) preferably is selected from the group consisting of an alkylene group, an alkenylene group, an arylene group, —CO—, —NH—, —O—, —S— and combinations thereof. The divalent linking group (L) more preferably is a divalent linking group comprising at least two divalent groups selected from the group consisting of an alkylene group, an alkenylene group, an arylene group, —CO—, —NH—, —O— and —S—. The divalent linking group (L) further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—C—AL—C—CO—
L8: —CO—NH—AL—
L9: —NH—AL—O—
L10: —NH—AL—C—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18—CO—AR—O—AL—o—CO—
L19: —C—CO—AR—O—AL—O—AL—O—CO—
L20: —O—CO—AR—O—AL—O—AL—O—AL—O—CO—
L21: —S—AL—
L22: —S—AL—O—
L23: —S—AL—C—CO—
L24: —S—AL—S—AL—
L25: —S—AR—AL—

The polymerizable group (Q) in the formula (I) is determined according to the polymerization reaction. Examples of the polymerizable groups (Q) are shown below.

(Q1) —CH=CH$_2$ (Q2) —CH=CH—CH$_3$ (Q3) —CH=CH—C$_2$H$_5$ (Q4) —CH=CH—n-C$_3$H$_7$ (Q5) —C(CH$_3$)=CH$_2$ (Q6) —CH=C(CH$_3$)—CH$_3$ (Q7) —C≡CH (Q8) —CH—CH$_2$ (epoxide)
         \O/

(Q9) —CH—CH$_2$ (aziridine, NH)
         \N/
          H (Q10) —SH

—CHO (Q11)

—OH (Q12)

—CO₂H (Q13)

—N=C=O (Q14)

—NH₂ (Q15)

—SO₃H (Q16)

—N=C=S (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (I), n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules having a polymerizable group (Q) can be used in combination with those having no polymerizable group.

The discotic liquid crystal molecule having no polymerizable group (non-polymerizable discotic liquid crystal molecule) is preferably a molecule in which hydrogen atom or an alkyl group is introduced into the above-described polymerizable discotic liquid crystal molecule in place of the polymerizable group. Namely, the non-polymerizable discotic liquid crystal molecule is preferably represented by the following formula (Ia):

D(—L—R)ₙ  (Ia)

in which D is a discotic core; L is a divalent linking group; R is hydrogen atom or an alkyl group; and n is an integer of 4 to 12.

Examples of the discotic cores (D) in the formula (Ia) are the same as those in the above-described polymerizable discotic liquid crystal molecule except that LQ (or QL) is replaced with LR (or BL).

Examples of the divalent linking groups (L) in the formula (Ia) are also the same as those in the above-described polymerizable discotic liquid crystal molecule.

The alkyl group R has preferably 1 to 40 carbon atoms, more preferably 1 to 30 carbon atoms. A chain alkyl group is preferred to a cyclic one, and further a straight chain alkyl group is preferred to a branched one. The R in the formula (Ia) is particularly preferably hydrogen atom or a straight chain alkyl group having 1 to 30 carbon atoms.

In order to align the discotic liquid crystal molecules so that an average angle between the discotic plane of each molecule and the surface of the transparent support (namely, an average inclined angle) may be less than 5., it is preferred to use, in an amount of a certain range, a compound which can cause phase separation with the discotic liquid crystal molecules. Examples of the compound which can cause phase separation with the discotic liquid crystal molecules include cellulose esters of lower fatty acids, fluorine-containing surface active agents and compounds having 1,3,5-triazine ring.

Here, the term "lower fatty acid" in the above "cellulose esters of lower fatty acids" means a fatty acid having 6 or less carbon atoms. The number of carbon atoms is preferably 2 to 5, more preferably 2 to 4. The lower fatty acid may have a substituent group (e.g., hydroxyl). Two or more fatty acids may react with cellulose to form a ester. Examples of the cellulose esters of lower fatty acids include cellulose acetate, cellulose propionate, cellulose butyrate, cellulose hydroxypropionate, cellulose acetate propionate and cellulose acetate butyrate. Cellulose acetate butyrate is particularly preferred. The butyration degree of cellulose acetate butyrate is preferably 30% or more, more preferably in the range of 30 to 80%. The acetic substitution degree of cellulose acetate butyrate is preferably 30% or less, more preferably in the range of 1 to 30%.

The cellulose ester of lower fatty acid is used in an amount of preferably 0.01 to 1 wt. %, more preferably 0.1 to 1 wt. %, most preferably 0.3 to 0.9 wt. % based on the amount of discotic liquid crystal molecules.

The cellulose ester of lower fatty acid is applied in an amount of preferably 1 to 500 mg/m², more preferably 3 to 300 mg/m², most preferably 5 to 200 mg/m².

A fluorine-containing surface active agent comprises a fluorine-containing hydrophobic group, a nonionic, anionic, cationic or amphoteric hydrophilic group, and an optional linking group.

A fluorine-containing surface active agent comprising one hydrophobic group and one hydrophilic group is represented by the following formula (II):

Rf—L³—Hy  (II)

in which Rf is a monovalent hydrocarbon residue substituted with fluorine atom, L³ is a single bond or a divalent linking group, and Hy is a hydrophilic group.

In the formula (II), Rf serves as a hydrophobic group. The hydrocarbon residue is preferably an alkyl group or an aryl group. The alkyl group preferably has 3 to 30 carbon atoms, and the aryl group preferably has 6 to 30 carbon atoms.

The hydrogen atoms of the hydrocarbon residue are partially or fully substituted with fluorine atoms. The ratio of hydrogen atoms substituted with fluorine atoms is preferably in the range of not less than 50%, more preferably in the range of not less than 60%, further preferably in the range of not less than 70%, and most preferably in the range of not less than 80%.

The remaining hydrogen atoms (not substituted with fluorine atoms) may be further substituted with other halogen atoms (e.g., chlorine, bromine).

Examples of Rf are shown below.

Rf1: n—C₈H₁₇—
Rf2: n—C₆H₁₃—
Rf3: Cl—(CF₂—CFCl)₃—CF₂—
Rf4: H—(CF₂)₈—
Rf5: H—(CF₂)₁₀—
Rf6: n—C₉H₁₉—
Rf7: pentafluorophenyl
Rf8: n—C₇H₁₅—
Rf9: Cl—(CF₂—CFCl)₂—CF₂— 
Rf10: H—(CF₂)₄—
Rf11: H—(CF₂)₆—
Rf12: Cl—(CF₂)₆—
Rf13: C₃F₇—

In the formula (II), the divalent linking group is preferably a divalent linking group selected from the group consisting of an alkylene group, an arylene group, a divalent heterocyclic residue, —CO—, —NR— (in which R is an alkyl group having 1 to 5 or hydrogen), —O—, —SO$_2$— and a combination thereof.

Examples of L$^3$ are shown below. In the examples, the left side is attached to the hydrophobic group (Rf), and the right side is attached to the hydrophilic group (Hy). The AL means an alkylene group, the AR means an arylene group, and the Hc means a divalent heterocyclic residue. The alkylene group, the arylene group and the divalent heterocyclic residue may have substituent groups (e.g., alkyl group).

L0: single bond
L31: —SO$_2$—NR—
L32: —AL—O—
L33: —CO—NR—
L34: —AR—O—
L35: —SO$_2$—NR—AL—CO—O—
L36: —CO—O—
L37: —SO$_2$—NR—AL—O—
L38: —SO$_2$—NR—AL—
L39: —CO—NR—AL—
L40: —AL$^1$—O—AL$^2$—
L41: —Hc—AL—
L42: SO$_2$—NR—AL$^1$—O—AL$^2$—
L43: —AR—
L44: —O—AR—SO$_2$—NR—AL—
L45: —O—AR—SO$_2$—NR—
L46: —O—AR—O—

In the formula (II), Hy is a nonionic hydrophilic group, an anionic hydrophilic group, a cationic hydrophilic group or a combination thereof (namely, amphoteric hydrophilic group). A nonionic hydrophilic group is particularly preferred.

Examples of Hy in the formula (II) are shown below.

Hy1: —(CH$_2$CH$_2$O)$_n$—H
  (n is an integer of 5 to 30)
Hy2: —(CH$_2$CH$_2$O)$_n$—R$^1$
  (n is an integer of 5 to 30, and
  R$^1$ is an alkyl group having 1 to 6 carbon atom)
Hy3: —(CH$_2$CHOHCH$_2$)$_n$—H
  (n is an integer of 5 to 30)
Hy4: —COOM
  (M is hydrogen atom, an alkali metal atom or in a dissociated form)
Hy1: —SO$_3$M
  (M is hydrogen atom, an alkali metal atom or in a dissociated form)
Hy6: —(CH$_2$CH$_2$O)$_n$—CH$_2$CH$_2$CH$_2$—SO$_3$M
  (n is an integer of 5 to 30, and M is hydrogen atom, an alkali metal atom)
Hy7: —OPO(OH)$_2$
Hy8: —N$^+$(CH$_3$)$_3$.X$^-$
  (X is a halogen atom)
Hy9: —COONH$_4$ Nonionic hydrophilic groups (Hy1, Hy2, Hy3) are preferred, and a hydrophilic group of polyethylene oxide (Hy1) is most preferred.

Concrete examples of the fluorine-containing surface active agent represented by the formula (II) are shown below. Each example is represented by a combination of the above Rf, L$^3$ and Hy.

FS-1: Rf1-L31 (R=C$_3$H$_7$)-Hy1 (n=6)
FS-2: Rf1-L31 (R=C$_3$H$_7$)-Hy1 (n=11)
FS-3: Rf1-L31 (R=C$_3$H$_7$)-Hy1 (n=16)
FS-4: Rf1-L31 (R=C$_3$H$_7$)-Hy1 (n=21)
FS-5: Rf1-L31 (R=C$_2$H$_5$)-Hy1 (n=6)
FS-6: Rf1-L31 (R=C$_2$H$_5$)-Hy1 (n=11)
FS-7: Rf1-L31 (R=C$_2$H$_5$)-Hy1 (n=16)
FS-8: Rf1-L31 (R=C$_2$H$_5$)-Hy1 (n=21)
FS-9: Rf2-L31 (R=C$_3$H$_7$)-Hy1 (n=6)
FS-10: Rf2-L31 (R=C$_3$H$_7$)-Hy1 (n=11)
FS-11: Rf2-L31 (R=C$_3$H$_7$)-Hy1 (n=16)
FS-12: Rf2-L31 (R=C$_3$H$_7$)-Hy1 (n=21)
FS-13: Rf3-L32 (AL=CH$_2$)-Hy1 (n=5)
FS-14: Rf3-L32 (AL=CH$_2$)-Hy1 (n=10)
FS-15: Rf3-L32 (AL=CH$_2$)-Hy1 (n=15)
FS-16: Rf3-L32 (AL=CH$_2$)-Hy1 (n=20)
FS-17: Rf4-L33 (R=C$_3$H$_7$)-Hy1 (n=7)
FS-18: Rf4-L33 (R=C$_3$H$_7$)-Hy1 (n=13)
FS-19: Rf4-L33 (R=C$_3$H$_7$)-Hy1 (n=19)
FS-20: Rf4-L33 (R=C$_3$H$_7$)-Hy1 (n=25)
FS-21: Rf5-L32 (AL=CH$_2$)-Hy1 (n=11)
FS-22; Rf5-L32 (AL=CH$_2$)-Hy1 (n=15)
FS-23: Rf5-L32 (AL=CH$_2$)-Hy1 (n=20)
FS-24: Rf5-L32 (AL=CH$_2$)-Hy1 (n=30)
FS-25: Rf6-L34 (AR=p-phenylene)-Hy1 (n=11)
FS-26: Rf6-L34 (AR=p-phenylene)-Hy1 (n=17)
FS-27: Rf6-L34 (AR=p-phenylene)-Hy1 (n=23)
FS-28: Rf6-L34 (AR=p-phenylene)-Hy1 (n=29)
FS-29: Rf1-L35 (R=C$_3$H$_7$, AL=CH$_2$)-Hy1 (n=20)
FS-30: Rf1-L35 (R=C$_3$H$_7$, AL=CH$_2$)-Hy1 (n=30)
FS-31: Rf1-L35 (R=C$_3$H$_7$, AL—CH$_2$)-Hy1 (n=40)
FS-32: Rf1-L36-Hy1 (n=5)
FS-33: Rf1-L36-Hy1 (n=10)
FS-34: Rf1-L36-Hy1 (n=15)
FS-35: Rf1-L36-Hy1 (n=20)
FS-36: Rf7-L36-Hy1 (n=8)
FS-37: Rf7-L36-Hy1 (n=13)
FS-38: Rf7-L36-Hy1 (n=18)
FS-39: Rf7-L36-Hy1 (n=25)
FS-40: Rf1-L0-Hy1 (n=6)
PS-41: Rf1-L0-Hy1 (n=11)
FS-42: Rf1-L0-Hy1 (n=16)
FS-43: Rf1-L0-Hy1 (n=21)
FS-44: Rf1-L31 (R=C$_3$H$_7$)-Hy2 (n=7, R$^1$=C$_2$H$_5$)
FS-45: Rf1-L31 (R=C$_3$H$_7$)-Hy2 (n=13, R$^1$=C$_2$H$_5$)
FS-46: Rf1-L31 (R=C$_3$H$_7$)-Hy2 (n=20, R$^1$=C$_2$H$_5$)
FS-47: Rf1-L31 (R=C$_3$H$_7$)-Hy2 (n=28, R$^1$=C$_2$H$_5$)
FS-48: Rf8-L32 (AL=CH$_2$)-Hy1 (n=5)
FS-49: Rf8-L32 (AL=CH$_2$)-Hy1 (n=10)
FS-50: Rf8-L32 (AL=CH$_2$)-Hy1 (n=15)
FS-51: Rf8-L32 (AL=CH$_2$)-Hy1 (n=20)
FS-52: Rf1-L37 (R=C$_3$H$_7$, AL=CH$_2$CH$_2$)-Hy3 (n=5)
FS-53: Rf1-L37 (R=C$_3$H$_7$, AL=CH$_2$CH$_2$)-Hy3 (n=7)
FS-54: Rf1-L37 (R=C$_3$H$_7$, AL=CH$_2$CH$_2$)-Hy3 (n=9)
FS-55: Rf1-L37 (R=C$_3$H$_7$, AL=CH$_2$CH$_2$)-Hy3 (n=12)
FS-56: Rf9-L0-Hy4 (M=H)
FS-57: Rf3-L0-Hy4 (M=H)
FS-58: Rf1-L38 (R=C$_3$H$_7$, AL=CH$_2$)-Hy4 (M=K)
FS-59: Rf4-L39 (R=C$_3$H$_7$, AL=CH$_2$)-Hy4 (M=Na)
FS-60: Rf1-L0-Hy5 (M=K)
FS-61: Rf10-L40 (AL$^1$=CH$_2$, AL$^2$=CH$_2$CH$_2$)-Hy5 (M=Na)
FS-62: Rf11-L40 (AL$^1$=CH$_2$, AL$^2$=CH$_2$CH$_2$)-Hy5 (M=Na)
FS-63: Rf5-L40 (AL$^1$=CH$_2$, AL$^2$=CH$_2$CH$_2$)-Hy5 (M=Na)
FS-64: Rf1-L38 (R=C$_3$H$_7$, AL=CH$_2$CH$_2$CH$_2$)-Hy5 (M=Na)
FS-65: Rf1-L31 (R=C$_3$H$_7$)-Hy6 (n=5, N=Na)
FS-66: Rf1-L31 (R=C$_3$H$_7$)-Hy6 (n=10, M=Na)
PS-67: Rf1-L31 (R=C$_3$H$_7$)-Hy6 (n=15, M=Na)
FS-68: Rf1-L31 (R=C$_3$H$_7$)-Hy6 (n=20, M=Na)
FS-69: Rf1-L38 (R=C$_2$H$_5$, AL=CH$_2$CH$_2$)-Hy7

FS-70: Rf1-L38 (R=H, AL=CH$_2$CH$_2$CH$_2$)-Hy8 (X=I)
FS-71: Rf11-L41 (the following Hc, AL=CH$_2$CH$_2$CH$_2$)-Hy6
(N—dissociated form)

(Hc of FS-71)

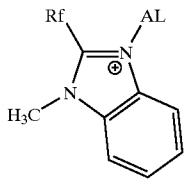

FS-72; Rf1-L42 (R=C$_3$H$_7$, AL$^1$=CH$_2$CH$_2$, AL$^2$=CH$_2$CH$_2$CH$_2$)-Hy6 (MN=Na)
FS-73: Rf12-L0-Hy5 (M=Na)
FS-74: Rf13-L43 (AR=o-phenylene)-Hy6 (M=K)
FS-75: Rf13-L43 (AR=m-phenylene)-Hy6 (M=K)
FS-76: Rf13-L43 (AR=p-phenylene)-Hy6 (M=K)
FS-77: Rf6-L44 (R=C$_2$H$_5$, AL=CH$_2$CH$_2$)-Hy5 (M=H)
FS-78: Rf6-L45 (AR=p-phenylene, R=C$_2$H$_5$)-Hy1 (n=9)
FS-79: Rf6-L45 (AR=p-phenylene, R=C$_2$H$_5$)-Hy1 (n=14)
FS-80: Rf6-L45 (AR=p-phenylene, R=C$_2$H$_5$)-Hy1 (n=19)
FS-81; Rf6-L45 (AR=p-phenylene, R=C$_2$H$_5$)-Hy1 (n=28)
FS-82: Rf6-L46 (AR=p-phenylene)-Hy1 (n=5)
FS-83: Rf6-L46 (AR=p-phenylene)-Hy1 (n=10)
FS-84: Rf6-L46 (AR=p-phenylene)-Hy1 (n=15)
FS-85: Rf6-L46 (AR=p-phenylene)-Hy1 (n=20)

A fluorine-containing surface active agent having two or more fluorine-containing hydrophobic or hydrophilic groups may be used. Examples of such surface active agent are shown below.

(FS-86 to FS-88)

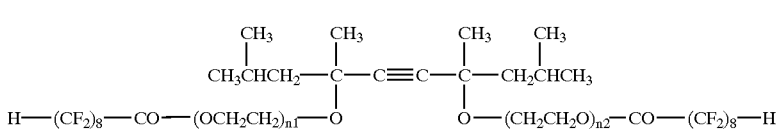

FS-86: n1+n2=12
FS-87: n1+n2=18
FS-88: n1+n2=24

(FS-89 to FS-91)

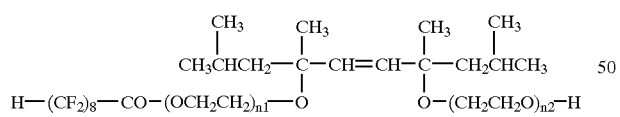

FS-89: n1+n2=20
FS-90: n1+n2=30
FS-91: n1+n2=40

FS-92: n=5
FS-93: n=10
FS-94: n=15
FS-95: n=20

(FS-96)

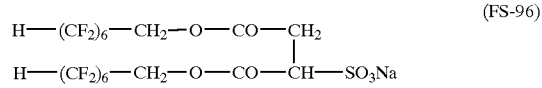

Two or more fluorine-containing surface active agents may be used in combination.

Surface active agents are described in various publications (e.g., Hiroshi Horiguchi, "New Surface Active Agents (written in Japanese)", Sankyo Shuppan Co., 1975; M. J. Schick, "Nonionic Surfactants", Marcell Dekker Inc., New York (1967); Japanese Patent Provisional Publication No. 7(1995)-13293).

The fluorine-containing surface active agent is used preferably in an amount of 2 to 30 wt. %, more preferably in an amount of 3 to 25 wt. %, most preferably in an amount of 5 to 10 wt. % based on the amount of the discotic liquid crystal compound.

The fluorine-containing surface active agent is applied preferably in an amount of 25 to 1,000 mg/m$^2$, more preferably in an amount of 30 to 500 mg/m$^2$, most preferably in an amount of 35 to 200 mg/m$^2$.

The compound having 1,3,5-triazine ring is preferably represented by the formula (III);

(III)

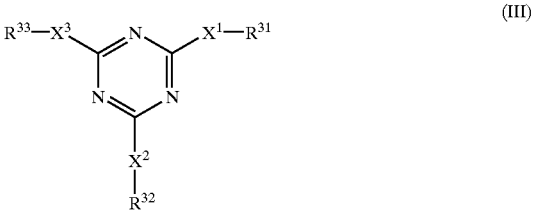

in which each of $X^1$, $X^2$ and $X^3$ is independently a single bond, —NR— (R is an alkyl group having 1 to 30 carbon atoms or a hydrogen atom), —O— or —S—; and each of (FS-92 to FS-95)

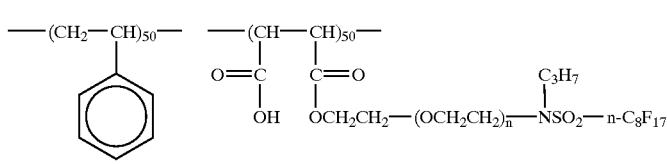

$R^{31}$, $R^{32}$ and $R^{33}$ is independently an alkyl group, an alkenyl group, an aryl group and a heterocyclic group.

The compound represented by the formula (III) is preferably a melamine compound. In the melamine compound, $X^1$, $X^2$ or $X^3$ in the formula (III) is —NR—. Otherwise, $X^1$, $X^2$ or $X^3$ is a single bond and $R^{31}$, $R^{32}$ and $R^{33}$ are heterocyclic groups in each of which a nitrogen atom has a dissociated valence. The melamine compound is described in detail below as a compound of the formula (IV).

The R in —NR— is preferably a hydrogen atom.

Each of $R^{31}$, $R^{32}$ and $R^{33}$ is preferably an aryl.

As the above alkyl group, a chain alkyl group is preferred to a cyclic one, and a straight chain alkyl group is preferred to a branched one. The alkyl group has preferably 1 to 30 carbon atoms, more preferably 2 to 30 carbon atoms, further preferably 4 to 30 carbon atoms, and most preferably 6 to 30 carbon atoms. The alkyl group may have a susbstituent group. Examples of the susbstituent group include a halogen atom, an alkoxy group (e.g., methoxy, ethoxy, epoxyethyloxy) and an acyloxy group (e.g., acryloyloxy, methacryloyloxy).

As the above alkenyl group, a chain alkenyl group is preferred to a cyclic one, and a straight chain alkenyl group is preferred to a branched one. The alkenyl group has preferably 2 to 30 carbon atoms, more preferably 3 to 30 carbon atoms, further preferably 4 to 30 carbon atoms, and most preferably 6 to 30 carbon atoms. The alkenyl group may have a susbstituent group. Examples of the susbstituent group include a halogen atom, an alkoxy group (e.g., methoxy, ethoxy, epoxyethyloxy) and an acyloxy group (e.g., acryloyloxy, methacryloyloxy).

The above aryl group is preferably phenyl or naphthyl, particularly preferably phenyl.

The aryl group may have a susbstituent group. Examples of the susbstituent group include a halogen atom, hydroxyl cyano, nitro, carboxyl, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, sulfamoyl, an alkyl-substituted sulfamoyl group, an alkenyl-substituted sulfamoyl group, an aryl-substituted sulfamoyl group, a sulfone amide group, carbamoyl, an alkyl-substituted carbamoyl group, an alkenyl-substituted carbamoyl group, an aryl-substituted carbamoyl group, an amide group, an alkylthio group, an alkenylthio group, an arylthio group and an acyl group.

The aforementioned description of the alkyl group can be applied for the above alkyl group.

Also the description of the alkyl group can be applied for the alkyl moieties of the alkoxy group, the acyloxy group, the alkoxycarbonyl group, the alkyl-substituted sulfamoyl group, the sulfone amide group, the alkyl-substituted carbamoyl group, the amide group, the alkylthio group and the acyl group.

The aforementioned description of the alkenyl group can be applied for the above alkenyl group. Also the description of the alkenyl group can be applied for the alkenyl moieties of the alkenyloxy group, the acyloxy group, the alkenyloxycarbonyl group, the alkenyl-substituted sulfamoyl group, the amide group, the alkenylthio group and the acyl group.

Examples of the aryl group include phenyl, α-naphthyl, β-naphthyl, 4-methoxyphenyl, 3,4-diethoxyphenyl, 4-octyloxyphenyl and 4-dodecyloxyphenyl. These examples can be applied for the aryl moieties of the acyloxy group, the acyloxy group, the aryloxycarbonyl group, the aryl-substituted sulfamoyl group, the sulfone amide group, the aryl-substituted carbamoyl group, the amide group, the arylthio group and the acyl group.

If $X^1$, $X^2$ or $X^3$ is —NR—, —O— or —S—, the heterocyclic group is preferably aromatic. The aromatic heterocyclic ring is generally unsaturated, and preferably has double bonds as many as possible. The aromatic heterocyclic ring is preferably 5-, 6- or 7-membered (more preferably 5- or 6-membered, most preferably 6-membered). Preferred hetero-atoms are nitrogen, oxygen and sulfur. Nitrogen atom is particularly preferred. As the aromatic heterocyclic ring, pyridine ring is particularly preferred (2-pyridyl or 4-pyridyl is particularly preferred as the heterocyclic group). The heterocyclic ring may have a substituent group. Examples of the substituent group are the same as those for the aryl group described above.

If $X^1$, $X^2$ or $X^3$ is a single bond, the heterocyclic group is preferably a heterocyclic group in which a nitrogen atom has a dissociated valence. The heterocyclic group is preferably 5-, 6- or 7-membered (more preferably 5- or 6-membered, most preferably 5-membered). The heterocyclic group may have two or more nitrogen atoms, and also may have a hetero-atom (e.g., O, S) other than nitrogen. The heterocyclic group may have a substituent group. Examples of the substituent group are the same as those for the aryl group described above.

Examples of the heterocyclic group in which a nitrogen atom has a dissociated valence are shown below.

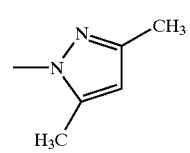

(Hc-1)

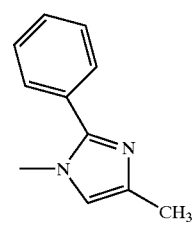

(Hc-2)

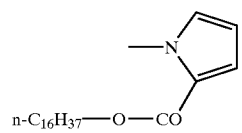

(Hc-3)

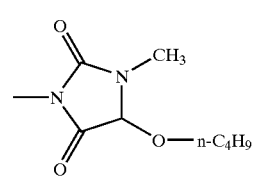

(Hc-4)

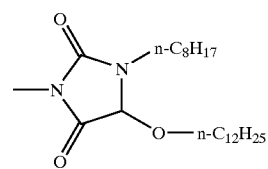

(Hc-5)

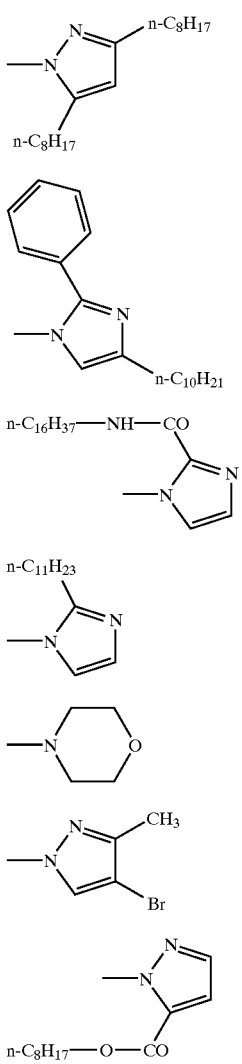

(Hc-6), (Hc-7), (Hc-8), (Hc-9), (Hc-10), (Hc-11), (Hc-12)

At least one of $R^{31}$, $R^{32}$ and $R^{33}$ preferably has an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{31}$, $R^{32}$ and $R^{33}$ preferably has a polymerizable group as a substituent group. The compound having 1,3,5-triazine ring preferably has two or more polymerizable groups. The polymerizable group is preferably placed at the terminal end of $R^{31}$, $R^{32}$ or $R^{33}$.

If the compound having 1,3,5-triazine ring has a polymerizable group, the resultant optically anisotropic layer can contain the discotic liquid crystal molecules polymerized with the compound having 1,3,5-triazine ring.

Hereinafter, $R^{31}$, $R^{32}$ or $R^{33}$ having a polymerizable group as a substituent group is represented by the following formula (Rp):

—L⁵(—Q)ₙ (Rp)

in which $L^5$ is a (n+1) valent linking group; Q is a polymerizable group; and n is an integer of 1 to 5.

The (n+1) valent linking group ($L^5$) in the formula (RpI) is preferably a combined linking group of at least two groups selected from the group consisting of an alkylene group, an alkenylene group, a (n+1) valent aromatic group, a divalent heterocyclic group, —CO—, —NR— (R is an alkyl group having 1 to 30 carbon atoms or a hydrogen atom), —O—, —S— and —SO₂—. The alkylene group preferably has 1 to 12 carbon atoms. The alkenylene group preferably has 2 to 12 carbon atoms. The aromatic group preferably has 6 to 10 carbon atoms.

Examples of $L^5$ in the formula (Rp) are shown below. In the examples, the left side is attached to $X^1$, $X^2$ or $X^3$ (or directly attached to 1,3,5-triazine ring in the case that $X^1$, $X^2$ or $X^3$ is a single bond), and the right side is attached to the polymerizable group (Q) In the examples L53 to L59, each right side (each of n terminal ends) is attached to the polymerizable group (Q). The AL means an alkylene group or an alkenylene group, the Hc means a divalent heterocyclic residue and the AR means an arylene group. The alkylene group, the arylene group and the divalent heterocyclic residue may have substituent groups (e.g., alkyl group, halogen atom).

L51: —AL—O—CO—
L52: —AL—O—
L53: —AR(—O—AL—O—CO—)ₙ
L54: —AR(—O—AL—O—)ₙ
L55: —AR(—O—CO—AL—O—CO—)ₙ
L56: —AR(—CO—O—AL—O—CO—)ₙ
L57: —AR(—O—CO—AR—O—AL—O—CO—)ₙ
L58: —AR(—NR—SO₂—AL—O—CO—)ₙ
L59: —AR (—SO₂—NR—AL—O—CO—)ₙ

Examples of the polymerizable group (Q) in the formula (Rp) are the same as those of the polymerizable groups (Q1 to Q17) for the discotic liquid crystal molecules. The polymerizable group is used to polymerize the compound having 1,3,5-triazine ring with the discotic liquid crystal molecules, and hence the polymerizable group in the compound having 1,3,5-triazine ring is preferably similar to that in the discotic liquid crystal molecule. Therefore, the polymerizable group (Q) in the compound having 1,3,5-triazine ring preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the case that n is 2 or more (2 to 5), the linking group ($L^5$) preferably contains a (n+1) valent aromatic group and more preferably branches at that aromatic group. Preferably, n is an integer of 1 to 3.

Examples of the confound having 1,3,5-triazine ring (except for a melamine compound) are shown below.

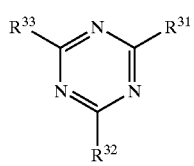

(TR-1 to TR-13)

TR-1: $R^{31}$, $R^{32}$, $R^{33}$: —(CH₂)₉—O—CO—CH=CH₂
TR-2: $R^{31}$, $R^{32}$, $R^{33}$: —(CH₂)₄—CH=CH—(CH₂)₄—O—CO—CH=CH₂
TR-3: $R^{31}$, $R^{32}$: —(CH₂)₉—O—CO—CH=CH₂; $R^{33}$: —(CH₂)₁₂—CH₃
TR-4: $R^{31}$, $R^{32}$: —(CH₂)₄—CH=CH—(CH₂)₄—O—CO—CH=CH₂; $R^{33}$: —(CH₂)₁₂—CH₃
TR-5: $R^{31}$: —(CH₂)₉—O—CO—CH=CH₂; $R^{32}$, $R^{33}$: —(CH₂)₁₂—CH₃

TR-6: $R^{31}$: —$(CH_2)_4$—CH=CH—$(CH_2)_4$—O—CO—CH=CH$_2$; $R^{32}$, $R^{33}$: —$(CH_2)_{12}$—$CH_3$
TR-7: $R^{31}$, $R^{32}$: —$(CH_2)_4$—O—CO—CH=CH$_2$; $R^{33}$: —$(CH_2)_{12}$—$CH_3$
TR-8: $R^{31}$: —$(CH_2)_4$—O—CO—CH=CH$_2$; $R^{32}$, $R^{33}$: —$(CH_2)_{12}$—$CH_3$
TR-9: $R^{31}$, $R^{32}$, $R^{33}$: —$(CH_2)_9$—EpEt
TR-10: $R^{31}$, $R^{32}$, $R^{33}$: —$(CH_2)_4$—C=CH—$(CH_2)_4$—O—EpEt
TR-11: $R^{31}$, $R^{32}$: —$(CH_2)_9$—O—EpEt; $R^{33}$: —$(CH_2)_{12}$—$CH_3$
TR-12: $R^{31}$, $R^{32}$, $R^{33}$: —$(CH_2)_9$—O—CH=CH$_2$
TR-13: $R^{31}$, $R^{32}$: —$(CH_2)_9$—O—CH=CH$_2$; $R^{33}$: —$(CH_2)_{12}$—$CH_3$ (Remark)
EpEt: Epoxyethyl

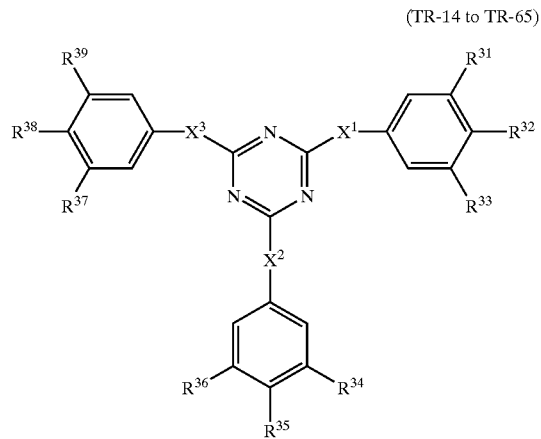

(TR-14 to TR-65)

TR-14: $X^1$, $X^2$, $X^3$—O—; $R^{32}$, $R^{35}$, $R^{38}$: —O—$(CH_2)_9$—O—CO—CH=CH$_2$
TR-15: $X^1$, $X^2$, $X^3$: —O—; $R^{31}$, $R^{32}$, $R^{34}$, $R^{35}$, $R^{37}$, $R^{38}$: —O—$(CH_2)_9$—O—CO—CH=CH$_2$
TR-16: $X^1$, $X^2$, $X^3$: —O—; $R^{32}$, $R^{35}$, $R^{38}$: —O—$(CH_2)_4$—CH=CH—$(CH_2)_4$—O—CO—CH=CH$_2$
TR-17: $X^1$, $X^2$, $X^3$: —O—; $R^{31}$, $R^{32}$, $R^{34}$, $R^{35}$, $R^{37}$, $R^{38}$: —O—$(CH_2)_4$—CH=CH—$(CH_2)_4$—O—CO—CH=CH$_2$
TR-18: $X^1$, $X^2$, $X^3$: —O—; $R^{31}$, $R^{33}$, $R^{34}$, $R^{35}$, $R^{37}$, $R^{39}$: —O—$(CH_2)_9$—O—CO—CH=CH$_2$
TR-19: $X^1$, $X^2$, $X^3$: —O—; $R^{31}$, $R^{32}$, $R^{33}$, $R^{34}$, $R^{35}$, $R^{36}$, $R^{37}$, $R^{38}$, $R^{39}$: —O—$(CH_2)_9$—O—CO—CH=CH$_2$
TR-20: $X^1$, $X^2$: —O—; $X^3$: —NH—; $R^{32}$, $R^{35}$, $R^{38}$: —O—$(CH_2)_9$—O—CO—CH=CH$_2$
TR-21: $X^1$, $X^2$: —O—; $X^3$: —NH—; $R^{32}$, $R^{35}$: —O—$(CH_2)_4$—O—CO—CH=CH$_2$; $R^{38}$: —O—$(CH_2)_{12}$—$CH_3$
TR-22: $X^1$, $X^2$: —O—; $X^3$: —NH—; $R^{32}$, $R^{35}$: —O—$(CH_2)_4$—O—CO—CH=CH$_2$; $R^{37}$, $R^{38}$: —O—$(CH_2)_{12}$—$CH_3$
TR-23: $X^1$, $X^2$: —O—; $X^3$: —NH—; $R^{32}$, $R^{35}$: —O—$(CH_2)_4$—O—CO—CH=CH$_2$; $R^{38}$: —O—CO—$(CH_2)_{11}$—$CH_3$
TR-24: $X^1$: —O—; $X^2$, $X^3$: —NH—; $R^{31}$, $R^{33}$: —O—$(CH_2)_{12}$—$CH_3$; $R^{35}$, $R^{38}$: —O—$(CH_2)_9$—O—CO—CH=CH$_2$
TR-25 $X^1$: —O—; $X^2$, $X^3$: —NH—; $R^{31}$, $R^{32}$: —O—$(CH_2)_6$—O—CO—CH=CH$_2$; $R^{35}$, $R^{38}$: —O—$(CH_{21})_{11}$—$CH_3$
TR-26: $X^1$: —O—; $X^2$, $X^3$: —NH—; $R^{31}$, $R^{32}$, $R^{33}$: —O—$(CH_2)_6$—O—CO—CH=CH$_2$; $R^{35}$, $R^{38}$: —O—$(CH_2)_{11}$—$CH_3$
TR-27: $X^1$, $X^2$: —NH—; $X^3$: —S—; $R^{32}$, $R^{35}$: —O—$(CH_2)_9$—O—CO—CH=CH$_2$; $R^{38}$: —O—CO—$(CH_2)_{11}$—$CH_3$
TR-28: $X^1$, $X^2$: —NH—; $X^3$: —S—; $R^{31}$, $R^{32}$, $R^{34}$, $R^{35}$: —O—$(CH_2)_9$—O—CO—CH=CH$_2$; $R^{38}$: —O—CO—$(CH_2)_{11}$—$CH_3$
TR-29: $X^1$, $X^2$: —NH—; $X^3$: —S—; $R^{32}$, $R^{35}$: —O—$(CH_2)_4$—CH=CH—$(CH_2)_4$—O—CO—CH=CH$_2$; $R^{38}$: —O—CO—$(CH_2)_{11}$—$CH_3$
TR-30: $X^1$, $X^2$: —NH—; $X^3$: —S—; $R^{31}$, $R^{32}$, $R^{34}$, $R^{35}$: —O—$(CH_2)_4$—CH=CH—$(CH_2)_4$—O—CO—CH=CH$_2$; $R^{38}$: —O—CO—$(CH_2)_{11}$—$CH_3$
TR-31: $X^1$, $X^2$: —NH—; $X^3$: —S—; $R^{31}$, $R^{33}$, $R^{34}$, $R^{36}$: —O—$(CH_2)_9$—O—CO—CH=CH$_2$; $R^{38}$: —O—CO—$(CH_2)_{11}$—$CH_3$
TR-32: $X^1$, $X^2$: —NH—; $X^3$: —S—; $R^{31}$, $R^{32}$, $R^{33}$, $R^{34}$, $R^{35}$, $R^{36}$: —O—$(CH_2)_9$—O—CO—CH=CH$_2$; $R^{38}$: —O—CO—$(CH_2)_{11}$—$CH_3$
TR-33: $X^1$, $X^2$: —O—; $X^3$: —S—; $R^{32}$, $R^{35}$, $R^{38}$: —O—$(CH_2)_9$—O—CO—CH=CH$_2$
TR-34: $X^1$, $X^2$: —O—; $X^3$: —S—; $R^{32}$, $R^{35}$: —O—$(CH_2)_4$—O—CO—CH=CH$_2$; $R^{38}$: —O—$(CH_2)_{12}$—$CH_3$
TR-35: $X^1$, $X^2$: —O—; $X^3$: —S—; $R^{32}$, $R^{35}$: —O—$(CH_2)_4$—O—CO—CH=CH$_2$; $R^{37}$, $R^{38}$: —O—$(CH_2)_{12}$—$CH_3$
TR-36: $X^1$, $X^2$: —O—; $X^3$—S—; $R^{32}$, $R^{35}$: —O—$(CH_2)_4$—O—CO—CH=CH$_2$; $R^{38}$: —O—CO—$(CH_2)_{11}$—$CH_3$
TR-37: $X^1$: —O—; $X^2$, $X^3$: —S—; $R^{31}$, $R^{33}$: —O—$(CH_2)_{12}$—$CH_3$; $R^{35}$, $R^{38}$: —O—$(CH_2)_9$—O—CO—CH=CH$_2$
TR-38: $X^1$: —O—; $X^2$, $X^3$: —S—; $R^{31}$, $R^{32}$: —O—$(CH_2)_6$—O—CO—CH=CH$_2$; $R^{35}$, $R^{38}$: —O—$(CH_2)_{11}$—$CH_3$
TR-39: $X^1$: —O—; $X^2$, $X^3$: —S—; $R^{31}$, $R^{32}$, $R^{33}$: —O—$(CH_2)_6$—O—CO—CH=CH$_2$; $R^{35}$, $R^{38}$: —O—$(CH_2)_{11}$—$CH_3$
TR-40: $X^1$, $X^2$, $X^3$: —S—; $R^{32}$, $R^{35}$, $R^{38}$: —O—$(CH_2)_9$—O—CO—CH=CH$_2$
TR-41: $X^1$, $X^2$, $X^3$: —S—; $R^{31}$, $R^{32}$, $R^{34}$, $R^{35}$, $R^{37}$, $R^{38}$: —O—$(CH_2)_9$—O—CO—CH=CH$_2$
TR-42: $X^1$, $X^2$, $X^3$: —S—; $R^{32}$, $R^{35}$, $R^{38}$: —O—$(CH_2)_4$—CH=CH—$(CH_2)_4$—O—CO—CH=CH$_2$
TR-43: $X^1$, $X^2$, $X^3$: —S—; $R^{31}$, $R^{32}$, $R^{34}$, $R^{35}$, $R^{37}$, $R^{38}$: —O—$(CH_2)_4$—CH=CH—$(CH_2)_4$—O—CO—CH=CH$_2$
TR-44: $X^1$, $X^2$, $X^3$: —S—; $R^{31}$, $R^{33}$, $R^{34}$, $R^{36}$, $R^{37}$, $R^{39}$: —O—$(CH_2)_9$—O—CO—CH=CH$_2$
TR-45: $X^1$, $X^2$, $X^3$: —S—; $R^{31}$, $R^{32}$, $R^{33}$, $R^{34}$, $R^{35}$, $R^{36}$, $R^{37}$, $R^{38}$, $R^{39}$: —O—$(CH_2)_9$—O—CO—CH=CH$_2$
TR-46: $X^1$, $X^2$: —S—; $X^3$: —NH—; $R^{32}$, $R^{35}$, $R^{38}$: —O—$(CH_2)_9$—O—CO—CH=CH$_2$
TR-47: $X^1$, $X^2$: —S—; $X^3$: —NH—; $R^{32}$, $R^{35}$: —O—$(CH_2)_4$—O—CO—CH=CH$_2$; $R^{38}$: —O—$(CH_2)_{12}$—$CH_3$
TR-48: $X^1$, $X^2$: —S—; $X^3$: —NH—; $R^{32}$, $R^{35}$: —O—$(CH_2)_4$—O—CO—CH=CH$_2$; $R^{37}$, $R^{38}$: —O—$(CH_2)_{12}$—$CH_3$
TR-49: $X^1$, $X^2$: —S—; $X^3$: —NH—; $R^{32}$, $R^{35}$—O—$(CH_2)_4$—O—CO—CH=CH$_2$; $R^{38}$: —O—CO—$(CH_2)_{11}$—$CH_3$
TR-50: $X^1$: —O—; $X^2$: —NH—; $X^3$: —S—; $R^{31}$, $R^{33}$: —O—$(CH_2)_{12}$—$CH_3$; $R^{35}$: —O—$(CH_2)_9$—O—CO—CH=CH$_2$; $R^{38}$: —O—CO—$(CH_2)_{11}$—$CH_3$
TR-51: $X^1$: —O—; $X^2$: —NH—; $X^3$: —S—; $R^{31}$, $R^{32}$: —O—$(CH_2)_6$—O—CO—CH=CH$_2$; $R^{35}$: —O—$(CH_2)_{11}$—$CH_3$; $R^{38}$: —O—CO—$(CH_2)_{11}$—$CH_3$
TR-52: $X^1$: —O—; $X^2$: —NH—; $X^3$: —S—; $R^{31}$, $R^{32}$, $R^{33}$: —O—$(CH_2)_6$—O—CO—CH=CH$_2$; $R^{35}$: —O—$(CH_2)_{11}$—$CH_3$; $R^{38}$: —O—CO—$(CH_2)_{11}$—$CH_3$
TR-53: $X^1$, $X^2$, $X^3$: —O—; $R^{32}$, $R^{35}$, $R^{38}$: —O—$(CH_2)$—O—EpEt
TR-54: $X^1$, $X^2$, $X^3$: —O—; $R^{31}$, $R^{32}$, $R^{34}$, $R^{35}$, $R^{37}$, $R^{38}$: —O—$(CH_2)_9$—O—EpEt
TR-55: $X^1$, $X^2$, $X^3$: —O—; $R^{32}$, $R^{35}$, $R^{38}$: —O—$(CH_2)_4$—CH=CH—$(CH_2)_4$—O—EpEt

TR-56: $X^1$, $X^2$, $X^3$: —O—; $R^{31}$, $R^{32}$, $R^{34}$, $R^{35}$, $R^{37}$, $R^{38}$: —O—(CH$_2$)$_4$—CH=CH—(CH$_2$)$_4$—O—EpEt
TR-57: $X^1$, $X^2$, $X^3$: —O—; $R^{31}$, $R^{33}$, $R^{34}$, $R^{36}$, $R^{37}$, $R^{39}$: —O—(CH$_2$)$_9$—O—EpEt
TR-58: $X^1$, $X^2$, $X^3$: —O—; $R^{32}$, $R^{35}$, $R^{38}$: —O—(CH$_2$)$_9$—O—CH=CH$_2$
TR-59: $X^1$, $X^2$: —O—: $X^3$: —NH—; $R^{32}$, $R^{35}$, $R^{39}$: —O—(CH$_2$)$_9$—O—EpEt
TR-60: $X^1$, $X^2$: —O—; $X^3$: —NH—; $R^{32}$, $R^{35}$: —O—(CH$_2$)$_4$—O—EpEt; $R^{38}$: —O—(CH$_2$)$_{12}$—CH$_3$
TR-61: $X^1$, $X^2$: —O—; $X^3$: —NH—; $R^{32}$, $R^{35}$: —O—(CH$_2$)$_4$—O—EpEt; $R^{37}$, $R^{38}$: —O—(CH$_2$)$_{12}$—CH$_3$
TR-62: $X^1$, $X^2$: —O—; $X^3$: —NH—; $R^{32}$, $R^{35}$: —O—(CH$_2$)$_4$—O—EpEt; $R^{38}$: —O—CO—(CH$_2$)$_{11}$—CH$_3$
TR-63: $X^1$: —O—; $X^2$, $X^3$: —NH—; $R^{31}$, $R^{33}$: —O—(CH$_2$)$_{12}$—CH$_3$; $R^{35}$, $R^{38}$: —O—(CH$_2$)$_9$—O—EpEt
TR-64: $X^1$: —O—; $X^2$, $X^3$: —NH—; $R^{31}$, $R^{32}$: —O—(CH$_2$)$_6$—O—EpEt; $R^{35}$, $R^{38}$: —O—(CH$_2$)$_{11}$—CH$_3$
TR-65: $X^1$: —O—; $X^2$, $X^3$: —NH—; $R^{32}$, $R^{35}$, $R^{38}$: —O—(CH$_2$)$_9$—O—CH=CH$_2$
(Remark)
Not defined R: Hydrogen
EpEt:Epoxyethyl The compound having 1,3,5-triazine ring is preferably a melamine compound represented by the following formula (IV).

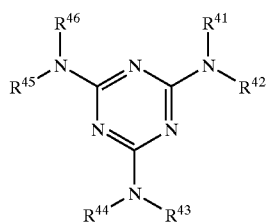

(IV)

in which each of $R^{41}$, $R^{43}$ and $R^{45}$ is independently an alkyl group having 1 to 30 carbon atoms or hydrogen atom; each of $R^{42}$, $R^{44}$ and $R^{46}$ is independently an alkyl group, an alkenyl group, an aryl group or a heterocyclic group; or otherwise $R^{41}$ and $R^{42}$, $R^{43}$ and $R^{44}$ or $R^{45}$ and $R^{46}$ are connected to each other to form a heterocyclic ring.

Each of $R^{41}$, $R^{43}$ and $R^{45}$ is preferably an alkyl group having 1 to 20 carbon atoms or hydrogen atom, more preferably an alkyl group having 1 to 10 carbon atoms or hydrogen atom, further preferably an alkyl group having 1 to 6 carbon atoms or hydrogen atom, most preferably hydrogen atom.

Each of $R^{42}$, $R^{44}$ and $R^{46}$ is preferably an aryl group.

The aforementioned definition and examples of substituent group of the alkyl group, the alkenyl group and the aryl group in the formula (III) can be also applied for each of the above groups in the formula (IV).

The aforementioned description of the heterocyclic group in which a nitrogen atom has a dissociated valence in the formula (III) can be also applied for the heterocyclic ring formed by $R^{41}$ and $R^{42}$, $R^{43}$ and $R^{44}$ or $R^{45}$ and $R^{46}$.

At least one of $R^{42}$, $R^{44}$ and $R^{46}$ preferably includes an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{42}$, $R^{44}$ and $R^{46}$ preferably has a polymerizable group as a substituent group. The melamine compound preferably has two or more polymerizable groups. The polymerizable group is preferably placed at the terminal end of $R^{42}$, $R^{44}$ or $R^{46}$.

If the melamine compound has a polymerizable group, the resultant optically anisotropic layer can contain the discotic liquid crystal molecules polymerized with the melamine compound.

The $R^{42}$, $R^{44}$ or $R^{46}$ having a polymerizable group as a substituent group is the Same as the aforementioned group represented by the formula (Rp).

Examples of the melamine compound are shown below.

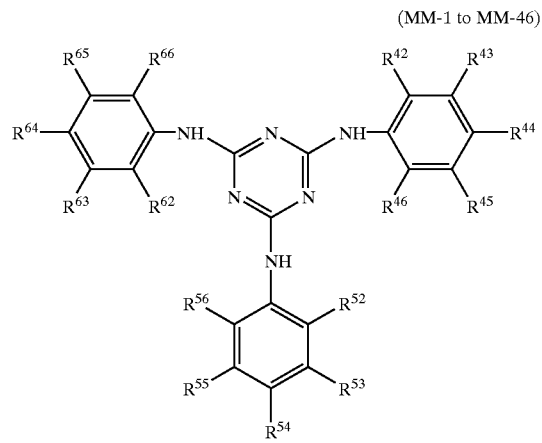

(MM-1 to MM-46)

MM-1: $R^{43}$, $R^{44}$, $R^{53}$, $R^{54}$, $R^{63}$, $R^{64}$: —O—(CH$_2$)$_9$—CH$_3$
MM-2: $R^{43}$, $R^{44}$, $R^{53}$, $R^{54}$, $R^{63}$, $R^{64}$: —O—(CH$_2$)$_{11}$—CH$_3$
MM-3: $R^{43}$, $R^{44}$, $R^{53}$, $R^{54}$, $R^{63}$, $R^{64}$: —O—(CH$_2$)$_{15}$—CH$_3$
MM-4: $R^{44}$, $R^{54}$, $R^{64}$: —O—(CH$_2$)$_9$—CH$_3$
MM-5: $R^{44}$, $R^{54}$, $R^{64}$: —O—(CH$_2$)$_{15}$—CH$_3$
MM-6: $R^{43}$, $R^{53}$, $R^{63}$: —O—CH$_3$; $R^{44}$, $R^{54}$, $R^{64}$: —O—(CH$_2$)$_{17}$—CH$_3$
MM-7: $R^{44}$, $R^{54}$, $R^{64}$: —CO—O—(CH$_2$)$_{11}$—CH$_3$
MM-8: $R^{44}$, $R^{54}$, $R^{64}$: —SO$_2$—NH—(CH$_2$)$_{17}$—CH$_3$
MM-9: $R^{43}$, $R^{53}$, $R^{63}$: —O—CO—(CH$_2$)$_{15}$—CH$_3$
MM-10: $R^{42}$, $R^{52}$, $R^{62}$: —O—(CH$_2$)$_{17}$—CH$_3$
MM-11: $R^{42}$, $R^{52}$, $R^{62}$: —O—CH$_3$; $R^{43}$, $R^{53}$, $R^{63}$: —CO—O—(CH$_2$)$_{11}$—CH$_3$
MM-12: $R^{42}$, $R^{52}$, $R^{62}$: —Cl; $R^{43}$, $R^{53}$, $R^{63}$: —CO—O—(CH$_2$)$_{11}$—CH$_3$
MM-13: $R^{42}$, $R^{52}$, $R^{62}$: —CO—O—(CH$_2$)$_{11}$—CH$_3$; $R^{45}$, $R^{55}$, $R^{65}$: —SO$_2$—NH-iso-C$_3$H$_7$
MM-14: $R^{42}$, $R^{52}$, $R^{62}$: —Cl; $R^{45}$, $R^{55}$, $R^{65}$: —SO$_2$—NH—(CH$_2$)$_{15}$—CH$_3$
MM-15: $R^{42}$, $R^{46}$, $R^{52}$, $R^{56}$, $R^{62}$, $R^{66}$: —Cl; $R^{45}$, $R^{55}$, $R^{65}$: —SO$_2$—NH—(CH$_2$)$_{19}$—CH$_3$
MM-16: $R^{43}$, $R^{54}$: —O—(CH$_2$)$_9$—CH$_3$; $R^{44}$, $R^{53}$, $R^{63}$, $R^{64}$: —O—(CH$_2$)$_{11}$—CH$_3$
MM-17: $R^{44}$: —O—(CH$_2$)$_{11}$—CH$_3$; $R^{54}$: —O—(CH$_2$)$_{15}$—CH$_3$; $R^{64}$: —O—(CH$_2$)$_{17}$—CH$_3$
MM-18: $R^{42}$, $R^{45}$, $R^{52}$, $R^{55}$, $R^{62}$, $R^{65}$: —O—CH$_3$; $R^{44}$, $R^{54}$, $R^{64}$: —NH—CO—(CH$_2$)$_{14}$—CH$_3$
MM-19: $R^{42}$, $R^{45}$, $R^{52}$, $R^{55}$, $R^{62}$, $R^{65}$: —O—(CH$_2$)$_3$—CH$_3$; $R^{44}$, $R^{54}$, $R^{64}$: —O—(CH$_2$)$_{15}$—CH$_3$
MM-20: $R^{42}$, $R^{45}$, $R^{62}$: —NH—SO$_2$—(CH$_2$)$_{15}$—CH$_3$; $R^{44}$, $R^{45}$, $R^{54}$, $R^{55}$, $R^{64}$, $R^{65}$: —Cl
MM-21: $R^{42}$, $R^{43}$, $R^{52}$, $R^{53}$, $R^{62}$, $R^{63}$: —F; $R^{44}$, $R^{54}$, $R^{64}$: —CO—NH—(CH$_2$)$_{15}$—CH$_3$; $R^{45}$, $R^{46}$, $R^{55}$, $R^{56}$, $R^{65}$, $R^{66}$: —Cl
MM-22: $R^{42}$, $R^{52}$, $R^{62}$: —Cl; $R^{44}$, $R^{54}$, $R^{64}$: —CH$_3$; $R^{45}$, $R^{55}$, $R^{65}$: —NH—CO—(CH$_2$)$_{12}$—CH$_3$
MM-23: $R^{42}$, $R^{52}$, $R^{62}$: —OH; $R^{44}$, $R^{54}$, $R^{64}$: —CH$_3$; $R^{45}$, $R^{55}$, $R^{65}$: —O—(CH$_2$)$_{15}$—CH$_3$
MM-24: $R^{42}$, $R^{45}$, $R^{52}$, $R^{55}$, $R^{62}$, $R^{65}$: —O—CH$_3$; $R^{44}$, $R^{54}$, $R^{64}$: —(CH$_2$)$_{11}$—CH$_3$
MM-25: $R^{42}$, $R^{52}$, $R^{62}$: —NH—SO$_2$—CH$_3$; $R^{45}$, $R^{55}$, $R^{65}$: —CO—O—(CH$_2$)$_{11}$—CH$_3$ MM-26: $R^{42}, R^{52}, R^{62}$: —S—$(CH_2)_{11}$—$CH_3$; $R^{45}, R^{55}, R^{65}$: —$SO_2$—$NH_2$
MM-27: $R^{43}, R^{44}, R^{53}, R^{54}, R^{63}, R^{64}$: —O—$(CH_2)_{12}$—O—CO—CH=$CH_2$
MM-28: $R^{43}, R^{44}, R^{53}, R^{54}, R^{63}, R^{64}$: —O—$(CH_2)_8$—O—CO—CH=$CH_2$
MM-29: $R^{43}, R^{44}, R^{53}, R^{54}, R^{63}, R^{64}$: —O—CO—$(CH_2)_7$—O—CO—CH=$CH_2$
MM-30: $R^{44}, R^{54}, R^{64}$: —CO—O—$(CH_2)_{12}$—O—CO—C$(CH_3)$=$CH_2$
MM-31: $R^{43}, R^{44}, R^{53}, R^{54}, R^{63}, R^{64}$: —O—CO—p—Ph—$(CH_2)_4$—O—CO—CH=$CH_2$
MM-32: $R^{42}, R^{44}, R^{52}, R^{54}, R^{62}, R^{64}$: —NH—$SO_2$—$(CH_2)_8$—O—CO—CH=$CH_2$; $R^{45}, R^{55}, R^{65}$: —Cl
MM-33: $R^{42}, R^{52}, R^{62}$: —NH—$SO_2$—$CH_3$; $R^{45}, R^{55}, R^{65}$: —CO—O—$(CH_2)_{12}$—O—CO—CH=$CH_2$
MM-34: $R^{44}, R^{54}, R^{64}$: —O—$(CH_2)_9$—O—CO—CH=$CH_2$
MM-35: $R^{43}, R^{44}, R^{53}, R^{54}, R^{63}, R^{64}$: —O—$(CH_2)_9$—O—CO—CH=$CH_2$
MM-36: $R^{44}, R^{54}, R^{64}$: —O—$(CH_2)_4$—CH=CH—$(CH_2)_4$—O—CO—CH=$CH_2$
MM-37: $R^{43}, R^{44}, R^{53}, R^{54}, R^{63}, R^{64}$: —O—$(CH_2)_4$—CH=CH—$(CH_2)_4$—O—CO—CH=$CH_2$
MM-38: $R^{43}, R^{45}, R^{53}, R^{55}, R^{63}, R^{65}$: —O—$(CH_2)_9$—O—CO—CH=$CH_2$
MM-39: $R^{43}, R^{44}, R^{45}, R^{53}, R^{54}, R^{55}, R^{63}, R^{64}, R^{65}$: —O—$(CH_2)_9$—O—CO—CH=$CH_2$
MM-40: $R^{44}, R^{54}$: —O—$(CH_2)_4$—O—CO—CH=$CH_2$; $R^{64}$: —O—$(CH_2)_9$—O—CO—CH=$CH_2$
MM-41: $R^{44}, R^{54}$: —O—$(CH_2)_4$—O—CO—CH=$CH_2$; $R^{64}$: —O—$(CH_2)_{12}$—$CH_3$
MM-42: $R^{44}, R^{54}$: —O—$(CH_2)_4$—O—CO—CH=$CH_2$; $R^{63}, R^{64}$: —O—$(CH_2)_{12}$—$CH_3$
MM-43: $R^{44}, R^{54}$: —O—$(CH_2)_4$—O—CO—CH=$CH_2$; $R^{63}, R^{64}$: —O—CO—$(CH_2)_{11}$—$CH_3$
MM-44: $R^{43}, R^{45}$: —O—$(CH_2)_{12}$—$CH_3$; $R^{54} R^{64}$: —O—$(CH_2)_9$—O—CO—CH=$CH_2$
MM-45: $R^{43}, R^{44}$: —O—$(CH_2)_6$—O—CO—CH=$CH_2$; $R^{54}, R^{64}$: —O—$(CH_2)_{11}$—$CH_3$
MM-46: $R^{43}, R^{44}, R^{45}$: —O—$(CH_2)_6$—O—CO—CH=$CH_2$; $R^{54}, R^{64}$: —O—$(CH_2)_{11}$—$CH_3$
(Remark)
Not defined R: Hydrogen
p-Ph: p-Phenylene (MM-47 to MM-59)

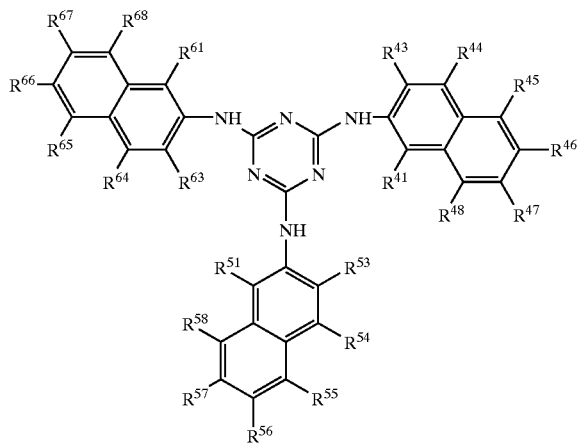

MM-47: $R^{46}, R^{56}, R^{66}$: —$SO_2$—NH—$(CH_2)_{15}$—$CH_3$; $R^{48}, R^{58} R^{68}$: —O—$(CH_2)_{11}$—$CH_3$
MM-48: $R^{45}, R^{55}, R^{65}$: —$SO_2$—NH—$(CH_2)_{17}$—$CH_3$
MM-49: $R^{46}, R^{56}, R^{66}$: —$SO_2$—NH—$(CH_2)_{15}$—$CH_3$
MM-50: $R^{45}, R^{55}, R^{65}$: —O—$(CH_2)_{17}$—$CH_3$; $R^{47}, R^{57}, R^{67}$: —$SO_2$—NH—$CH_3$
MM-51: $R^{43}, R^{53}, R^{63}$: —O—$(CH_2)_{15}$—$CH_3$
MM-52: $R^{41}, R^{51}, R^{61}$: —O—$(CH_2)_{17}$—$CH_3$
MM-53: $R^{46}, R^{56}, R^{66}$: —$SO_2$—NH—Ph; $R^{48}, R^{58}, R^{68}$: —O—$(CH_2)_{11}$—$CH_3$
MM-54: $R^{45}, R^{55}, R^{65}$: —O—$(CH_2)_{21}$—$CH_3$; $R^{47}, R^{57}, R^{67}$: —$SO_2$—NH—Ph
MM-55: $R^{41}, R^{51}, R^{61}$: —p—Ph—$(CH_2)_{11}$—$CH_3$
MM-56: $R^{46}, R^{48}, R^{56}, R^{58}, R^{66}, R^{68}$: —$SO_2$—NH—$(CH_2)_7$—$CH_3$
MM-57: $R^{46}, R^{56}, R^{66}$: —$SO_2$—NH—$(CH_2)_{10}$—O—CO—CH=$CH_2$; $R^{48}, R^{58}, R^{68}$: —O—$(CH_2)_{12}$—$CH_3$
MM-58: $R^{45}, R^{55}, R^{65}$: —O—$(CH_2)_{12}$—O—CO—CH=$CH_2$; $R^{47}, R^{57}, R^{67}$: —$SO_2$—NH—Ph
MM-59: $R^{43}, R^{53}, R^{63}$: —O—$(CH_2)_{16}$—O—CO—CH=$CH_2$ (Remark)

Not defined R: Hydrogen

Ph: Phenyl p-Ph: p-Phenylene (MM-60 to MM-71)

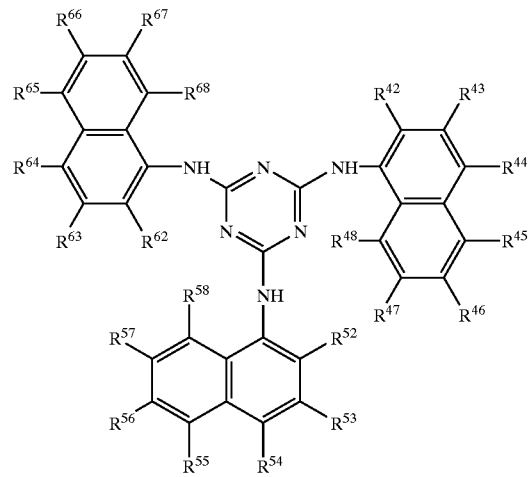

MM-60: $R^{45}, R^{55}, R^{65}$: —NH—CO—$(CH_2)_{14}$—$CH_3$
MM-61: $R^{42}, R^{52}, R^{62}$: —O—$(CH_2)_{17}$—$CH_3$
MM-62: $R^{44}, R^{54}, R^{64}$: —O—$(CH_2)_{15}$—$CH_3$
MM-63: $R^{45}, R^{55}, R^{65}$: —$SO_2$—NH—$(CH_2)_{15}$—$CH_3$
MM-64: $R^{43}, R^{53}, R^{63}$: —CO—NH—$(CH_2)_{17}$—$CH_3$; $R^{44}, R^{54}, R^{64}$: —OH
MM-65: $R^{45}, R^{55}, R^{65}$: —O—$(CH_2)_{15}$—$CH_3$; $R^{46}, R^{56}, R^{66}$: —$SO_2$—NH—$(CH_2)_{11}$—$CH_3$
MM-66: $R^{47}, R^{57}, R^{67}$: —O—$(CH_2)_{21}$—$CH_3$
MM-67: $R^{44}, R^{54}, R^{64}$: —O—p—Ph—$(CH_2)_{11}$—$CH_3$
MM-68: $R^{46}, R^{56}, R^{66}$: —$SO_2$—NH—$(CH_2)_{15}$—$CH_3$
MM-69: $R^{43}, R^{53}, R^{63}$: —CO—NH—$(CH_2)_{17}$—$CH_3$; $R^{44}, R^{54}, R^{64}$: —O—$(CH_2)_{12}$—O—CO—CH=$CH_2$
MM-70: $R^{45}, R^{55}, R^{65}$: —O—$(CH_2)_8$—O—CO—CH=$CH_2$; $R^{46}, R^{56}, R^{66}$: —$SO_2$—NH—$(CH_2)_{11}$—$CH_3$
MM-71: $R^{43}, R^{46}, R^{53}, R^{56}, R^{63}, R^{66}$: —$SO_2$—NH—$(CH_2)_8$—O—CO—CH=$CH_2$ (Remark)

Not defined R: Hydrogen p-Ph: p-Phenylene (MM-72 to MM-75)

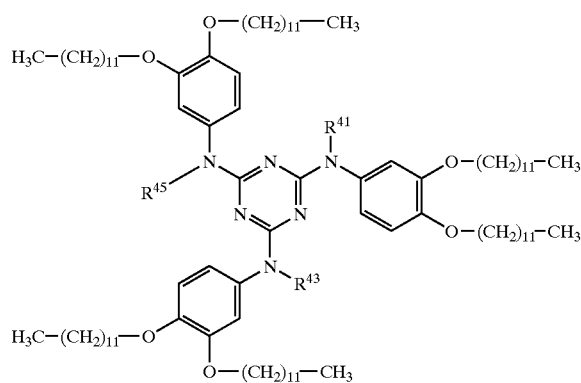

MM-72: $R^{41}$, $R^{43}$, $R^{45}$: —$CH_3$
MM-73: $R^{41}$, $R^{43}$, $R^{45}$: —$C_2H_5$
MM-74: $R^{41}$, $R^{43}$: —$C_2H_5$; $R^{45}$: —$CH_3$
MM-75: $R^{41}$, $R^{43}$, $R^{45}$: —$(CH_2)_3$—$CH_3$ (MM-76 to MM-88)

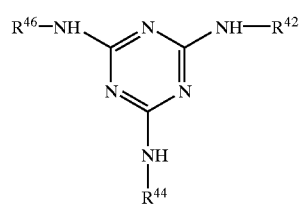

MM-76: $R^{42}$, $R^{44}$, $R^{46}$: —$(CH_2)_9$—O—CO—CH=$CH_2$
MM-77: $R^{42}$, $R^{44}$, $R^{46}$: —$(CH_2)_4$—CH=CH—$(CH_2)_4$—O—CO—C—CH=$C_2$
MM-78: $R^{42}$, $R^{44}$: —$(CH_2)_9$—O—CO—CH=$CH_2$; $R^{46}$: —$(CH_2)_{12}$—$CH_3$
MM-79: $R^{42}$, $R^{44}$: —$(CH_2)_4$—CH=CH—$(CH_2)_4$—O—CO—CH=$CH_2$; $R^{46}$: —$(CH_2)_{12}$—$CH_3$
MM-80: $R^{42}$: —$(CH_2)_9$—O—CO—CH=$CH_2$; $R^{44}$, $R^{46}$: —$(CH_2)_{12}$—$CH_3$
MM-81: $R^{42}$: —$(CH_2)_4$—CH=CH—$(CH_2)_4$—O—CO—CH=$CH_2$; $R^{44}$, $R^{46}$: —$(CH_2)_{12}$—$CH_3$
MM-82: $R^{42}$, $R^{44}$: —$(CH_3)_4$—O—CO—CH=$CH_2$; $R^{46}$: —$(CH_2)_{12}$—$CH_3$
MM-83: $R^{42}$: —$(CH_2)_4$—O—CO—CH=$CH_2$; $R^{44}$, $R^{46}$: —$(CH_2)_{12}$—$CH_3$
MM-84: $R^{42}$, $R^{44}$, $R^{46}$: —$(CH_2)_9$—EpEt
MM-85: $R^{42}$, $R^{44}$, $R^{46}$: —$(CH_2)_4$—CH=CH—$(CH_2)_4$—O—EpEt
MM-86: $R^{42}$, $R^{44}$: —$(CH_2)_9$—O—EpEt; $R^{46}$: —$(CH_2)_{12}$—$CH_3$
MM-87: $R^{42}$, $R^{44}$, $R^{46}$: —$(CH_2)_9$—O—CH=$CH_2$
MM-88: $R^{42}$, $R^{44}$: —$(CH_2)_9$—O—CH=$CH_2$; $R^{46}$: —$(CH_2)_{12}$—$CH_3$ (Remark)

EpEt: Epoxyethyl (MM-89 to MM-95)

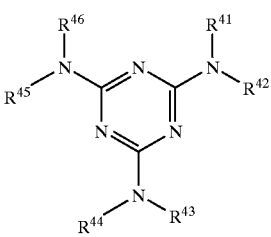

MM-89: $R^{41}$, $R^{42}$, $R^{43}$, $R^{44}$, $R^{45}$, $R^{46}$: —$(CH_2)_9$—$CH_3$
MM-90: $R^{41}$, $R^{43}$, $R^{45}$: —$CH_3$; $R^{42}$, $R^{44}$, $R^{46}$: —$(CH_2)_{17}$—$CH_3$
MM-91: $R^{41}$, $R^{42}$, $R^{43}$, $R^{44}$: —$(CH_2)_7$—$CH_3$; $R^{45}$, $R^{46}$: —$(CH_2)_5$—$CH_3$
MM-92: $R^{41}$, $R^{42}$, $R^{43}$, $R^{44}$, $R^{45}$, $R^{46}$: —CyHx
MM-93: $R^{41}$, $R^{42}$, $R^{43}$, $R^{44}$, $R^{45}$, $R^{46}$: —$(CH_2)_2$—O—$C_2H_5$
MM-94: $R^{41}$, $R^{43}$, $R^{45}$: —$CH_3$; $R^{42}$, $R^{44}$, $R^{46}$: —$(CH_2)_{12}$—O—CO—CH=$CH_2$
MM-95: $R^{41}$, $R^{42}$, $R^{43}$, $R^{44}$, $R^{45}$, $R^{46}$: —$(CH_2)_8$—O—CO—CH=$CH_2$ (Remark)

CyHx:-Cyclohexyl (MM-96)

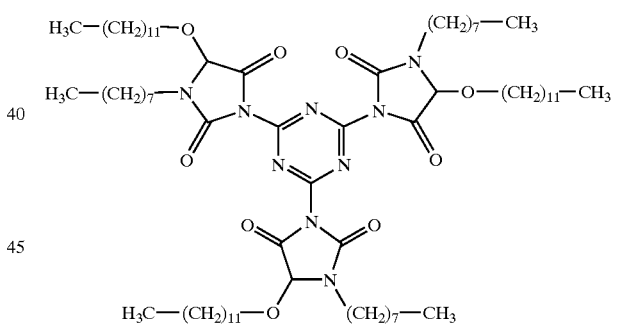

A melamine polymer can be also used as the melamine compound. The melamine polymer is preferably synthesized by the polymerization reaction between a carbonyl compound and the melamine compound represented by the following formula (V).

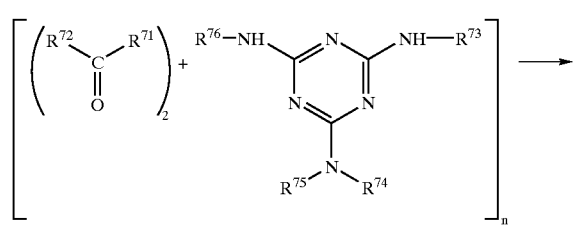

(V)

-continued

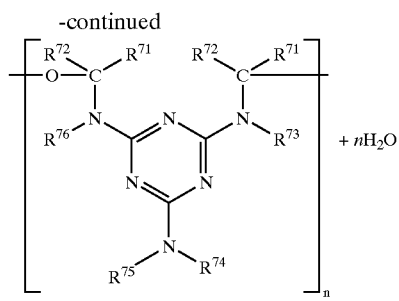

in which each of $R^{71}$, $R^{72}$, $R^{73}$, $R^{74}$, $R^{75}$ and $R^{76}$ is independently hydrogen atom, an alkyl group, an alkenyl group, an aryl group or a heterocyclic group.

The aforementioned definition and examples of substituent group of the alkyl group, the alkenyl group, the aryl group and the heterocyclic group in the formula (III) can be also applied for each of the above groups in the formula (V).

The polymerization reaction between the carbonyl compound and the melamine compound is the same as an usual synthesis method for known melamine resins (e.g., melamine formaldehyde resin). A commercially available melamine polymer (melamine resin) may be used.

The melamine polymer preferably has a molecular weight of 2,000 to 400,000.

At least one of $R^{71}$, $R^{72}$, $R^{73}$, $R^{74}$, $R^{75}$ and $R^{76}$ preferably has an alkylene or alkenylene moiety having 9 to 30 carbon atoms. The alkylene or alkenylene moiety having 9 to 30 carbon atoms preferably has a straight chain structure. The alkylene or alkenylene moiety is preferably included in the substituent group of the aryl group.

Further, at least one of $R^{71}$, $R^{72}$, $R^{73}$, $R^{74}$, $R^{75}$ and $R^{76}$ preferably has a polymerizable group as a substituent group. The polymerizable group is preferably placed at the terminal end of $R^{71}$, $R^{72}$, $R^{73}$, $R^{74}$, $R^{75}$ or $R^{76}$.

If the melamine polymer has a polymerizable group, the resultant optically anisotropic layer can contain the discotic liquid crystal molecules polymerized with the melamine polymer.

The $R^{71}$, $R^{72}$, $R^{73}$, $R^{74}$, $R^{75}$ or $R^{76}$ having a polymerizable group as a substituent group is the same as the aforementioned group represented by the formula (Rp).

The polymerizable group is introduced into either the carbonyl compound ($R^{71}$, $R^{72}$) or the melamine compound ($R^{73}$, $R^{74}$, $R^{75}$, $R^{76}$). If the melamine compound has the polymerizable group, the carbonyl compound is preferably a compound of simple structure such as formaldehyde. On the other hand, if the carbonyl compound has the polymerizable group, the melamine compound is preferably a compound of simple structure such as non-substituted melamine.

Examples of the carbonyl compound having a polymerize group are shown below.

(CO-1 to CO-11)

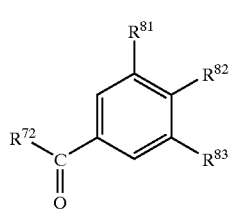

CO-1: $R^{72}$: —H; $R^{82}$: —O—(CH$_2$)$_9$—O—CO—CH=CH$_2$
CO-2: $R^{72}$: —H; $R^{81}$, $R^{82}$: —O—(CH$_2$)$_9$—O—CO—CH=CH$_2$
CO-3: $R^{72}$: —H; $R^{82}$: —O—(CH$_2$)$_4$—CH=CH—(CH$_2$)$_4$—O—CO—CH=CH$_2$
CO-4: $R^{72}$: —H; $R^{81}$, $R^{82}$: —O—(CH$_2$)$_4$—CH=CH—(CH$_2$)$_4$—O—CO—CH=CH$_2$
CO-5: $R^{72}$: —H; $R^{81}$, $R^{83}$: —O—(CH$_2$)$_9$—O—CO—CH=CH$_2$
CO-6: $R^{72}$: —H; $R^{81}$, $R^{82}$, $R^{83}$: —O—(CH$_2$)$_9$—O—CO—CH=CH$_2$
CO-7: $R^{72}$: —CH$_3$; $R^{82}$: —O—(CH$_2$)$_9$—O—CO—CH=CH$_2$
CO-8: $R^{72}$: —(CH$_2$)$_{11}$—CH$_3$; $R^{82}$: —O—(CH$_2$)$_4$—O—CO—CH=CH$_2$
CO-9: $R^{72}$: —(CH$_2$)$_9$—O—CO—CH=CH$_2$; $R^{82}$: —O—(CH$_2$)$_4$—O—CO—CH=CH$_2$
CO-10: $R^{72}$: —(CH$_2$)$_9$—O—CO—EpEt; $R^{82}$: —O—(CH$_2$)$_4$—O—CO—CH=CH$_2$
CO-11: $R^{72}$: —O—(CH$_2$)$_4$—O—CO—CH=CH$_2$; $R^{81}$, $R^{83}$: —O—(CH$_2$)$_{12}$—CH$_3$
(Remark)
Not defined R: Hydrogen
EpEt: Epoxyethyl (CO-12 to CO-13)

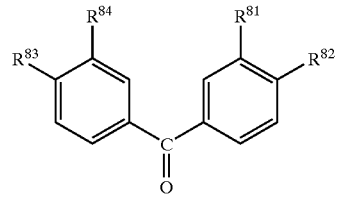

CO-12: $R^{81}$, $R^{82}$, $R^{83}$, $R^{84}$: —O—(CH$_2$)$_6$—O—CO—CH=CH$_2$
CO-13: $R^{82}$, $R^{83}$: —O—(CH$_2$)$_9$—O—CO—CH=CH$_2$
(Remark)
Not defined R: Hydrogen (CO-14 to CO-26)

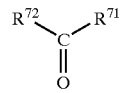

CO-14: $R^{71}$: —(CH$_2$)$_9$—O—CO—C=CH$_2$; $R^{72}$: —H
CO-15: $R^{71}$: —(CH$_2$)$_4$—CH=CH—(CH$_2$)$_4$—O—CO—CH=CH$_2$; $R^{72}$: —H
CO-16: $R^{71}$: —(CH$_2$)$_9$—O—CO—CH=CH$_2$; $R^{72}$: —CH$_3$
CO-17: $R^{71}$: —(CH$_2$)$_4$—CH=CH—(CH$_2$)$_4$—O—CO—CH=CH$_2$; $R^{72}$: —CH$_3$
CO-18: $R^{71}$: —(CH$_2$)$_9$—O—CO—CH=CH$_2$; $R^{72}$: —Ph
CO-19: $R^{71}$: —(CH$_2$)$_4$—CH=CH—(CH$_2$)$_4$—O—CO—CH=CH$_2$; $R^{72}$: —Ph
CO-20: $R^{71}$: —(CH$_2$)$_4$—O—CO—CH=CH$_2$; $R^{72}$: —(CH$_2$)$_9$—O—CO—CH=CH$_2$
CO-21: $R^{71}$: —(CH$_2$)$_4$—O—CO—CH=CH$_2$; $R^{72}$: —(CH$_2$)$_{12}$—CH$_3$
CO-22: $R^{71}$: —(CH$_2$)$_9$—O—EpEt; $R^{72}$: —H
CO-23: $R^{71}$: —(CH$_2$)$_4$—CH=CH—(CH$_2$)$_4$—O—EpEt; $R^{72}$: —H
CO-24: $R^{71}$, $R^{72}$: —(CH$_2$)$_9$—O—EpEt
CO-25: $R^{71}$, $R^{72}$: —(CH$_2$)$_9$—O—CO—CH=CH$_2$
CO-25: $R^{71}$, $R^{72}$: —(CH$_2$)$_4$—CH=CH—(CH$_2$)$_4$—O—CO—CH=CH$_2$
(Remark)
Ph: Phenyl
EpEt: Epoxyethyl Examples of the melamine polymers having polymerizable groups in their melamine moieties are shown below.

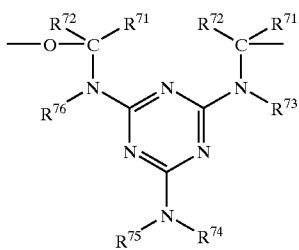

(MP-1 to MP-14)

MP-1: $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-2: $R^{71}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-3: $R^{71}$, $R^{72}$: —$CH_3$; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-4: $R^{71}$: —Ph; $R^{73}$, $R^{75}$, $R^{76}$: —$CH_2$—NH—CO—CH=$CH_2$; $R^{74}$: —$CH_2$—NH—CO—$(CH_2)_8$—$CH_3$

MP-5: $R^{73}$, $R^{76}$: —$CH_2$—NH—CO—CH=$CH_2$; $R^{74}$: —$CH_2$—NH—CO—$(CH_2)7$—CH=CH—$(CH_2)_7$—$CH_3$; $R^{75}$: —$CH_2$—O—$CH_3$

MP-6: $R^{73}$, $R^{76}$: —$CH_2$—NH—CO—CH=$CH_2$; $R^{74}$: —$CH_2$—NH—CO—$(CH_2)_7$—CH=CH—$(CH_2)_7$—$CH_3$; $R^{75}$: —$CH_2$—OH

MP-7: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—O—$CH_3$

MP-8: $R^{73}$, $R^{76}$: —$CH_2$—NH—CO—$C_2H_5$; $R^{74}$: —$CH_2$—NH—CO—$(CH_2)_{16}$—$CH_3$; $R^{75}$: —$CH_2$—OH

MP-9: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—O—$CH_3$

MP-10: $R^{73}$, $R^{76}$: —$CH_2$—O—CO—CH=$CH_2$; $R^{74}$: —$CH_2$—O—CO—$(CH_2)_7$—CH=CH—$(CH_2)_7$—$CH_3$; $R^{75}$: —$CH_2$—OH

MP-11: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—O—$CH_3$

MP-12: $R^{73}$, $R^{76}$: —$CH_2$—O—CO—$(CH_2)_7$—CH=CH—$(CH_2)_7$—$CH_3$; $R^{74}$: —$CH_2$—NH—CO—$(CH_2)_7$—CH=CH—$(CH_2)_7$—$CH_3$; $R^{75}$: —$CH_2$—OH

MP-13: $R^{73}$, $R^{74}$, $R^{75}$, $R^{76}$: —$CH_2$—O—$(CH_2)_{11}$—O—CO—CH=$CH_2$

MP-14: $R^{73}$, $R^{75}$, $R^{76}$: —$CH_2$—NH—CO—CH=$CH_2$; $R^{74}$: —$CH_2$—O—$(CH_2)_{16}$—$CH_3$ (Remark)
Not defined R: Hydrogen
Ph: Phenyl Two or more compounds having 1,3,5-triazine ring (including melamine compounds and melamine polymers) may be used in combination.

The compound having 1,3,5-triazine ring is used preferably in an amount of 0.01 to 20 wt. %, more preferably in an amount of 0.1 to 15 wt. %, and most preferably in an amount of 0.5 to 10 wt. % based on the amount of the discotic liquid crystal molecules.

The coating amount of the compound having 1,3,5-triazine ring is preferably in the range of 1 to 1,000 mg/m$^2$, more preferably in the range of 2 to 300 mg/m$^2$, and most preferably in the range of 3 to 100 mg/m$^2$.

An optically anisotropic layer can be formed by coating an orientation layer with a liquid crystal composition (coating solution) containing the liquid crystal molecules, a polymerization initiator (described below) and optional additives (e.g., plasticizer, monomer, surface active agent, cellulose ester, 1,3,5-triazine compound, chiral agent).

A solvent for the composition preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The composition can be coated according to a conventional coating method such as a wire-bar coating method, an extrusion coating method, a direct gravure coating method, a reverse gravure coating method or a die coating method.

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), et-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm$^2$. The light irradiation can be conducted while the layer is heated to accelerate the photo polymerization reaction.

The thickness of the optically anisotropic layer is preferably in the range of 0.1 to 20 µm, more preferably in the range of 0.5 to 15 µm, and most preferably in the range of 1 to 10 µm.

[Optically Anisotropic Layer (Second Embodiment)]

The optically anisotropic layer of the second embodiment is formed from rod-like liquid crystal molecules. The rod-like liquid crystal molecules are aligned under the condition that an average inclined angle between the long axis plane of the molecule and the surface of the transparent film is less than 5°.

The retardation of the optical compensatory sheet as a whole is preferably adjusted by an optical anisotropy of the optically anisotropic layer.

The total Re retardation value in plane of the optical compensatory sheet is preferably in the range of 20 to 200 nm, more preferably in the range of 20 to 100 nm, and most preferably in the range of 20 to 70 nm. The total Rth retardation value along the thickness direction of the optical compensatory sheet is preferably in the range of 70 to 500 nm, more preferably in the range of 70 to 300 nm, and most preferably in the range of 70 to 200 nm.

The Re and Rth retardation values of the optical compensatory sheet are defined by the following formulas:

$$Re = (nx - ny) \times d$$

$$Rth = [\{(nx + ny)/2\} - nz] \times d$$

in which each of nx and ny is a refractive index in the plane of the optical compensatory sheet; nz is a refractive index along the thickness direction of the optical compensatory sheet; and d is the thickness of the optical compensatory sheet.

The optically anisotropic layer of the second embodiment (the first optically anisotropic layer) can be used in combination with an optically uniaxial or biaxial transparent support to adjust the total retardation of the optical compensatory sheet.

The second optically anisotropic layer may be provided in the optical compensatory sheet of the second embodiment. The Re retardation value in plane can be effectively adjusted by a combination of the first optically anisotropic layer and the second optically anisotropic layer. Further, the second optically anisotropic layer can be provided to control the wavelength distribution of retardation. The second optically anisotropic layer in the second embodiment is also preferably formed from rod-like liquid crystal molecules, which are further preferably aligned in an average inclined angle of less than 5°.

The optically anisotropic layer and the second optically anisotropic layer can be provided on the same side of the transparent stretched film. The optically anisotropic layer and the second optically anisotropic layer can also be provided on the different sides of the transparent stretched film. In other words, the optical compensatory sheet of the second embodiment can comprise the second optically anisotropic layer, the transparent stretched film and the optically anisotropic layer in this order.

It is preferred that lines obtained by projecting the long axes of rod-like liquid crystal molecules in the optically anisotropic layer onto the transparent support be on average essentially perpendicular to lines obtained by projecting the long axes of rod-like liquid crystal molecules in the second optically anisotropic layer onto the transparent support. Further, the former lines can be crossed with the latter lines at an angle of 5° to 85° on average.

It is also preferred that lines obtained by projecting the long axes of rod-like liquid crystal molecules in the optically anisotropic layer onto the transparent support (having an optically uniaxial birefringence or an optically biaxial birefringence) be on average essentially parallel or perpendicular to the slow axis in plane of the support.

The term "essentially parallel" or "essentially perpendicular" in the present specification means an angle between noticed directions in the range of 0° (180°)±10° or 90°±10°, respectively. This angle allowance is preferably less than ±8° more preferably less than ±6°, further preferably less than ±4°, furthermore preferably less than ±2°, and most preferably less than ±1°.

The rod-like liquid crystal molecules used in the first and second optically anisotropic layers are preferably fixed with their alignment maintained. The alignment can be fixed by a binder polymer, but is preferably fixed by polymerization.

The rod-like liquid crystal molecules can be oriented in cholesteric alignment. In the cholesteric alignment, the selective reflection region is preferably out of the visible region.

Examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyano-substituted phenylpyrimidines, alkoxy-substituted phenylpyrimidines, phenyldioxanes, tolans and alkenylcyclohexylbenzonitriles. Further, some metal complexes can be used as the rod-like liquid crystal molecules.

The rod-like liquid crystal molecules are described in "Kagaku-Sosetsu, Ekisho no Kageku" (written in Japanese), vol.22(1994), Chapters 4, 7 and 11; and "Ekisho Devise Handbook" (written in Japanese), chapter 3.

The birefringent refractive index of the rod-like liquid crystal molecules is preferably in the range of 0.001 to 0.7. The rod-like liquid crystal molecules preferably have polymerizable groups. Examples of the polymerizable groups are the same as those of the discotic liquid crystal molecules (Q).

The rod-like liquid crystal molecule preferably has a symmetrical structure about the short axis. Therefore, the molecule preferably has polymerizable groups at both ends of the long axis.

Examples of the rod-like liquid crystal molecule are shown below.

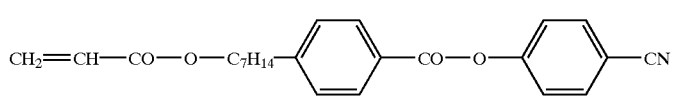

(N1)

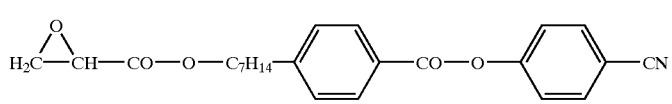

(N2)

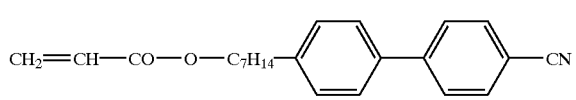

(N3)

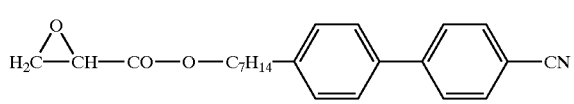

(N4)

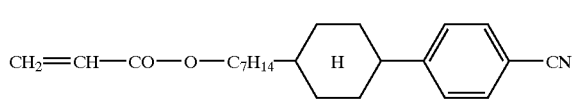

(N5)

-continued
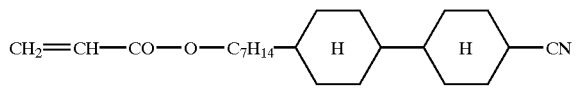 (N6)
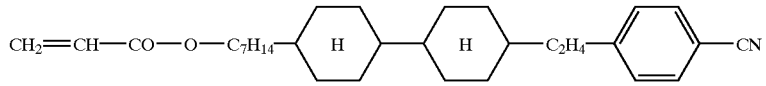 (N7)
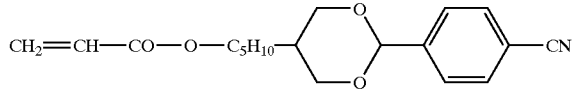 (N8)
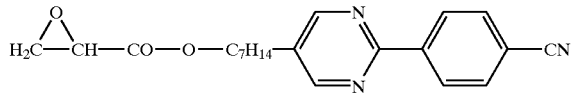 (N9)
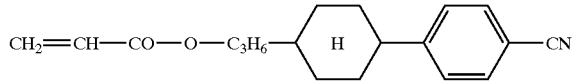 (N10)
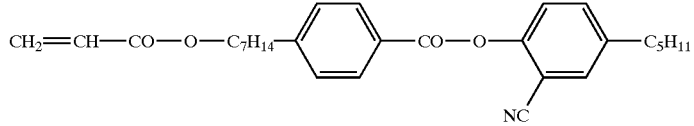 (N11)
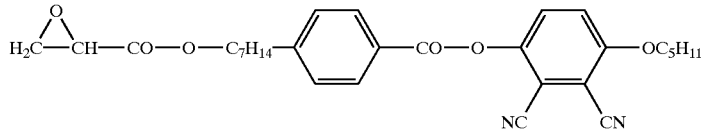 (N12)
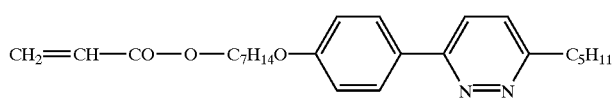 (N13)
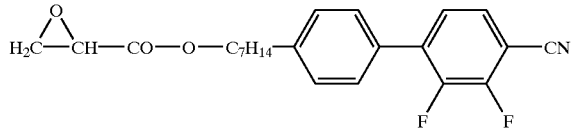 (N14)
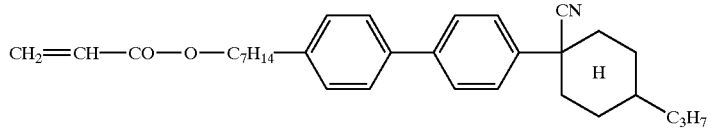 (N15)
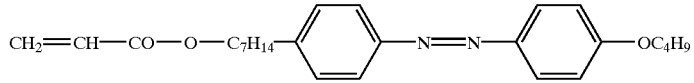 (N16)
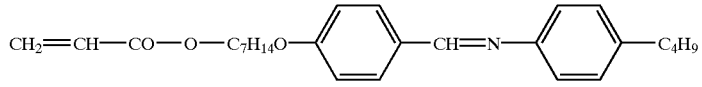 (N17)
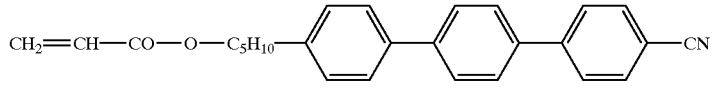 (N18)
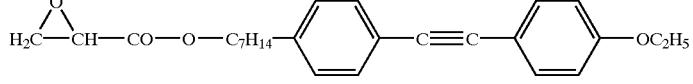 (N19)

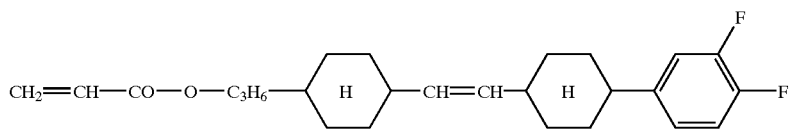
(N20)
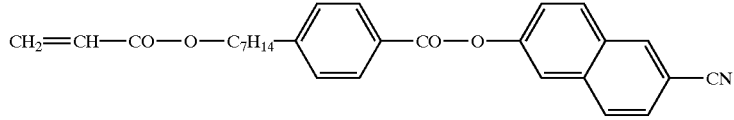
(N21)
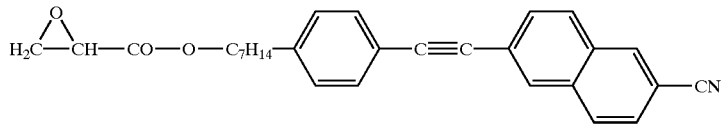
(N22)
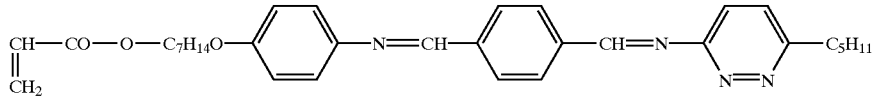
(N23)
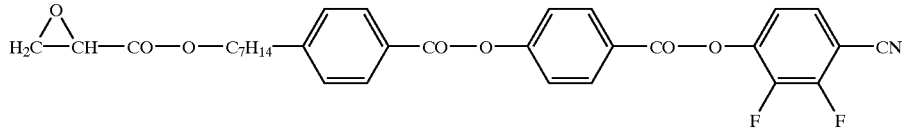
(N24)
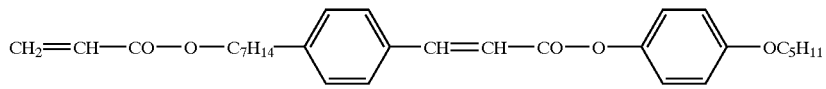
(N25)
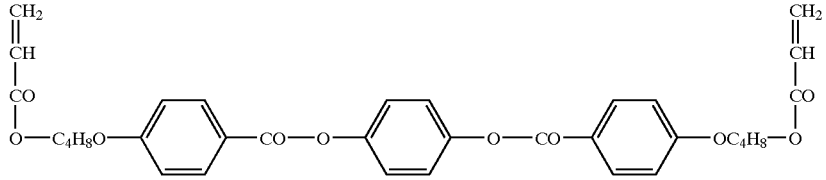
(N26)
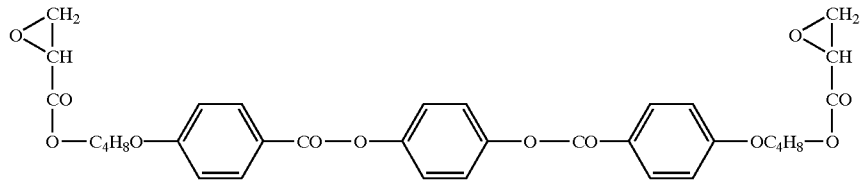
(N27)
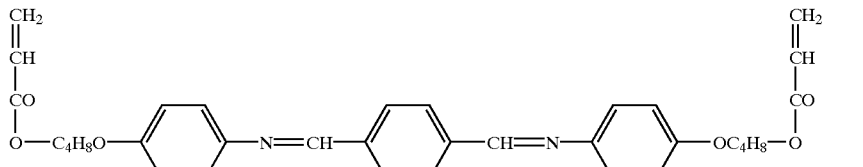
(N28)
(N29)

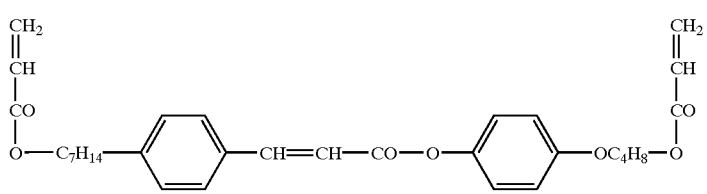 (N30)
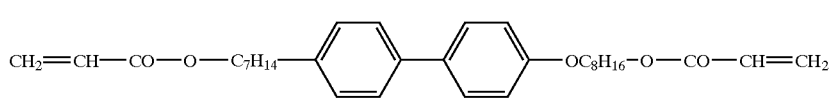 (N31)
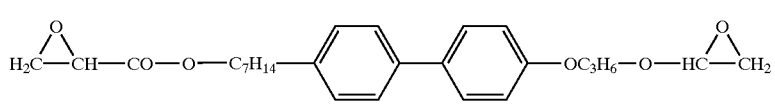 (N32)
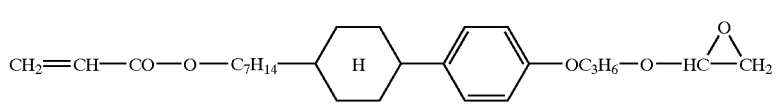 (N33)
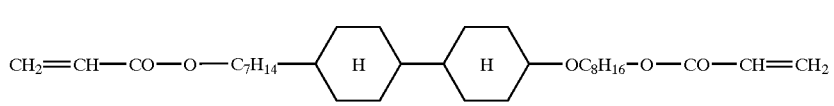 (N34)
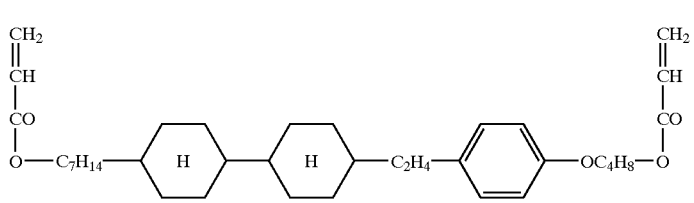 (N35)
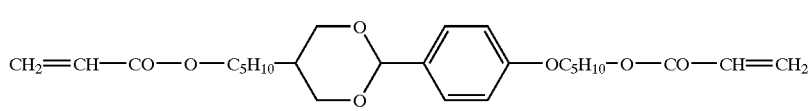 (N36)
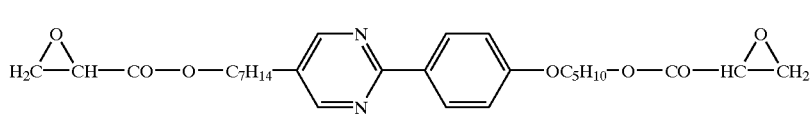 (N37)
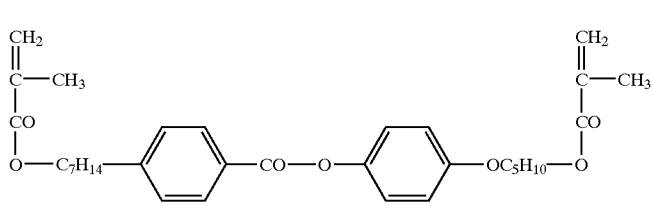 (N38)

-continued
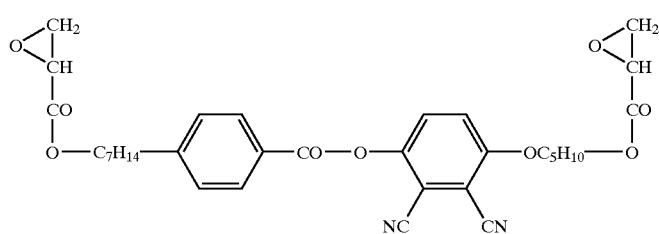
(N39)
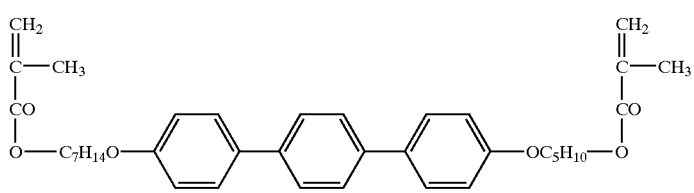
(N40)
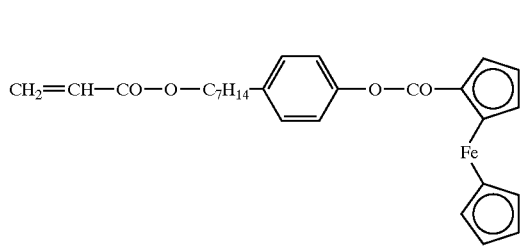
(N41)
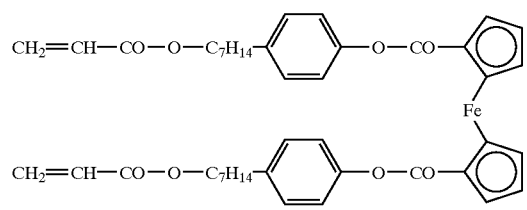
(N42)
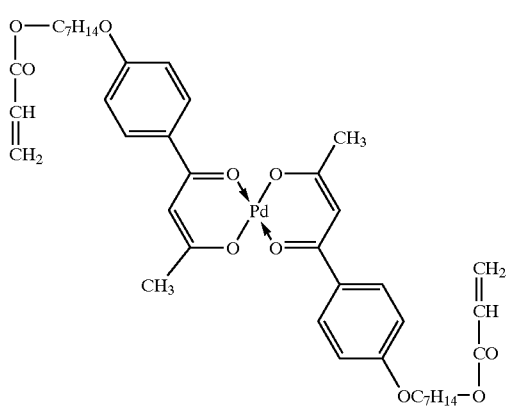
(N43)
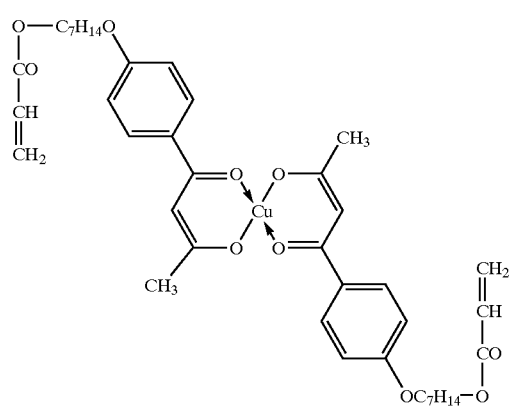
(N44)
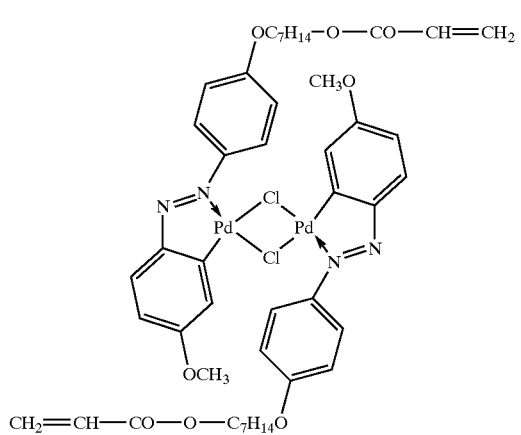
(N45)
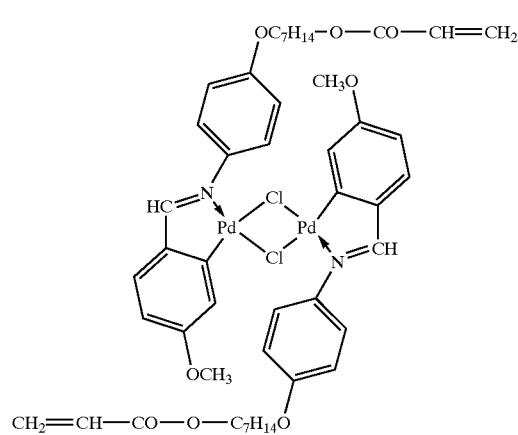
(N46)

-continued (N47)

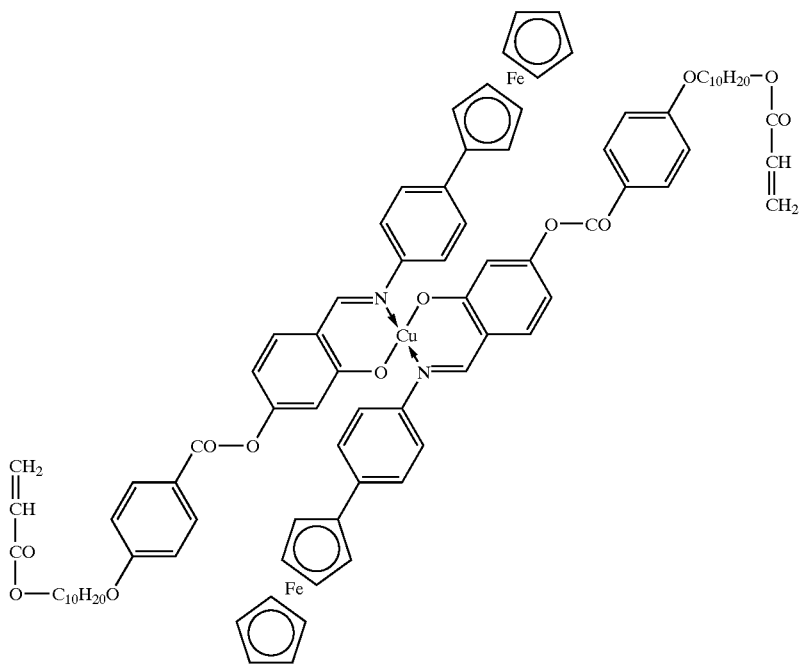

The first and second optically anisotropic layers of the second embodiment can be formed by coating an orientation layer with a liquid crystal composition (coating solution) containing the liquid crystal molecules, a polymerization initiator (described below) and optional additives (e.g., plasticizer, monomer, surface active agent, cellulose ester, 1,3,5-triazine compound, chiral agent).

A solvent for the composition preferably is an organic solvent. Examples of the organic solvents include amides (e.g., N,N-dimethylformamide) sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The composition can be coated according to a conventional coating method such as a wire-bar coating method, an extrusion coating method, a direct gravure coating method, a reverse gravure coating method or a die coating method.

The polymerization reaction can be classified into a thermal reaction with a thermal polymerization initiator and a photo reaction with a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), a-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm$^2$. The light irradiation can be conducted while the layer is heated to accelerate the photo polymerization reaction.

The thickness of the optically anisotropic layer (the thickness of each layer if two or more optical compensatory sheets are provided) is preferably in the range of 0.1 to 20 μm, more preferably in the range of 0.5 to 15 μm, and most preferably in the range of 1 to 10 μm.

[Ellipsoidal Polarizing Plate]

The polarizing plate comprises two transparent protective films and a polarizing membrane provided between the films. As the polarizing membrane, various membranes are known. Examples of the polarizing membranes include an iodine polarizing membrane, a polyene polarizing membrane and a dichromatic dye polarizing membrane. The iodine polarizing membrane and the dye polarizing membrane are generally prepared from polyvinyl alcohol films. The polarizing axis of the membrane is perpendicular to the stretching direction of the film.

The transparent axis in plane of the polarizing membrane is preferably essentially parallel or perpendicular to the slow axis of the transparent film.

A transparent polymer film is used as the transparent protective film. The term "transparent" means that light transmittance is not less than 80%.

A cellulose acetate film, preferably a triacetyl cellulose film, is generally used. The cellulose acetate film is preferably formed according to the solvent casting method.

The thickness of the protective film is preferably in the range of 20 to 500 μm, and more preferably in the range of 50 to 200 μm.

The ellipsoidal polarizing plate can be produced by laminating the optical compensatory sheet according to the invention on one surface of the polarizing membrane, and then laminating the protective film on the other surface. In this case, the optical compensatory sheet is preferably laminated so that the transparent film in the sheet may be on the side of the polarizing membrane.

[Liquid Crystal Display]

The present invention can be applied for liquid crystal displays of various modes. Examples of the display modes include TN (twisted nematic) mode, IPS (in plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode. Optical compensatory sheets for these modes are known. The optical compensatory sheet according to the invention is suitable for a liquid crystal display having a liquid crystal cell of VA mode, OCB mode or KAN mode, in which many rod-like liquid crystal molecules are vertically aligned. The optical compensatory sheet according to the invention is particularly suitable for VA mode in which most rod-like liquid crystal molecules are vertically aligned.

The liquid crystal cell of VA mode include the following types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

The methods for evaluating the films prepared in the following examples were described below.

(1) Retardation

The retardation values of Re and Rth of the prepared transparent film (optical compensatory sheet) were measured at 550=n by means of an ellipsometer [M-150, JASCO]. For evaluating the fluctuation of lateral Re and Rth, the retardation values in plane were measured laterally at intervals of 30 nm.

(2) Axial Difference (Angle Between the Slow Axis and the Stretching Axis)

The angle between the slow axis and the stretching axis (axial difference) of prepared transparent film was measured in the following manner. First, the direction of the slow axis in the prepared film was measured by means of an automatic birefringence meter (KOBRA-21ADH, Oji-Keisoku kiki Co., Ltd.). Then, the difference between the thus-measured direction and the direction in which the film had been stretched was obtained. The measurement was repeated laterally at intervals of 30 mm, and the maximum value was noted.

(3) Breaking Extension

A sample having the length of 15 cm and the width of 1 cm was cut along the stretching direction (the direction of the largest stretching ratio where the film is biaxially stretched along the (MD) machine direction and the (TD) transverse direction). The sample was stretched in a machine at the chucking distance of 10 cm, the rate of 10 mm per minutes the temperature of 25° C. and the relative humidity of 60% to obtain the breaking extention.

(4) Heat Shrinkage Starting Temperature

A sample was cut from the film. The sample has the length of 35 mm along the stretching direction of the high stretching ratio and the width of 3 mm along the direction of the low stretching ratio. The both ends along the lengthwise direction were chucked at the distance of 25 mm. The dimensional change of the sample was measured in a TMA machine (TMA2940, Thermomechanical Analyzer, TA instruments) by a force of 0.04 N while heating the sample from 30° C. to 200° C. at a rate of 3° C. per minute. The basic length was the length measured at 30° C. The heat shrinkage starting temperature was the temperature where 500 μm shrinkage from the basic length was observed.

EXAMPLE 1 & COMPARISON EXAMPLE 1
(Preparation of Optical Compensatory Sheet)

The following cellulose acetate solution (dope) was cast on a band to form a cellulose triacetate film. The acetic substitution degree described below was estimated from $^{13}$C-NMR spectrum according to Polymer Journal 17, 1065–1069 (1985).

| Cellulose acetate solution | |
|---|---|
| Cellulose triacetate (acetic substitution degree: 2.8) | 118 weight parts |
| Triphenyl phosphate | 9.19 weight parts |
| Biphenyldiphenyl phosphate | 4.60 weight parts |
| Tribenzylamine | 2.36 weight parts |
| Methyl acetate | 530 weight parts |
| Ethanol | 99.4 weight parts |
| Butanol | 33.1 weight parts |
| The following retardation increasing agent | 1.20 weight parts |
| (Retardation increasing agent) | |

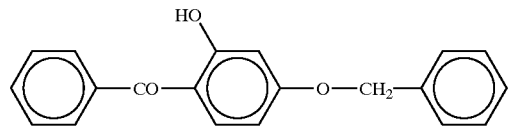

The formed film was longitudinally and uniaxially stretched under the conditions shown below. The amount of remaining solvent was measured in the following manner. First, about 1 g of the film was sampled and precisely weighed [X(g)]. After the sample was dried at 140° C. for 20 minutes, the sample was precisely weighed again [Y(g)]. The value 100×(X−Y)/X was calculated to evaluate the amount of remaining solvent.

| Stretching conditions | Example 1 | Comparison Ex. 1 |
|---|---|---|
| Remaining solvent | 30 wt. % | 3 wt. % |
| Expanding ratio | ×1.20 | ×1.20 |
| Temperature | 130° C. | 130° C. |
| Temperature difference between center and side edges | 3° C. | 0° C. |
| Stretching speed | 20%/minute | 300%/minute |

Thus, a cellulose triacetate film (a transparent film) of 1.5 m width and 120 μm thickness was prepared in each example. The prepared films exhibited the following characters. The fluctuations of the optical characters (Re and Rth) were evaluated laterally, and the ranges of fluctuation were described below.

| Characters | Example 1 | C. Ex. 1 |
|---|---|---|
| Breaking extension (%) | 25 | 3 |
| Re/average value (nm) | 25 | 25 |
| fluctuation (nm) | −2 to +3 | −9 to +10 |
| Rth/average value (nm) | 50 | 60 |
| fluctuation (nm) | −4 to +5 | −15 to +20 |
| Axial difference (°) | 1 | 15 |

On one surface of the transparent film, cellulose diacetate was applied and dried to form an undercoating layer (orientation layer to be subjected to rubbing treatment) of 0.5 μm thickness.

Then, 90 weight parts of the following discotic liquid crystal compound (1), 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1 weight part of a sensitizer (Kayacure DETX, Nippon Kayaku Co., Ltd.) were dissolved in methyl ethyl ketone to prepare a coating solution (solid content: 38 wt. %).

Discotic liquid crystal compound (1)

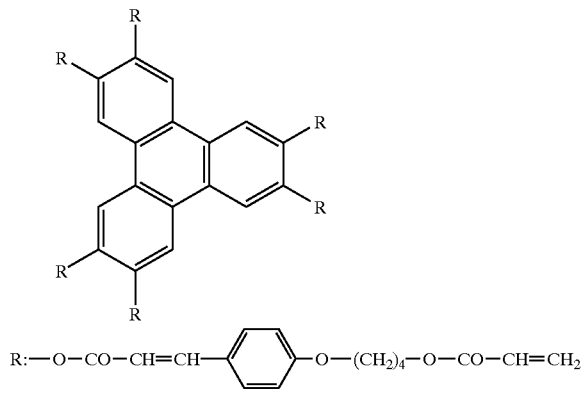

The coating solution was applied and dried on the undercoating layer. Immediately after the applied solution was heated at 130° C. for 2 minutes to align the discotic liquid crystal molecules, the solution was cooled to room temperature and irradiated with ultraviolet light (500 mJ/cm$^2$) to polymerize the discotic liquid crystal molecules. Thus, the alignment of the discotic liquid crystal molecules was fixed to form an optically anisotropic layer of 1.7 μm thickness.

The angle dependence of retardation of the optically anisotropic layer was measured by means of an ellipsometer [M-150, JASCO]. The inclined angle and the Rth (retardation value along the thickness direction) of Example 1 and Comparison Example 1 were found 0.2° and 88 nm (Example 1), or 1° and 100 nm (Comparison Example 1) respectively.

On the other surface of each cellulose triacetate film, an optically uniaxial polycarbonate film was laminated with an adhesive to prepare an optical compensatory sheet. The optically uniaxial polycarbonate film had an optical axis in the plane. The retardation value in plane (Re) and the retardation value along the thickness direction (Rth) were 50 nm and 20 nm, respectively.

The total Re and Rth of each prepared optical compensatory sheet were 50 nm and 100 nm (Example 1), or 80 nm and 200 nm (Comparison Example 1), respectively.

(Preparation of Ellipsoidal Polarizing Plate)

A polarizing membrane and a transparent protective film were overlaid in this order on the transparent film (polycarbonate film) side of the optical compensatory sheet prepared in Example 1, to prepare an ellipsoidal polarizing plate. The polarizing membrane was placed so that the slow axis of the transparent film might be parallel to the polarizing axis of the membrane.

In the same manner, another ellipsoidal polarizing plate with the optical compensatory sheet prepared in Comparison example 1 was prepared.

(Preparation of Liquid Crystal Display)

From a commercially available liquid crystal display of VA mode [LCD 5000], an ellipsoidal polarizing plate was peeled. In place of it, the above-prepared ellipsoidal polarizing plate of Example 1 or Comparison Example 1 was laminated to prepare a liquid crystal display. Independently, another optical compensatory sheet having the transparent film of Example 1 was prepared in the above manner except that the discotic liquid crystal compound was not used, and then an ellipsoidal polarizing plate with the prepared compensatory sheet was produced and a liquid crystal display with the ellipsoidal polarizing plate was prepared.

In the above procedure, each ellipsoidal polarizing plate was laminated in the form of a piece, which was formed by punching out the plate so that the side edge might remain in the piece. The size of the piece was determined according to that of the displaying screen. Each ellipsoidal polarizing plate was laminated so that the edge of the compensatory sheet might be placed at the edge of the display. (The ellipsoidal polarizing plate in each following Example was laminated on a liquid crystal display in the same manner.)

With respect to each prepared display, the contrast data in all directions were measured. The viewing angle giving a contrast ratio of 20:1 was shown below. All the displays prepared in Example 1 gave good viewing angles both at the central part and at the edge part.

| Discotic liquid crystal position | Ex. 1 used | | Ex. 1 not used | | C. Ex. 1 used | | | |
|---|---|---|---|---|---|---|---|---|
| viewing angle/ | center | edge | center | edge | center | edge | center | edge |
| up-downward | 160° | 160° | 150° | 150° | 150° | 130° | 120° | 120° |
| right-leftward | 160° | 160° | 150° | 150° | 150° | 130° | 120° | 120° | commercially available liquid crystal display of VA type

EXAMPLE 2

(Preparation of Optically Biaxial Transparent Support)

The following cellulose acetate solution (dope) was cast on a band to form a cellulose triacetate film. The casting was performed according to the single-layered film-forming method or the multi-layered film-forming method described below.

| Cellulose acetate solution | |
|---|---|
| Cellulose acetate (acetic substitution degree: 2.6) | 87 weight parts |
| Triphenyl phosphate | 10 weight parts |
| Ultraviolet absorber (TM165, Sumitomo Chemicals Co., Ltd) | 3 weight parts |
| Methylene chloride | 510 weight parts |
| Methanol | 44 weight parts |

(Film-Forming Process)

(1) Single-Layered Film-Forming Method

The dope was filtered through a filter paper (No. 244, Azumi Roshi Co., Ltd.) and a filter flannel, and sent to a pressure die by means of a quantitative gear pump. From the die, the dope was cast an a band of 6 m length. The temperature of the band was 0° C.

(2) Multi-Layered Film-Forming Method

A three-layered casting die was used. The above dope and a diluted dope containing the solvent more than the above dope by 10% were simultaneously cast onto a metal support from the center nozzle and the outer nozzles, respectively. The formed film was peeled off, and dried to obtain a three-layered cellulose triacetate film (thickness ratio between the inner layer and the outer layers is 8.1). The prepared three-layered film was spread on the band in the same manner as the above single-layered film-forming method.

(3) Stretching

The foamed film was stretched under the following conditions.

| Conditions | Ex. 2-1 | Ex. 2-2 | C. Ex. 2 |
|---|---|---|---|
| Layer of film | single | multi | multi |
| Remaining solvent | 25 wt. % | 35 wt. % | 55 wt. % |
| Expanding ratio | ×1.10 | ×1.30 | ×1.20 |
| Temperature | 120° C. | 140° C. | 130° C. |
| Temperature difference between center and side edges | 5° C. | 1° C. | 0° C. |
| Stretching speed | 10%/min. | 40%/min. | 300%/min. |

Thus, a cellulose triacetate film (a transparent film) of 1.0 m width and 100 μm thickness was prepared in each example. The prepared films exhibited the following characters.

| Characters | Ex. 2-1 | Ex. 2-2 | C. Ex. 2 |
|---|---|---|---|
| Breaking extension (%) | 21 | 28 | 38 |
| Re/average value (nm) | 20 | 30 | 35 |
| fluctuation (nm) | −2 to +2 | −3 to +3 | −9 to +10 |
| Rth/average value (nm) | 30 | 20 | 68 |
| fluctuation (nm) | −2 to +3 | −4 to +6 | −20 to +18 |
| Axial difference (°) | 0 | 2 | 19 |

(Preparation of Optical Compensatory Sheet)

The coating solution for optical compensatory sheet used in Example 1 was applied on each optically biaxial transparent film in the amount of 3 ml/m$^2$, and dried. The applied solution was heated at 130° C. for 1 minute to align the discotic liquid crystal molecules, and irradiated with ultraviolet light to polymerize the discotic liquid crystal molecules. Thus, the alignment of the discotic liquid crystal molecules was fixed.

The angle dependence of retardation of the optically anisotropic layer was measured by means of an ellipsometer [M-150, JASCO]. The inclined angle of the discotic liquid crystal molecules of Example 2-1, Example 2-2 and comparison Example 2 were all 0.10 at central part and 0.1°, 0.3° and 1° at the edge, respectively.

The Re (retardation value in plane) of Example 2-1, Example 2-2 and comparison Example 2 were all 25 nm at central part and 20 nm, 30 nm and 40 nm at the edge, respectively. The Rth (retardation value along the thickness direction) of Example 2-1, Example 2-2 and comparison Example 2 were all 120 nm at central part and 120 nm, 130 nm and 300 nm at the edge, respectively.

(Preparation of Ellipsoidal Polarizing Plate)

A polarizing membrane and a transparent protective film were overlaid in this order on the transparent film (polycarbonate film) side of each optical compensatory sheet, to prepare an ellipsoidal polarizing plate. The polarizing membrane was placed so that the slow axis of the transparent film might be parallel to the polarizing axis of the membrane.

(Preparation of Liquid Crystal Display)

From a commercially available liquid crystal display of VA mode [LCD 5000], an ellipsoidal polarizing plate was peeled. In place of it, each above-prepared ellipsoidal polarizing plate was laminated to prepare a liquid crystal display. Independently, another optical compensatory sheet having the transparent film of Example 2-1 or 2-2 was prepared in the above manner except that the discotic liquid crystal compound was not used, and then an ellipsoidal polarizing plate with the prepared compensatory sheet was produced and a liquid crystal display with the ellipsoidal polarizing plate was prepared.

With respect to each prepared display, the contrast data in all directions were measured. The viewing angle giving a contrast ratio of 20:1 was shown below.

| Discotic liquid crystal position | Ex. 2-1 used | | Ex. 2-2 used | | C. Ex. 2 used | |
|---|---|---|---|---|---|---|
| viewing angle/ | center | edge | center | edge | center | edge |
| up-downward | 165° | 165° | 160° | 160° | 150° | 120° |
| right-leftward | 165° | 165° | 160° | 160° | 150° | 120° |

| Discotic liquid crystal position | Ex. 2-1 used | | Ex. 2-2 used | | C. Ex. 2 used | |
|---|---|---|---|---|---|---|
| viewing angle/ | center | edge | center | edge | center | edge |
| up-downward | 160° | 160° | 160° | 160° | 135° | 100° |
| right-leftward | 160° | 160° | 160° | 160° | 135° | 100° |

EXAMPLE 3

(Preparation of Optically Biaxial Transparent Support)

The following cellulose acetate solution (dope) was cast on a band to form a cellulose triacetate film. The casting was performed according to the single-layered film-forming method described below.

(1) Dope

| Cellulose acetate solution (dope) | |
| --- | --- |
| Cellulose acetate (acetic substitution degree: 2.7) | 85 weight parts |
| Triphenyl phosphate | 10 weight parts |
| Ultraviolet absorber (TM165, Sumitomo Chemicals Co., Ltd) | 5 weight parts |
| Methylene chloride | 510 weight parts |
| Methanol | 44 weight parts |

(2) Film-Forming Process

The dope was filtered through a filter paper (No. 244, Azumi Roshi Co., Ltd.) and a filter flannel, and sent to a pressure die by means of a quantitative gear pump. From the die, the dope was cast on a band of 6 m length. The temperature of the band was 0° C.

(3) Stretching

The formed film was stretched under the following conditions.

| Conditions | Example 3 |
| --- | --- |
| Layer of film | single |
| Remaining solvent | 25 wt. % |
| Expanding ratio | ×1.10 |
| Temperature | 120° C. |
| Temperature difference between center and side edges | 5° C. |
| Stretching speed | 10%/min. |

Thus, a cellulose triacetate film (a transparent film) of 1.0 m width and 100 An thickness was prepared. The prepared film exhibited the following characters.

| Characters | Example 3 |
| --- | --- |
| Breaking extension (%) | 15 |
| Re/average value (nm) | 70 |
| fluctuation (nm) | −1 to +1 |
| Rth/average value (nm) | 100 |
| fluctuation (nm) | −6 to +4 |
| Axial difference (°) | 4 |

(Preparation of Optical Compensatory Sheet)

The coating solution for optical compensatory sheet used in Example 1 was applied on the optically biaxial transparent film in the amount of 6 ml/m², and dried. The applied solution was heated at 130° C. for 1 minute to align the discotic liquid crystal molecules, and irradiated with ultraviolet light to polymerize the discotic liquid crystal molecules. Thus, the alignment of the discotic liquid crystal molecules was fixed.

The angle dependence of retardation of the optically anisotropic layer was measured by means of an ellipsometer (M-150, JASCO]. The inclined angle of the discotic liquid crystal molecules was 0.5°.

The Re (retardation value in plane) and the Rth (retardation value along the thickness direction) were 50 nm and 250 nm, respectively.

(Preparation of Ellipsoidal Polarizing Plate)

A polarizing membrane and a transparent protective film were overlaid in this order on the transparent film (polycarbonate film) side of the optical compensatory sheet, to prepare an ellipsoidal polarizing plate. The polarizing membrane was placed so that the slow axis of the transparent film might be parallel to the polarizing axis of the membrane.

(Preparation of Liquid Crystal Display)

From a commercially available liquid crystal display of VA mode [LCD 5000], an ellipsoidal polarizing plate was peeled. In place of it, the above-prepared ellipsoidal polarizing plate was laminated to prepare a liquid crystal display. Independently, another optical compensatory sheet having the transparent film was prepared in the above manner except that the discotic liquid crystal compound was not used, and then an ellipsoidal polarizing plate with the prepared compensatory sheet was produced and a liquid crystal display with the ellipsoidal polarizing plate was prepared.

With respect to each prepared display, the contrast data in all directions were measured.

| | Example 3 | | | |
| --- | --- | --- | --- | --- |
| Discotic liquid crystal position | used | | not used | |
| viewing angle/ | center | edge | center | edge |
| up-downward | 164° | 163° | 162° | 160° |
| right-leftward | 161° | 161° | 160° | 160° |

EXAMPLE 4

(Preparation of Optically Biaxial Transparent Support)

The following cellulose acetate solution (dope) was cast on a band to form a cellulose triacetate film. The casting was performed according to the single-layered film-forming method described below.

(1) Dope

| Cellulose acetate solution (dope) | |
| --- | --- |
| Cellulose acetate (acetic substitution degree: 2.9) | 85 weight parts |
| Triphenyl phosphate | 10 weight parts |
| Biphenyldiphenyl phosphate | 5 weight parts |
| Methylene chloride | 510 weight parts |
| Methanol | 44 weight parts |
| The retardation increasing agent used in Example 1 | 4.4 weight parts |

(2) Film-Forming Process

The dope was filtered through a filter paper (No. 244, Azumi Roshi Co., Ltd.) and a filter flannel, and sent to a pressure die by means of a quantitative gear pump. From the die, the dope was cast on a band of 6 m length. The temperature of the band was 0° C.

(3) Stretching

The formed film was stretched under the following conditions.

| Conditions | Example 4 |
|---|---|
| Layer of film | single |
| Remaining solvent | 40 wt. % |
| Expanding ratio | ×1.53 |
| Temperature | 140° C. |
| Temperature difference between center and side edges | 8° C. |
| Stretching speed | 70%/min. |

Thus, a cellulose triacetate film (a transparent film) of 1.0 m width and 140 μm thickness was prepared. The prepared film exhibited the following characters.

| Characters | Example 4 |
|---|---|
| Breaking extension (%) | 28 |
| Re/average value (nm) | 40 |
| fluctuation (nm) | −4 to +5 |
| Rth/average value (nm) | 86 |
| fluctuation (nm) | −7 to +7 |
| Axial difference | 2 |

(Preparation of Optical Compensatory Sheet)

On one surface of the transparent film, gelatin was applied to form an undercoating layer. An aqueous solution containing the following denatured polyvinyl alcohol (2 wt. %) and glutaric aldehyde (0.1 wt. %) was applied on the undercoating layer, and the applied solution was dried to form an orientation layer of 0.5 μm thickness.

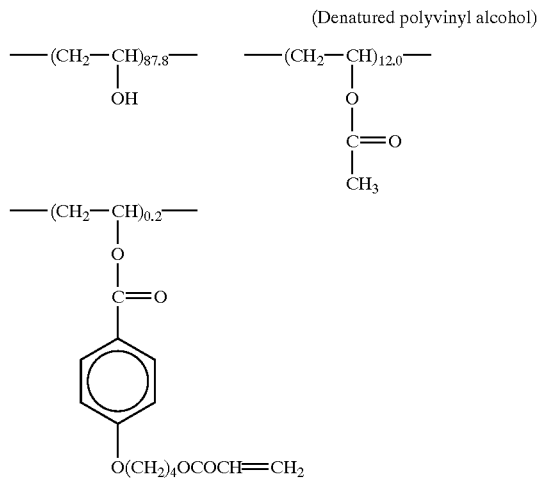

(Denatured polyvinyl alcohol)

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light (500 mJ/cm$^2$) to polymerize the discotic liquid crystal molecules. Thus, the alignment of the discotic liquid crystal molecules was fixed to form an optically anisotropic layer of 1.2 gm thickness.

The angle dependence of retardation of the optically anisotropic layer was measured by means of an ellipsometer [M-150, JASCO]. The inclined angle of the discotic liquid crystal molecules was 0.2°.

The retardation values of Re and Rth were measured at 550 nm by means of an ellipsometer [M-150, JASCO]. The values of Re and Rth were found 40 nm and 160 nm, respectively.

(Preparation of Ellipsoidal Polarizing Plate)

A polarizing membrane and a transparent protective film were overlaid in this order on the transparent film (polycarbonate film) side of the optical compensatory sheet, to prepare an ellipsoidal polarizing plate. The polarizing membrane was placed so that the slow axis of the transparent film night be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared ellipsoidal polarizing plate was laminated.

With respect to the prepared display, the viewing angle giving a contrast ratio of 10:1 without image inversion was measured. The results are set forth in Table 1.

EXAMPLE 5

(Preparation of Optically Biaxial Transparent Support)

In 70 weight parts of methylene chloride, 30 weight parts of norbornene resin (Artone, JSR Co., Ltd.) was dissolved. The solution was cast on a band, and dried to form a norbornene film. The film was longitudinally stretched, and then laterally stretched under the following conditions to prepare an optically biaxial transparent film.

| Conditions | Example 5 | |
|---|---|---|
| Stretching | longitudinally | laterally |
| Remaining solvent | 38 wt. % | 8 wt. % |
| Expanding ratio | ×1.15 | ×1.07 |
| Temperature | 140° C. | 148° C. |
| Temperature difference between center and side edges | 2° C. | 9° C. |
| Stretching speed | 100%/min. | 20%/min. |

Thus, a norbornene film (a transparent film) of 1.5 m width and 100 μm thickness was prepared. The prepared film exhibited the following characters.

| Characters | Example 5 |
|---|---|
| Breaking extension (%) | 26 |
| Re/average value (nm) | 40 |
| fluctuation (nm) | −4 to +4 |
| Rth/average value (nm) | 46 |
| fluctuation (nm) | −5 to +4 |
| Axial difference (°) | 1 |

(Preparation of Optical Compensatory Sheet)

One surface of the transparent support was subjected to the corona discharge treatment. On the treated surface, an aqueous solution containing the denatured polyvinyl alcohol used in Example 4 (2 wt. %) and glutaric aldehyde (0.1 wt.

%) was applied. The applied solution was dried to form an orientation layer of 0.5 μm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules. Thus, the alignment of the discotic liquid crystal molecules was fixed to form an optically anisotropic layer of 1.4 μm thickness.

The angle dependence of retardation of the optically anisotropic layer was measured by means of an ellipsometer [M-150, JASCO]. The inclined angle of the discotic liquid crystal molecules was all 0.3°.

The retardation values of Re and Rth were measured at 550 n=by means of an ellipsometer [M-150, JASCO]. The values of Re and Rth were found 30 nm and 120 nm, respectively.

(Preparation of Ellipsoidal Polarizing Plate)

A polarizing membrane and a transparent protective film were overlaid in this order on the transparent support side of the optical compensatory sheet, to prepare a ellipsoidal polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared ellipsoidal polarizing plate was laminated.

With respect to the prepared display, the viewing angle giving a contrast ratio of 10:1 without image inversion was measured. The results are set forth in Table 1.

EXAMPLE 6

(Preparation of Optically Biaxial Transparent Support)

A commercially available polycarbonate film (Teijin Limited) was longitudinally stretched, and then laterally stretched under the following conditions to prepare an optically biaxial transparent film.

| Conditions | Example 6 | |
|---|---|---|
| Stretching | longitudinally | laterally |
| Expanding ratio | ×1.4 | ×1.15 |
| Temperature | 145° C. | 148° C. |
| Temperature difference between center and side edge | 3° C. | 6° C. |
| Stretching speed | 90%/min. | 20%/min. |

Thus, a polycarbonate film (a transparent film) of 1.5 m width and 100 μm thickness was prepared. The prepared film exhibited the following characters.

| Characters | Example 6 |
|---|---|
| Breaking extension (%) | 12 |
| Re/average value (nm) | 120 |
| fluctuation (nm) | −5 to +5 |
| Rth/average value (nm) | 190 |
| fluctuation (nm) | −9 to +10 |
| Axial difference (°) | 2 |

(Preparation of Optical Compensatory Sheet)

One surface of the transparent support was subjected to the corona discharge treatment. On the treated surface, an aqueous solution containing the denatured polyvinyl alcohol used it Example 4 (2 wt. %) and glutaric aldehyde (0.1 wt. %) was applied. The applied solution was dried to form an orientation layer of 0.5 μm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules, Thus, the alignment of the discotic liquid crystal molecules was fixed to form an optically anisotropic layer of 3.5 μm thickness.

The angle dependence of retardation of the optically anisotropic layer was measured by means of an ellipsometer [M-150, JASCO]. The inclined angle of the discotic liquid crystal molecules was 0.10.

The retardation values of Re and Rth were measured at 633 nm by means of an ellipsometer [M-150, JASCO]. The values of Re and Rth were found 200 nm and 300 nm, respectively.

(Preparation of Ellipsoidal Polarizing Plate)

A polarizing membrane and a transparent protective film were overlaid in this order on the transparent support side of the optical compensatory sheet, to prepare a ellipsoidal polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared ellipsoidal polarizing plate was laminated.

With respect to the prepared display, the viewing angle giving a contrast ratio of 10:1 without image inversion was measured. The results are set forth in Table 1.

COMPARISON EXAMPLE 2

(Preparation of Optically Isotropic Transparent Support)

A commercially available cellulose triacetate film (TD80UF, Fuji Photo Film Co., Ltd.) of 1.3 m width and 80 mm thickness was used as a transparent film.

The retardation values of Rth and Re of the support were measured at 633 nm by means of an ellipsometer [M-150, JASCO]. The values of Rth and Re were found 40 nm and 3 nm, respectively. This meant that the film was essentially isotropic. The fluctuations of Re and Rth were −1 to +1 nm and −5 to +5 nm, respectively.

(Preparation of Optical Compensatory Sheet)

On one surface of the transparent support, gelatin was applied to form an undercoating layer. On the undercoating layer, an aqueous solution containing the denatured polyvinyl alcohol used in Example 4 (2 wt. %) and glutaric aldehyde (0.1 wt. %) was applied. The applied solution was dried to form an orientation layer of 0.5 μm thickness.

Then, 90 weight parts of the discotic liquid crystal compound (1) used in Example 1, 10 weight parts of ethylene oxide denatured trimethlolpropanetriacrylate (V#360, Osaka Organic Chemicals Co., Ltd.), 0.6 weight part of melamine formaldehyde/acrylic acid copolymer (Aldrich), 3.0 weight parts of a photopolymerization initiator (Irgacure 907, Ciba-Geigy) and 1.0 weight part of a sensitizer (Kayacure DETX, Nippon Kayaku Co., Ltd.) were dissolved in 170 weight parts of methyl ethyl ketone to prepare a coating solution.

The coating solution was applied and dried on the orientation layer. The applied solution was heated at 130° C. for 1 minute to align the discotic liquid crystal molecules, and then irradiated with ultraviolet light to polymerize the discotic liquid crystal molecules. Thus, the alignment of the discotic liquid crystal molecules was fixed to form an optically anisotropic layer of 2.0 μm thickness.

The angle dependence of retardation of the optically anisotropic layer was measured by means of an ellipsometer [M-150, JASCO]. The inclined angle of the discotic liquid crystal molecules was 0.1°.

The retardation values of Re and Rth were measured at 550 nm by means of an ellipsometer [M-150, JASCO]. The values of Re and Rth were found 3 m and 240 nm, respectively.

(Preparation of Ellipsoidal Polarizing Plate)

A polarizing membrane and a transparent protective film were overlaid in this order on the transparent support side of the optical compensatory sheet, to prepare a ellipsoidal polarizing plate.

The polarizing membrane was placed so that the slow axis of the support might be parallel to the polarizing axis of the membrane.

(Preparation of Liquid Crystal Display)

From a commercially available liquid crystal display of MVA mode [VL-1530S, Fujitsu Ltd.], a polarizing plate was peeled. In place of it, the above-prepared ellipsoidal polarizing plate was laminated.

With respect to the prepared display, the viewing angle giving a contrast ratio of 10:1 without image inversion was measured. The results are set forth in Table 1.

REFERENCE EXAMPLE 1

With respect to a commercially available liquid crystal display of MVA mode [VL-1530S, Fujitsu Ltd.], the viewing angle giving a contrast ratio of 10:1 without image inversion was measured. The results are set forth in Table 1.

TABLE 1

| | | retardation of compensatory sheet | | viewing angle |
|---|---|---|---|---|
| | | Re | Rth | (1) |
| Ex. 4 | (C) | 40 nm | 160 nm | 80° |
| | (E) | 41 nm | 162 nm | 81° |
| Ex. 5 | (C) | 30 nm | 120 nm | 81° |
| | (E) | 31 nm | 122 nm | 82° |
| Ex. 6 | (C) | 200 nm | 300 nm | 80° |
| | (E) | 210 nm | 290 nm | 81° |

TABLE 1-continued

| | | retardation of compensatory sheet | | viewing angle |
|---|---|---|---|---|
| | | Re | Rth | (1) |
| C. Ex. 2 | (C) | 3 nm | 240 nm | 80° |
| | (E) | 5 nm | 230 nm | 70° |
| R. Ex. 1 | (C) | without compensatory sheet | | 80° |
| | (E) | without compensatory sheet | | 80° |

Remarks:
(1) upward-downward-rightward-leftward
(C) central part
(E) side edge

EXAMPLE 7 & COMPARISON EXAMPLE 3

(Preparation of Optically Biaxial Transparent Film)

In 232.755 weight parts of methylene chloride, 42.57 weight parts of methanol and 8.50 weight parts of n-butanol, 45 weight parts of cellulose triacetate having an average acetic acid content of 60.9% (substitution degree: 2.7, which was measured by 13C-NMR spectrum according to Polymer Journal 17. 1065–1069(1985)), 2.35 weight parts of the retardation increasing agent used in Example 1, 2.75 weight parts of triphenyl phosphate and 2.20 weight parts of biphenyl diphenyl phosphate were dissolved. The obtained solution was cast in a drum casting machine to prepare a cellulose acetate film.

The formed film was longitudinally and uniaxially stretched under the conditions shown below. The amount of remaining solvent was measured in the following manner. First, about 19 of the film was sampled and precisely weighed [X(g)]. After the sample was dried at 140° C. for 20 minutes, the sample was precisely weighed again [Y(g)]. The value 100×(X−Y)/X was calculated to evaluate the amount of remaining solvent.

| Stretching conditions | Example 7 | Comparison Ex. 3 |
|---|---|---|
| Remaining solvent | 30 wt. % | 3 wt. % |
| Preheat temperature | 100° C. | No preheat |
| Preheat time | 60 seconds | No preheat |
| Stretching ratio | ×1.20 | ×1.20 |
| Stretching temperature | 130° C. | 130° C. |
| Stretching speed | 20%/minute | 300%/minute |

Each of the prepared cellulose triacetate films (a transparent film) had a thickness of 105 μm and a width of 1.5 m. The prepared films were evaluated to determne the following characters. The fluctuations of the optical characters (Re and Rth) were evaluated laterally, and the ranges of fluctuation were described below.

| Characters | Example 7 | Comparison Ex. 3 |
|---|---|---|
| Breaking extension (%) | 25 | 3 |
| Heat shrinkage starting temperature (° C.) | 150 | No shrink (expand) |
| Re/average value (nm) | 41 | 25 |
| fluctuation (nm) | −2 to +2 | −8 to +10 |
| Rth/average value (nm) | 83 | 60 |
| fluctuation (nm) | −6 to +5 | −14 to +18 |
| Axial difference (°) | 1 | 15 |

(Preparation of Optical Compensatory Sheet)

One surface of the transparent film was subjected to a corona discharge treatment.

On the treated surface, 2 wt. % solution of a denatured polyimide (Nissan Chemical Co., Ltd.) was coated and dried to form an orientation layer having a thickness of 0.5 μm. The surface of the orientation layer was subjected to a rubbing treatment.

In 80 weight parts of tetrachloroethane, 20 weight parts of an acrylic thermotropic liquid crystal was dissolved to prepare a coating solution.

The solution was coated on the orientation layer, and dried at 160° C. for 5 minutes. The layer was cooled to the room temperature to fix the alignment of the liquid crystal molecules. The formed (first) optical anisotropic layer had a thickness of 1.5 μm in each of Example 7 and Comparison Example 3.

The average inclined angle between the long axis of the rod-like liquid crystal molecule and the transparent film surface was 1° in Example 7 or 7° in Comparison Example 3.

The retardation values of the optical compensatory sheets were measured using an ellipsometer (M-150, JASCO) at the wavelength of 633 nm. The Re retardation value in plane of the optical compensatory sheet of Example 7 was 40 nm, and the Rth retardation value along the thickness direction was 240 nm. The Re retardation value in plane of the optical compensatory sheet of Comparison Example 3 was 10 nm, and the Rth retardation value along the thickness direction was 400 nm.

(Preparation of Ellipsoidal Polarizing Plate)

An ellipsoidal polarizing plate was prepared by laminating a polarizing membrane and a transparent protective film on the transparent film of the optical compensatory sheet. The slow axis of the transparent film was parallel to the polarizing axis of the polarizing membrane.

(Preparation of Liquid Crystal Display)

A polarizing plate was removed from a commercially available liquid crystal display of MVA mode (VL-1530S, Fujitsu Ltd.). The above-prepared polarizing plate was cut into a piece according to the size of the removed polarizing plate. The cut piece was placed in the liquid crystal display in place of the removed polarizing plate. Further, a sample prepared in the same manner as in Example 7, except that the rod-like liquid crystal was not coated.

The viewing angle giving a contrast ratio of 10:1 without reversing image was measured with respect to the prepared MVA liquid crystal display. The results are shown below. The viewing angle can be improved according to the present invention. The viewing angle was the average of the angles along the polarizing axis of the polarizing plate and the angle along the direction perpendicular to the polarizing axis. The oblique viewing angle was also measured as the average of the angles along the direction of 45° from the polarizing axis of the polarizing plate and the angles along the direction of 135° from the polarizing axis.

The liquid crystal display was left in a thermostat of 80° C. for 12 hours. The light leaks like spots or frame were observed. The light leaks like spots were evaluated by counting the number of spots like stars in a black image. The light leaks like frame were evaluated by measuring the width of the white frame where a whole black image was displayed.

| Characteristics of liquid crystal display | | | | |
|---|---|---|---|---|
| Liquid crystal Display | | Example 7 | Comp. Example 3 | Commercially available |
| Liquid crystal Viewing angle (oblique) | Coated 85° 80° | None 80° 80° | Coated 80° 65° | None 80° 60° |
| Frame (width) | 0 mm | 0 mm | 16 mm | 22 mm |
| Spots (number) | 0 | 0 | 4 | 5 |

EXAMPLE 8

(Preparation of Optically Biaxial Transparent Film)

In 70 weight parts of methylene chloride, 30 weight parts of norbornene resin (Artone, JSR Co., Ltd.) was dissolved. The solution was cast in a band casting machine to form a norbornene film. The film was longitudinally stretched, and then laterally stretched under the following conditions to prepare an optically biaxial transparent film.

| Stretching conditions | Example 8 | |
|---|---|---|
| Stretching | Longitudinally | Laterally |
| Remaining solvent | 45 wt.% | 8 wt.% |
| Expanding ratio | ×1.15 | ×1.10 |
| Preheat temperature | 150° C. | 80° C. |
| Preheat temperature | 18 seconds | 154 seconds |
| Stretching temperature | 140° C. | 148° C. |
| Stretching speed | 100%/minutes | 20%/minutes |

A norbornene film (a transparent film) having a thickness of 100 μm thickness was prepared. The prepared film exhibited the following characters.

| Characters | Example 8 |
|---|---|
| Breaking extension (%) | 11 |
| Heat shrinkage starting temperature (° C.) | 160 |
| Re/average value (nm) | 59 |
| fluctuation (nm) | −2 to +3 |
| Rth/average value (nm) | 63 |
| fluctuation (nm) | −5 to +4 |
| Axial difference (°) | 3 |

(Preparation of Optical Compensatory Sheet)

One surface of the transparent support was subjected to the corona discharge treatment. An aqueous solution containing 2 wt. % of the denatured polyvinyl alcohol used in Example 4 and 0.1 wt. % of glutaric aldehyde was coated on the treated surface, and dried form an orientation layer having a thickness of 0.5 μm.

In 70 weight parts of methylene chloride, 30 weight parts of the rod-like liquid crystal molecules (N31) were dissolved to prepare a coating solution.

The solution was coated on the orientation layer and dried. The formed layer was heated at 130° C. for 1 minute to align the rod-like liquid crystal molecules. The layer was irradiated with ultraviolet light to polymerize the rod-like liquid crystal molecules to fix the alignment. The formed (first) optically anisotropic layer has a thickness of 1.0 μm.

The average inclined angle between the ling axis of the rod-like liquid crystal molecule and the transparent film surface was 4°.

The retardation values of the optical compensatory sheets were measured using an ellipsometer (M-150, JASCO) at the wavelength of 633 nm. The Re retardation value in plane of the optical compensatory sheet was 36 nm, and the Rth retardation value along the thickness direction was 122 nm.
(Preparation of Ellipsoidal Polarizing Plate)

An ellipsoidal polarizing plate was prepared by laminating a polarizing membrane and a transparent protective film on the transparent film of the optical compensatory sheet.

The slow axis of the transparent film was parallel to the polarizing axis of the polarizing membrane.
(Preparation of Liquid Crystal Display)

A polarizing plate was removed from a commercially available liquid crystal display of MVA mode (VL-1530S, Fujitsu Ltd.). The above-prepared polarizing plate was cut into a piece according to the size of the removed polarizing plate. The cut piece was placed in the liquid crystal display in place of the removed polarizing plate. Further, a sample prepared in the same manner as is described above, except that the rod-like liquid crystal was not coated.

The viewing angle giving a contrast ratio of 10:1 without reversing image was measured with respect to the prepared MVA liquid crystal display. The results are shown below.

| Characteristics of liquid crystal display | | |
|---|---|---|
| Liquid crystal Display | Example 8 | |
| Rod-like liquid crystal | Coated | None |
| Viewing angle | 80° | 78° |
| Oblique viewing angle | 77° | 75° |
| Frame (width) | 0 mm | 0 mm |
| Spots (number) | 0 | 0 |

EXAMPLE 9

(Preparation of Transparent Film)

A dope of the following composition was prepared and cast on a band according to a single layered casting method or a multi-layered casting method to form cellulose triacetate films.

| Composition of dope | |
|---|---|
| Cellulose acetate (acetic substitution degrees: 2.8) | 45 weight parts |
| Triphenyl phosphate | 2.75 weight parts |
| Biphenyl diphenyl phosphate | 2.20 weight parts |
| Ultraviolet absorbing agent (TM165, Sumitomo Chemicals Co., Ltd) | 1.5 weight part |
| Methylene chloride | 233 weight parts |
| Methanol | 43 weight parts |
| n-Butanol | 8.50 weight parts |

(Formation of Film According to Single Layered Method)

The dope was filtered through a paper filter (No. 244, Azumi Roshi Co., Ltd.) and a flannel filter, and sent to a pressure die by means of a quantitative gear pump. From the die, the dope was cast on a band of 6 m length. The temperature of the band was 0° C.
(Formation of Film According to Multi-Layered Method)

A three-layered casting die was used. The above dope and a diluted dope containing the solvent more than the above dope by 10% were simultaneously cast onto a metal support from the center nozzle and the outer nozzles, respectively. The formed film was peeled off, and dried to obtain a three-layered cellulose triacetate film (thickness ratio between the inner layer and the outer layers is 8:1). The prepared three-layered film was spread on the band in the same manner as the above single layered film forming method.

(Stretch of Films)

The formed film was stretched under the following conditions.

| Conditions | Example 9-1 | Example 9-2 |
|---|---|---|
| Film forming method | Single layered | Multi-layered |
| Remaining solvent | 35 wt. % | 20 wt. % |
| Preheat temperature | 90° C. | 110° C. |
| Preheat time | 55 seconds | 90 seconds |
| Stretching ratio | ×1.53 | ×1.30 |
| Stretching temperature | 120° C. | 140° C. |
| Stretching speed | 10%/minutes | 40%/minutes |

Each of the prepared cellulose triacetate films (transparent films) has a width of 1 m and a thickness of 100 µm was prepared. The prepared films have the following characters.

| Characters of films | Example 9-1 | Example 9-2 |
|---|---|---|
| Film forming method | Single layered | Multi-layered |
| Breaking extension (%) | 15 | 20 |
| Heat shrinkage starting temperature (° C.) | 140 | 160 |
| Re/average value (nm) | 13 | 25 |
| fluctuation (nm) | −3 to +3 | −2 to +2 |
| Rth/average value (nm) | 40 | 60 |
| fluctuation (nm) | −4 to +5 | −6 to +7 |
| Axial difference (°) | 4 | 0 |

(Preparation of Optical Compensatory Sheet)

Gelatin undercoating layers were coated on the both sides of the transparent film.

An aqueous solution containing 2 wt. % of denatured polyvinyl alcohol used in Example 8 and 0.1 wt. % of gluraric aldehyde was coated on each of the gelatin undercoating layers, and dried to form orientation layers having a thickness of 0.5 µm. one of the orientation layers was subjected to a rubbing treatment.

In 70 weight parts of methylene chloride, 30 weight parts of the rod-like liquid crystal molecules (N31) were dissolved to prepare a coating solution.

The solution was coated on the orientation layer subjected to the rubbing treatment, and dried. The formed layer was heated at 130° C. for 1 minute to align the rod-like liquid crystal molecules. The layer was irradiated with ultraviolet light to polymerize the rod-like liquid crystal molecules to fix the alignment. The formed first optically anisotropic layer has a thickness of 1.2 µm.

The average inclined angle between the ling axis of the rod-like liquid crystal molecule in the first optically anisotropic layer and the transparent film surface was 2°.

The other orientation layer was subjected to the rubbing treatment. The direction of the rubbing treatment was perpendicular to the rubbing direction of the previous treatment.

In 70 weight parts of methylene chloride, 30 weight parts of the rod-like liquid crystal molecules (N40) were dissolved to prepare a coating solution.

The solution was coated on the orientation layer, and dried. The formed layer was heated at 130° C. for 1 minute to align the rod-like liquid crystal molecules. The layer was irradiated with ultraviolet light to polymerize the rod-like liquid crystal molecules to fix the alignment. The formed second optically anisotropic layer has a thickness of 2.0 µm.

The average inclined angle between the ling axis of the rod-like liquid crystal molecule in the second optically anisotropic layer and the transparent film surface was 1°.

The retardation values of the optical compensatory sheets were measured using an ellipsometer (M-150, JASCO) at the wavelength of 633 nm. The Re retardation value in plane of the optical compensatory sheet prepared according to the single layered method was 60 nm, and the Rth retardation value along the thickness direction was 140 nm. The Re retardation value in plane of the optical compensatory sheet prepared according to the multi-layered method was 70 nm, and the Rth retardation value along the thickness direction was 140 nm.

(Preparation of Ellipsoidal Polarizing Plate)

An ellipsoidal polarizing plate was prepared by laminating a polarizing membrane and a transparent protective film on the transparent film of the optical compensatory sheet.

The slow axis of the transparent film was parallel to the polarizing axis of the polarizing membrane.

(Preparation of Liquid Crystal Display)

A polarizing plate was removed from a commercially available liquid crystal display of MVA mode (VL-1530S, Fujitsu Ltd.). Each of the above-prepared polarizing plates was cut into a piece according to the size of the removed polarizing plate. The cut piece was placed in the liquid crystal display in place of the removed polarizing plate. Further, samples were prepared in the same manner as is described above, except that the rod-like liquid crystal was not coated.

The viewing angle giving a contrast ratio of 10:1 without reversing image was measured with respect to the prepared MVA liquid crystal display. The results are shown below.

| Characteristics of liquid crystal display | | | | |
|---|---|---|---|---|
| Liquid crystal Display | Example 9-1 | | Example 9-2 | |
| Film forming method | Single layered | | Multi-layered | |
| Rod-like liquid crystal | Coated | None | Coated | None |
| Viewing angle | 80° | 78° | 83° | 81° |
| Oblique viewing angle | 77° | 75° | 80° | 80° |
| Frame (width) | 0 mm | 0 mm | 0 mm | 0 mm |
| Spots (number) | 0 | 0 | 0 | 0 |

I claim:

1. An optical compensatory sheet comprising an optically uniaxial or optically biaxial transparent stretched film, wherein a Re retardation value in plane of the transparent stretched film measured at 550 nm fluctuates, in any direction parallel to the transparent stretched film surface, within the range of ±5 nm based on an average Re value in each direction, and a Rth retardation value along the thickness direction of the transparent stretched film fluctuates, in any direction parallel to the transparent stretched film surface, within the range of ±10 nm based on an average Rth value in each direction.

2. An optical compensatory sheet comprising an optically uniaxial or optically biaxial transparent stretched film and an optically anisotropic layer formed from discotic liquid crystal molecules, wherein a Re retardation value in plane of the transparent stretched film measured at 550 nm fluctuates, in any direction parallel to the transparent stretched film surface, within the range of ±5 run based on an average Re value in each direction, a Rth retardation value along the thickness direction of the transparent stretched film fluctuates, in any direction parallel to the transparent stretched film surface, within the range of ±10 nm based on an average Rth value in each direction, and the discotic liquid crystal molecules are so aligned that an average inclined angle between the discotic plane of the molecule and the surface of the transparent stretched film is less than 5°.

3. The optical compensatory sheet as defined in claim 2, wherein the transparent stretched film has a stretching direction essentially parallel to a slow axis in plane of the transparent stretched film.

4. The optical compensatory sheet as defined in claim 2, wherein the transparent stretched film has the Re retardation value in the range of 10 to 1,000 nm.

5. The optical compensatory sheet as defined in claim 2, wherein the transparent stretched film has the Rth retardation value in the range of 10 to 1,000 nm.

6. The optical compensatory sheet as defined in claim 2, wherein the optical compensatory sheet has a Re retardation value in the range of 20 to 200 nm.

7. The optical compensatory sheet as defined in claim 2, wherein the optical compensatory sheet has a Rth retardation value in the range of 70 to 500 nm.

8. The optical compensatory sheet as defined in claim 2, wherein the transparent stretched film has a layered structure consisting of 2 to 10 layers.

9. An ellipsoidal polarizing plate comprising two transparent protective films and a polarizing membrane provided between the transparent protective films, wherein one of the transparent protective films is an optical compensatory sheet comprising an optically uniaxial or optically biaxial transparent stretched film and an optically anisotropic layer formed from discotic liquid crystal molecules, a Re retardation value in plane of the transparent stretched film measured at 550 nm fluctuates, in any direction parallel to the transparent stretched film surface, within the range of ±5 nm based on an average Re value in each direction, a Rth retardation value along the thickness direction of the transparent stretched film fluctuates, in any direction parallel to the transparent stretched film surface, within the range of ±10 nm based on an average Rth value in each direction, and the discotic liquid crystal molecules are so aligned that an average inclined angle between the discotic plane of the molecule and the surface of the transparent stretched film is less than 5°.

10. A liquid crystal display comprising two polarizing plates and a liquid crystal cell of VA mode provided between the plates, said polarizing plate comprising two transparent protective films and a polarizing membrane provided between the transparent protective films, wherein at least one of the transparent protective films placed between the liquid crystal cell and the polarizing plates is an optical compensatory sheet comprising an optically uniaxial or optically biaxial transparent stretched film and an optically anisotropic layer formed from discotic liquid crystal molecules, a Re retardation value in plane of the transparent stretched film measured at 550 nm fluctuates, in any direction parallel to the transparent stretched film surface, within the range of ±5 nm based on an average Re value in each direction, a Rth retardation value along the thickness direction of the transparent stretched film fluctuates, in any direction parallel to the transparent stretched film surface, within the range of ±10 nm based on an average Rth value in each direction, and the discotic liquid crystal molecules are so aligned that an average inclined angle between the discotic plane of the molecule and the surface of the transparent stretched film is less than 5°.

* * * * *